US010855396B2

(12) United States Patent
Zhou et al.

(10) Patent No.: US 10,855,396 B2
(45) Date of Patent: Dec. 1, 2020

(54) SEMI-PERSISTENT CHANNEL STATE INFORMATION REPORT

(71) Applicants: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Herndon, VA (US); Ali Cagatay Cirik, Herndon, VA (US)

(72) Inventors: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Herndon, VA (US); Ali Cagatay Cirik, Herndon, VA (US)

(73) Assignee: Ofinno, LLC, Reston, VA (US)

(*) Notice: Subject to any disclaimer, the term of this patent is extended or adjusted under 35 U.S.C. 154(b) by 40 days.

(21) Appl. No.: 16/240,002

(22) Filed: Jan. 4, 2019

(65) Prior Publication Data
US 2019/0207705 A1 Jul. 4, 2019

Related U.S. Application Data

(60) Provisional application No. 62/615,905, filed on Jan. 10, 2018, provisional application No. 62/626,723, (Continued)

(51) Int. Cl.
H04L 1/00 (2006.01)
H04B 7/06 (2006.01)
(Continued)

(52) U.S. Cl.
CPC ......... H04L 1/0026 (2013.01); H04B 7/0617 (2013.01); H04B 7/0626 (2013.01);
(Continued)

(58) Field of Classification Search
CPC ...... H04L 1/0026; H04L 69/22; H04W 24/10; H04B 7/0626
See application file for complete search history.

(56) References Cited

U.S. PATENT DOCUMENTS

2018/0077652 A1 3/2018 Seo et al.
2018/0077691 A1 3/2018 Seo et al.
(Continued)

FOREIGN PATENT DOCUMENTS

EP 3 319 376 5/2018
WO 2018067307 4/2018
(Continued)

OTHER PUBLICATIONS

3GPP TS 38.214 V15.0.0 (Dec. 2017); 3rd Generation Partnership Project; Technical Specification Group Radio Access Network; NR; Physical layer procedures for data (Release 15).
(Continued)

Primary Examiner — Walli Z Butt
Assistant Examiner — Ryan C Kavleski
(74) Attorney, Agent, or Firm — David Grossman; Kavon Nasabzadeh; Philip Smith

(57) ABSTRACT

A wireless device receives a DCI from a base station. The DCI comprises a power control command of an uplink shared channel, a CSI request field, a hybrid automatic repeat request process number, and a redundancy version. Validation of the DCI for an activation of a semi-persistent CSI reporting is performed based on: a radio network temporary identifier of the semi-persistent CSI reporting, the hybrid automatic repeat request process number being set to a first value, and the redundancy version being set to a second value. The semi-persistent CSI reporting indicated by the CSI request field is activated in response to the validation being achieved. A semi-persistent CSI report is
(Continued)

transmitted, based on the activated semi-persistent CSI reporting, via the uplink shared channel with a transmission power determined based on the power control command.

20 Claims, 64 Drawing Sheets

Related U.S. Application Data filed on Feb. 6, 2018, provisional application No. 62/613,572, filed on Jan. 4, 2018.

(51) Int. Cl.

| | | |
|---|---|---|
| *H04B 17/327* | (2015.01) | |
| *H04L 27/26* | (2006.01) | |
| *H04L 1/18* | (2006.01) | |
| *H04B 7/08* | (2006.01) | |
| *H04B 17/309* | (2015.01) | |
| *H04W 76/11* | (2018.01) | |
| *H04W 24/10* | (2009.01) | |
| *H04W 52/14* | (2009.01) | |
| *H04W 52/22* | (2009.01) | |
| *H04W 72/04* | (2009.01) | |
| *H04L 29/06* | (2006.01) | |
| *H04B 1/3827* | (2015.01) | |
| *H04L 5/00* | (2006.01) | |
| *H04W 76/19* | (2018.01) | |
| *H04W 52/04* | (2009.01) | |
| *H04W 80/02* | (2009.01) | |

(52) U.S. Cl.
CPC .......... *H04B 7/0695* (2013.01); *H04B 7/088* (2013.01); *H04B 17/309* (2015.01); *H04B 17/327* (2015.01); *H04L 1/0003* (2013.01); *H04L 1/0009* (2013.01); *H04L 1/0027* (2013.01); *H04L 1/0057* (2013.01); *H04L 1/1819* (2013.01); *H04L 27/2692* (2013.01); *H04L 69/22* (2013.01); *H04W 24/10* (2013.01); *H04W 52/146* (2013.01); *H04W 52/221* (2013.01); *H04W 72/042* (2013.01); *H04W 76/11* (2018.02); *H04B 1/3838* (2013.01); *H04L 1/1822* (2013.01); *H04L 5/0053* (2013.01); *H04W 52/04* (2013.01); *H04W 76/19* (2018.02); *H04W 80/02* (2013.01)

(56) References Cited

U.S. PATENT DOCUMENTS

| | | | |
|---|---|---|---|
| 2018/0097556 | A1 | 4/2018 | Nagaraja et al. |
| 2018/0115990 | A1 | 4/2018 | Abedini et al. |
| 2018/0124818 | A1 | 5/2018 | Lohr et al. |
| 2018/0159672 | A1 | 6/2018 | Kim et al. |
| 2018/0160445 | A1 | 6/2018 | Babaei et al. |
| 2018/0206170 | A1 | 7/2018 | Nagaraja et al. |
| 2019/0207737 | A1* | 7/2019 | Babaei ............ H04W 72/046 |
| 2019/0372642 | A1* | 12/2019 | Kakishima ......... H04L 5/0048 |
| 2020/0029352 | A1* | 1/2020 | Aiba ................ H04W 72/14 |

FOREIGN PATENT DOCUMENTS

| | | |
|---|---|---|
| WO | 2018075985 | 4/2018 |
| WO | 2018083188 | 5/2018 |
| WO | 2018083245 | 5/2018 |
| WO | 2018083624 | 5/2018 |
| WO | 2018136185 | 7/2018 |

OTHER PUBLICATIONS

International Search Report and Written Opinion for PCT International Application PCT/US2019/012284; dated May 23, 2019.
R1-1721454; 3GPP TSG RAN WG1 Meeting #91; Reno, USA, Nov. 27-Dec. 1, 2017; Source: NTT Docomo, Inc.; Title: Offline summary for AI 7.3.3.4 UL data transmission procedure; Agenda Item: 7.3.3.4; Document for: Discussion and Decision.
R1-1719861; 3GPP TSG RAN WG1 Meeting #91; Reno, US, Nov. 27-Dec. 1, 2017; Agenda Item: 6.2.1.2.7; Source: LG Electronics; Title: Discussion on sTTI SPS; Document for: Discussion.
R1-1719955; 3GPP TSG RAN WG1 Meeting #91; Reno, USA, Nov. 27-Dec. 1, 2017; Agenda Item: 6.2.1.2.7; Source: Huawei, HiSilicon; Title: SPS for short TTI; Document for: Discussion and decision.
R1-1719958; 3GPP TSG RAN WG1 Meeting #91; Reno, USA, Nov. 27-Dec. 1, 2017; Source: Huawei; Title: Summary of email discussion [90b-LTE-16] on SPS details; Agenda Item: 6.2.1.2.7; Document for: Discussion and Decision.
3GPP TS 38.331 V0.4.0 (Dec. 2017)Technical Specification;3rd Generation Partnership Project;Technical Specification Group Radio Access NetworkNR; Radio Resource Control (RRC).
R1-1716901; 3GPP TSG-RAN WG1 NR-AH3; Nagoya, Japan, Sep. 18-21, 2017 Agenda: 6.2.2.2; WF for Open Issues on CSI Reporting.
R1-1721510; 3GPP TSG RAN WG1 Meeting #91; Reno, USA, Nov. 27-Dec. 1, 2017 ; Source:NTT Docomo, Inc.; Title:Offline summary for AI 7.3.3.4 UL data transmission procedure ; Agenda Item:7.3.3.4.
R1-1715439 Remaining details on CSI reporting; 3GPP TSG RAN WG1 Meeting NR #3; Nagoya, Japan, Sep. 18-21, 2017; Source: ZTE, Sanechips; Title:Remaining details on CSI reporting; Agenda Item:6.2.2.2; Document for: Discussion and Decision.
R1-1715858_CSI reporting_v2; 3GPP TSG RAN WG1 Meeting NR#3; Nagoya, Japan, Sep. 18-21, 2017; Agenda Item:6.2.2.2; Source: LG Electronics; Title: Discussions on CSI reporting; Document for:Discussion/Decision.
R1-1715939 CSI reporting and UCI multiplexing_r3; 3GPP TSG RAN WG1 Meeting NR#3; Nagoya, Japan, Sep. 18-21, 2017; Agenda item:6.2.2.2; Source: Samsung; Title: CSI reporting and UCI multiplexing; Document for:Discussion and Decision.
R1-1716349 On CSI reporting; 3GPP TSG-RAN WG1 NR Ad Hoc #3; Nagoya, Japan, Sep. 18-21, 2017; Source: Ericsson; Title:On CSI reporting; Agenda Item:6.2.2.2.
R1-1717604 CSI reporting and UCI multiplexing_r1; 3GPP TSG RAN WG1 Meeting 90bis; Prague, CZ, Oct. 9-13, 2017; Agenda item:7.2.2.2; Source: Samsung; Title: CSI reporting and UCI multiplexing; Document for: Discussion and Decision.
R1-1717940_CSI reporting_v3; 3GPP TSG RAN WG1 Meeting #90bis; Prague, Czech Republic, Oct. 9-13, 2017; Agenda Item:7.2.2.2; Source: LG Electronics; Title: Discussions on CSI reporting; Document for:Discussion/Decision.
R1-1718432 On remaining detailsof CSI reporting; 3GPP TSG RAN WG1 Meeting 90bis; Prague, CZ, Oct. 9-13, 2017; Source:Ericsson; Title:On remaining details of CSI reporting; Agenda Item:7.2.2.2.
R1-1718442 On semi-persistent CSI reporting on PUSCH; 3GPP TSG-RAN WG1 #90bis; Prague, Czech Republic, Oct. 9-13, 2017; ; Source:Ericsson; Title:On semi-persistent CSI reporting on PUSCH; Agenda Item:7.2.2.6.
R1-1719932 Remaining issues on UL data transmission procedure; 3GPP TSG RAN WG1 Meeting 91; Reno, USA, Nov. 27-Dec. 1, 2017 ; Agenda Item:7.3.3.4; Source: LG Electronics; Title: Remaining issues on UL data transmission procedure; Document for:Discussion and decision.
R1-1720289 CSI reporting and UCI multiplexing_r1; 3GPP TSG RAN WG1 Meeting #91; Reno, USA Nov. 27-Dec. 1, 2017; Agenda item:7.2.2.2; Source: Samsung; Title: CSI reporting and UCI multiplexing; Document for: Discussion and Decision.

(56) References Cited

OTHER PUBLICATIONS

R1-1720661; 3GPP TSG RAN WG1 Meeting #91 ; Nov. 27-Dec. 1, 2017; Reno, Nevada, USA; ; Agenda item:7.2.2.2; Source: Qualcomm Incorporated.
R1-1720734 on remaining details of CSI reporting; 3GPP TSG-RAN WG1 #91; Reno, USA, Nov. 27-Dec. 1, 2017; ; Source:Ericsson; Title:On remaining details of CSI reporting; Agenda Item:7.2.2.2.
R1-1721342 cl; 3GPP TS 38.212 V1.2.1 (Dec. 2017); Technical Specification; 3rd Generation Partnership Project; Technical Specification Group Radio Access Network; NR; Multiplexing and channel coding.
R1-1721371 Summary of remaining issues on CSI measurement; 3GPP TSG RAN WG1 Meeting #91; Reno, USA, Nov. 27-Dec. 1, 2017; Source: ZTE, Sanechips; Title:Summary of remaining issues on CSI measurement; Agenda Item:7.2.2.1; Document for: Discussion and Decision.
R1-1721451 Summary of views on CSI reporting v4 with offline notes; 3GPP TSG-RAN WG1 #91; Reno, USA, Nov. 27-Dec. 1, 2017; ; Source:Ericsson; Title:Summary of views on CSI reporting; Agenda Item:7.2.2.2.
R1-1800101; 3GPP TSG RAN WG1 Ad Hoc Meeting; Vancouver, Canada, Jan. 22-26, 2018; ; Agenda Item:7.2.2.4; Source:Huawei, HiSilicon; Title:Summary of remaining issues on beam failure recovery.
R1-1800111 Remaining details on beam recovery; 3GPP TSG RAN WG1 Meeting AH 1801; Vancouver, Canada, Jan. 22-26, 2018; Source:ZTE, Sanechips; Title: Remaining details on beam recovery; Agenda Item: 7.2.2.4; Document for: Discussion and Decision.
R1-1800160_BFR_final; 3GPP TSG RAN WG1 Meeting AH1801; Vancouver, CA, Jan. 22-26, 2018; Agenda Item: 7.2.2.4; Source: MediaTek Inc.; Title:Clarifications on Beam Failure Recovery; Document for: Discussion.
R1-1800186_Remaining issues and text proposals on mechanism to recover from beam failure; 3GPP TSG RAN WG1 Meeting AH 1801; Vancouver, Canada, Jan. 22-26, 2018; ; Source:vivo; Title:Remaining issues and text proposals on mechanism to recover from beam failure; Agenda Item:7.2.2.4.
R1-1800242; 3GPP TSG RAN WG1 Meeting AH 1801; Vancouver, Canada, Jan. 22-26, 2018; ; Source: CATT; Title:Remaining issues on DL beam recovery; Agenda Item:7.2.2.4.
R1-1800312 Remaining Issues on Beam Failure Recovery_r1; 3GPP TSG-RAN WG1 Meeting AH 1801R1-1800312 Vancouver, Canada, Jan. 22-26, 2018; ; Source: Intel Corporation; Title:Remaining Issues on Beam Failure Recovery; Agenda item:7.2.2.4.
R1-1800364 BFR; 3GPP TSG RAN WG1 Meeting AH 1801; Vancouver, Canada, Jan. 22-26, 2018; Agenda Item: 7.2.2.4; Source: LG Electronics; Title: Discussion on PHY and MAC operation for beam failure recovery; Document for: Discussion and Decision.
R1-1800402—Beam Recovery; 3GPP TSG RAN WG1 Meeting AH 1801; Vancouver, Canada, Jan. 22-26, 2018; ; Agenda Item:7.2.2.4; Source:Lenovo, Motorola Mobility; Title:Corrections on beam failure recovery.
R1-1800434; 3GPP TSG RAN WG1 Meeting AH 1801; Vancouver, Canada, Jan. 22-26, 2018; Agenda Item:7.2.2.4; Source: Samsung; Title: Issues on beam failure recovery; Document for:Discussion and Decision.
R1-1800583 In support of partial beam failure—Copy; 3GPP TSG RAN WG1 Meeting AH 1801; Vancouver, Canada, Jan. 22-26, 2018; Agenda Item:7.2.2.4; Source:AT&T.
R1-1800622 Remaining Issues for Beam Failure Recovery Procedure; 3GPP TSG RAN WG1 Meeting AH 1801; Vancouver, Canada, Jan. 22-26, 2018; ; Agenda Item:7.2.2.4; Source:ASUSTeK; Title: Remaining Issues for Beam Failure Recovery Procedure.
R1-1800629 beam recovery_FINAL; 3GPP TSG RAN WG1 Meeting AH 1801; Vancouver, Canada, Jan. 22-26, 2018; ; Agenda Item:7.2.2.4; Source:InterDigital, Inc. ; Title:Remaining details on beam failure recovery.
R1-1800642; 3GPP TSG RAN WG1 Meeting AH 1801; Vancouver, Canada, Jan. 22-26, 2018; Agenda Item:7.2.2.4; Source: ITRI; Title:Discussion on timer for beam failure recovery.

R1-1800661_Beam_Failure_Recovery; 3GPP TSG RAN WG1 Meeting AH 1801; Vancouver, Canada, Jan. 22-26, 2018; Source:NTT Docomo; Title:Remaining issues on beam recovery; Agenda Item:7.2.2.4.
R1-1800700 Remaining details and corrections on beam recovery; 3GPP TSG RAN WG1 Meeting AH 1801; Vancouver, Canada, Jan. 22-26, 2018; ; Source:Ericsson; Title:Remaining details and corrections for beam recovery; Agenda Item:7.2.2.4.
R1-1800752; 3GPP TSG-RAN WG1 NR AH #1801; Vancouver, Canada Jan. 22-26, 2018; Agenda Item:7.2.2.4.; Source:Nokia, Nokia Shanghai Bell; Title:Remaining Details on Beam Recovery.
R2-1800086_Issues and Corrections for Beam Failure Recovery Request Procedure; 3GPP TSG-RAN2 AH-1801; Vancouver, Canada, Jan. 22-Jan. 26, 2018 ; Agenda item:10.3.1.4.2; Source:Samsung; Title:Issues/Corrections: Beam Failure Recovery Request Procedure.
R2-1800095_Draft CR_Corrections for Beam Failure Recovery Request Procedure; 3GPP TSG-RAN WG2 AH-1801; Vancouver, Canada, Jan. 22-Jan. 26, 2018 ; CR-Form-v11.2; Change Request.
R2-1800652 Further Clarification on Beam Failure Recovery Procedure; 3GPP TSG-RAN WG2 Meeting AH-1801; Vancouver, Canada, Jan. 22-26, 2018; ; Agenda Item:10.3.1.4.2; Souce:MediaTek Inc.; Title:Further Clarification on Beam Failure Recovery Procedure.
R2-1800963 Clarifications to beam recovery procedure; 3GPP TSG-RAN WG2 NR Ad hoc 1801; Vancouver, Canada, Jan. 22-26, 2018; Agenda item:10.3.1.4.2; Source:Nokia, Nokia Shanghai Bell.
R2-1800964 Draft CR to 38.321 on Beam recovery procedure; 3GPP TSG-RAN WG2 NR Ad hoc 1801 R2-1800964 Vancouver, Canada, Jan. 22-26, 2018; CR-Form-v11.2; Draft Change Request.
R2-1801404_Beam failure recovery_r4; 3GPP TSG-RAN WG2 NR Ad hoc 1801; Vancouver, Canada, Jan. 22-Jan. 26, 2018; Source:NTT Docomo, Inc. ; Title:Discussion on Beam failure recovery; Document for:Discussion and decisions; Agenda Item: 10.3.1.4.3.
R2-1801405 Draft CR to 38.321 on Clarification on beam failure recovery_r1; 3GPP TSG-RAN WG2 NR Ad hoc 1801; Vancouver, Canada, Jan. 22-Jan. 26, 2018; CR-Form-v11.2; ; Change Request.
R2-1801477; 3GPP TSG-RAN WG2 NR Ad Hoc #3; Vancouver, Canada, Jan. 22-26, 2018; CR-Form-v11.1; ; Change Request.
R2-1801545_NR UP minutes RAN2-NR-AH1801; 3GPP TSG-RAN WG2 NR Ad hoc 1801R2-1801545 Vancouver, Canada, Jan. 22-Jan. 26, 2018; ; Agenda Item:12.1.2; Source: Session Chair (InterDigital); Title: Report from LTE and NR User Plane Break-Out Session.
R2-1801558 Summary on BFR detection and other BFR issues; x3GPP TSG-RAN WG2 NR Ad hoc 0118R2-1801558 Vancouver, Canada, Jan. 22-Jan. 26, 2018; ; Source:CATT; Title:Summary on BFR detection and other BFR issues; Agenda Item:10.3.1.4.2.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 26.213 V14.3.0 (Jun. 2017); Release 14; pp. 50-305.
3GPP TS 36.321 V14.4.0 (Sep. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TS 38.321 V2.0.0 (Dec. 2017); Technical Specification; 3rd Generation Partnership Project; Technical Specification Group Radio Access Network; NR; Medium Access Control (MAC) protocol specification (Release 15).
3GPP TSG RAN WG1 Meeting 90bis; Prague, CZ, Oct. 9-13, 2017; Title: RAN1 Chairman's Notes.
3GPP TSG RAN WG1 Meeting AH 1801; Vancouver, Canada, Jan. 22-26, 2018; Title: RAN1 Chairman's Notes.

(56) References Cited

OTHER PUBLICATIONS

3GPP TSG-RAN WG2 NR Ad hoc 1801; Vancouver, Canada, Jan. 22-Jan. 26, 2018; Source: RAN2 Chairman (Intel); Title: Chairman Notes.

* cited by examiner

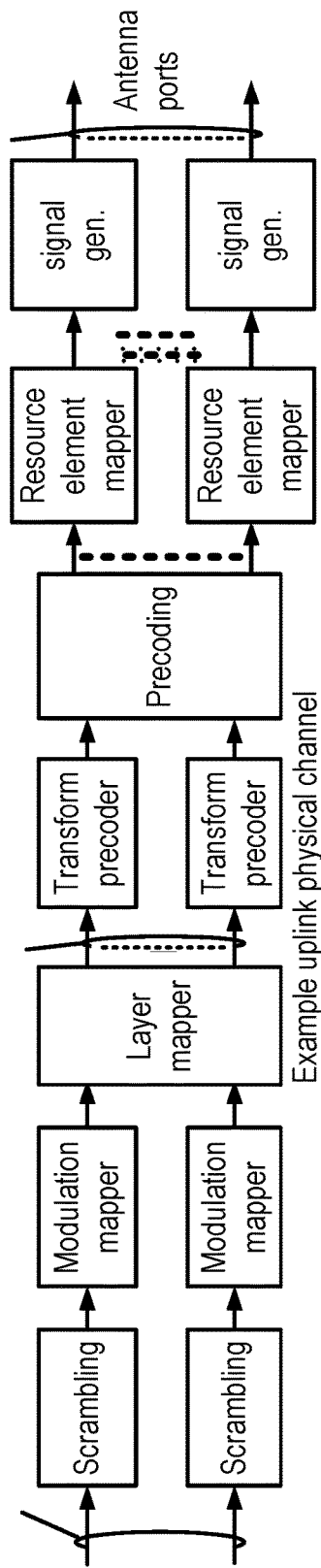
FIG. 5A
Example uplink physical channel
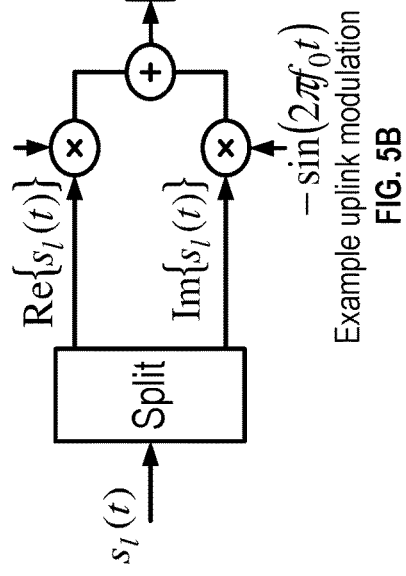
FIG. 5B
Example uplink modulation
FIG. 5D
Example downlink modulation
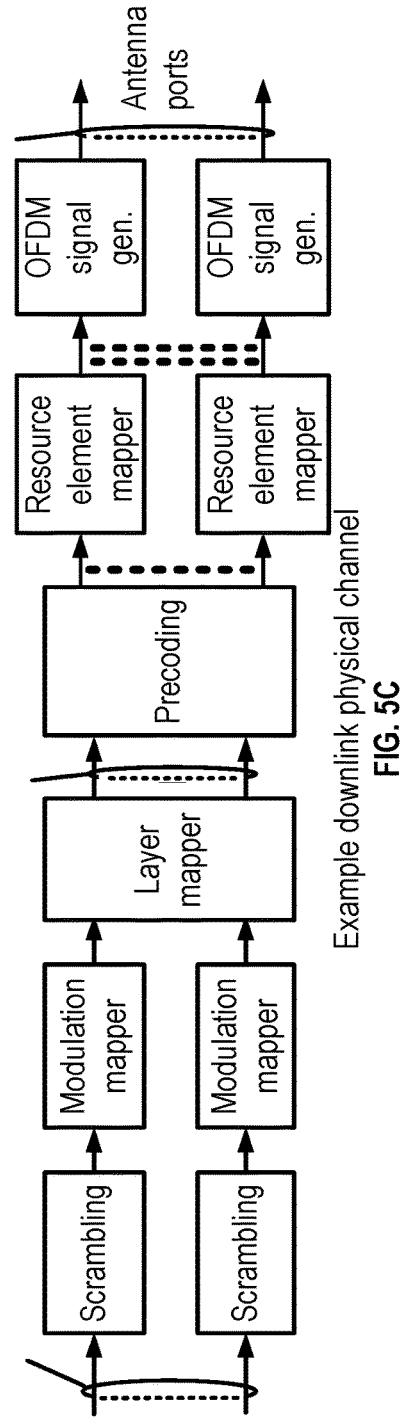
FIG. 5C
Example downlink physical channel FIG. 7 Dual-Connectivity- two MAC entities at UE side gNB connected to NGC eLTE eNB connected to NGC

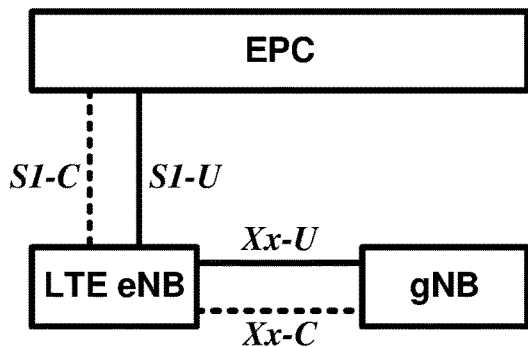

LTE eNB connected to EPC with non-standalone gNB. gNB user plane connected to EPC via LTE eNB.
FIG. 11A

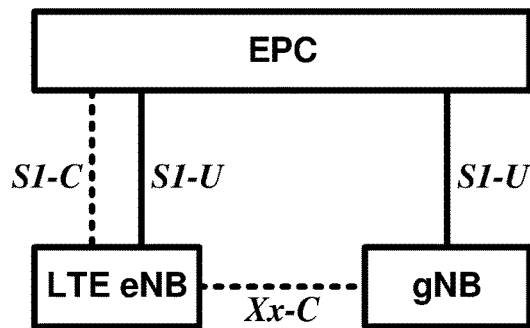

LTE eNB connected to EPC with non-standalone gNB. gNB user plane connected to EPC directly.
FIG. 11B

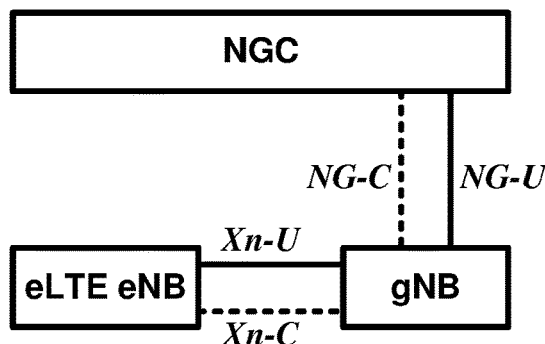

gNB connected to NGC with non-standalone eLTE eNB. eLTE eNB user plane connected to NGC via gNB.
FIG. 11C

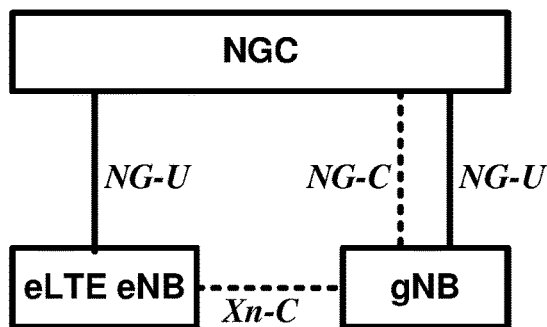

gNB connected to NGC with non-standalone eLTE eNB. eLTE eNB user plane connected to NGC directly.
FIG. 11D

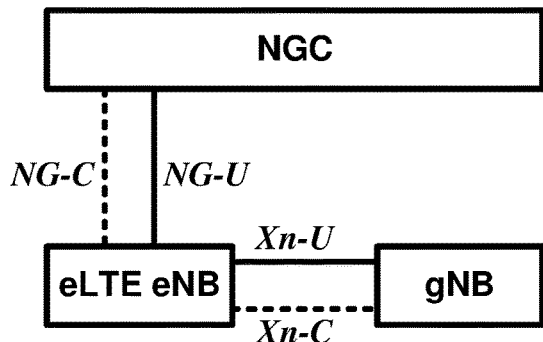

eLTE eNB connected to NGC with non-standalone gNB. gNB user plane connected to NGC via eLTE eNB.
FIG. 11E

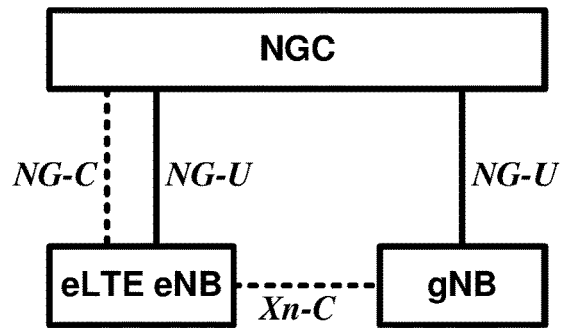

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

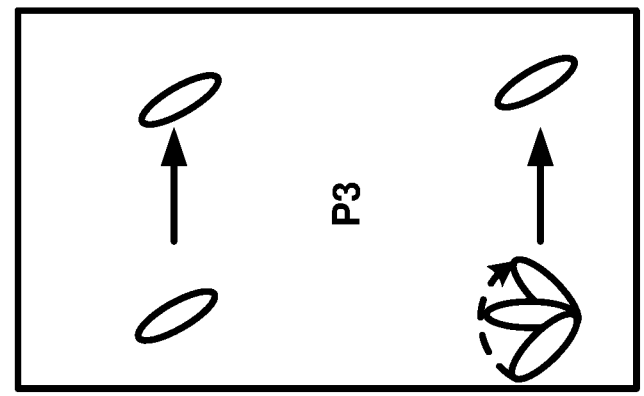
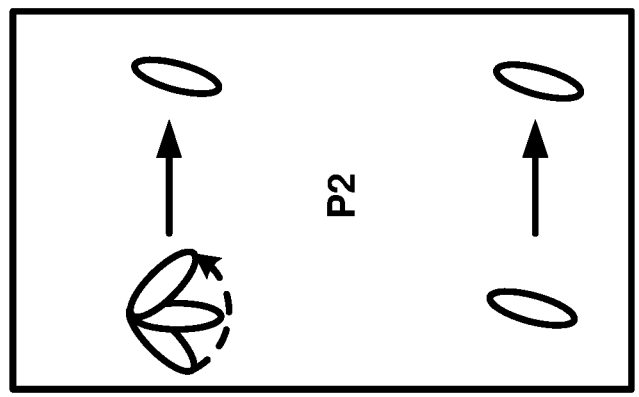# 
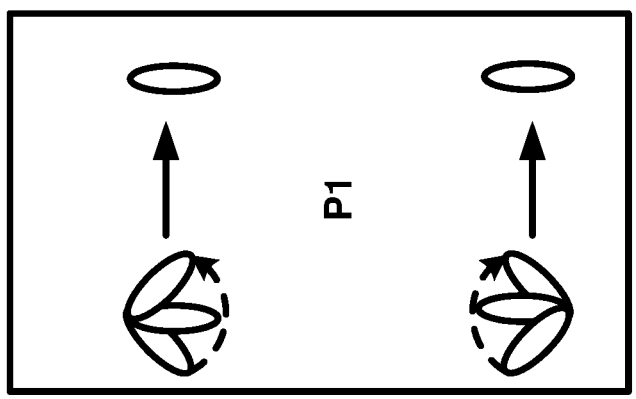
FIG. 22

Beam failure in one TRP

Beam failure in multiple TRPs

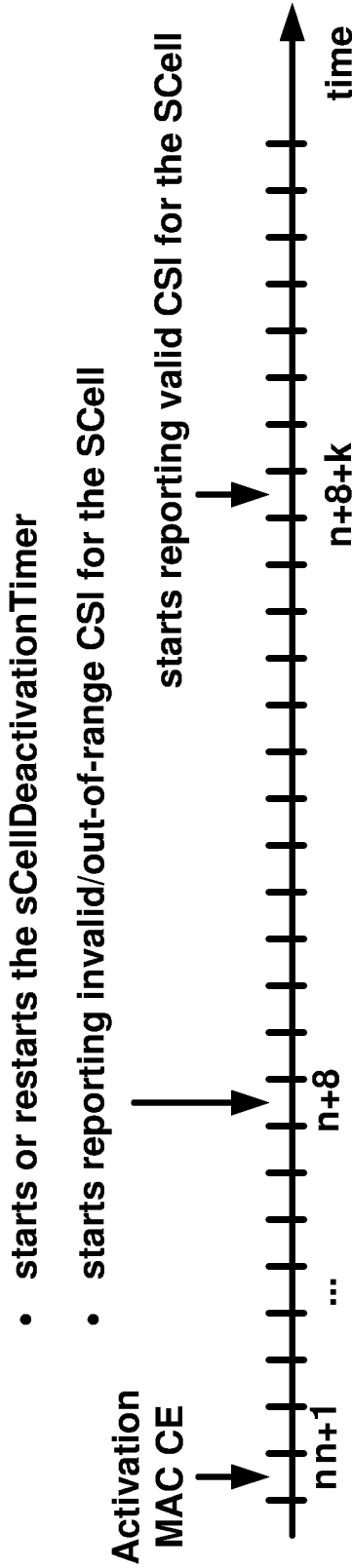
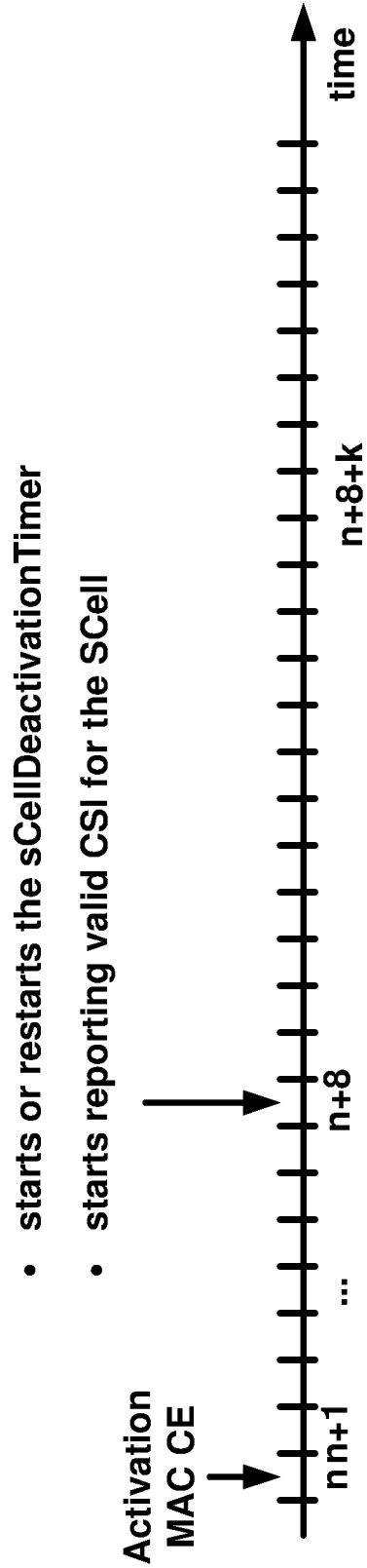
FIG. 25A
FIG. 25B

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

FIG. 26

| CSI-RS configuration | P-CSI reporting | SP-CSI reporting | Ap-CSI reporting |
|---|---|---|---|
| P CSI-RS | Higher layers (e.g., RRC) | MAC CE and/or DCI | DCI |
| SP CSI-RS | Not supported | MAC CE and/or DCI | DCI |
| Ap. CSI-RS | Not supported | Not supported | DCI |

FIG. 29

| $C_7$ | $C_6$ | $C_5$ | $C_4$ | $C_3$ | $C_2$ | $C_1$ | $C_0$ | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
| Act/Deact | SP CSI report trigger index_1 (Pcell) | | | | | | R-bits | Oct 5 |
| Act/Deact | SP CSI report trigger index_2 (PScell) | | | | | | R-bits | Oct 6 |
| ... | | | | | | | | |
| Act/Deact | SP CSI report trigger index_m (Scell m) | | | | | | R-bits | Oct m |

FIG. 47

| $C_7$ | $C_6$ | $C_5$ | $C_4$ | $C_3$ | $C_2$ | $C_1$ | $C_0$ | Oct 1 |
|---|---|---|---|---|---|---|---|---|
| Act/Deact | SP CSI report trigger index_1 (Pcell) | | | | | | R-bits | Oct 2 |
| RS configuration ID (Pcell) | | | | | | | R-bits | Oct 3 |
| Act/Deact | SP CSI report trigger index_2 (PScell) | | | | | | R-bits | Oct 4 |
| RS configuration ID (PScell) | | | | | | | R-bits | Oct 5 |
| ... | | | | | | | | |
| Act/Deact | SP CSI report trigger index_m (Scell m) | | | | | | R-bits | Oct m |
| RS configuration ID (Scell m) | | | | | | | R-bits | Oct m+1 |

FIG. 49A

| R | F | LCID | Oct 1 |
|---|---|---|---|
| L | | | Oct 2 |

FIG. 49B

| $C_7$ | $C_6$ | $C_5$ | $C_4$ | $C_3$ | $C_2$ | $C_1$ | $C_0$ | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |
| Act/Deact | SP CSI report trigger index_1 (Pcell) | | | | | | R-bits | Oct 5 |
| RS configuration ID (Pcell) | | | | | | | R-bits | Oct 6 |
| Act/Deact | SP CSI report trigger index_2 (PScell) | | | | | | R-bits | Oct 7 |
| RS configuration ID (PScell) | | | | | | | R-bits | Oct 8 |

...

| Act/Deact | SP CSI report trigger index_m (Scell m) | | | | | | R-bits | Oct m |
|---|---|---|---|---|---|---|---|---|
| RS configuration ID (Scell m) | | | | | | | R-bits | Oct m+1 |

FIG. 50

Receive, by a wireless device from a base station, a DCI comprising: a power control command of an uplink shared channel; a CSI request field; a hybrid automatic repeat request process number; and a redundancy version
5110

Perform a validation of the DCI for an activation of a semi-persistent CSI reporting based on: a radio network temporary identifier of the semi-persistent CSI reporting; the hybrid automatic repeat request process number being set to a 1st value; and the redundancy version being set to a 2nd value
5120

Activate the semi-persistent CSI reporting indicated by the CSI request field in response to the validation being achieved
5130

Transmit, based on the activated semi-persistent CSI reporting, a semi-persistent CSI report via the uplink shared channel with a transmission power determined based on the power control command
5140

FIG. 51

```
┌─────────────────────────────────────────────────────────┐
│ Receive a DCI comprising: a power control command of an uplink │
│ shared channel; a CSI request field; a hybrid automatic repeat │
│    request process number; and a redundancy version    │
│                         5210                            │
└─────────────────────────────────────────────────────────┘
                            │
                            ▼
┌─────────────────────────────────────────────────────────┐
│ Validate the DCI for an activation of a semi-persistent CSI reporting │
│    based on: a radio network temporary identifier of the semi-  │
│    persistent CSI reporting; the hybrid automatic repeat request │
│    process number being set to a 1st value; and the redundancy │
│               version being set to a 2nd value          │
│                         5220                            │
└─────────────────────────────────────────────────────────┘
                            │
                            ▼
┌─────────────────────────────────────────────────────────┐
│  Activate the semi-persistent CSI reporting indicated by the CSI │
│   request field in response to the validation being achieved │
│                         5230                            │
└─────────────────────────────────────────────────────────┘
                            │
                            ▼
┌─────────────────────────────────────────────────────────┐
│ Transmit, in response to activating semi-persistent CSI reporting, a │
│   semi-persistent CSI report via the uplink shared channel with a │
│   transmission power determined based on the power control │
│                       command                           │
│                         5240                            │
└─────────────────────────────────────────────────────────┘
```

FIG. 52

Transmit, by a base station to a wireless device, a DCI comprising: a power control command of an uplink shared channel; a CSI request field; a hybrid automatic repeat request process number; and a redundancy version
5310

Activate for the wireless device, in response to the transmitting, a semi-persistent CSI reporting based on: a radio network temporary identifier of the semi-persistent CSI reporting; the hybrid automatic repeat request process number being set to a 1st value; and the redundancy version being set to a 2nd value
5320

Receive from the wireless device, for the activated semi-persistent CSI reporting, a semi-persistent CSI report via the uplink shared channel
5330

FIG. 53

```
┌─────────────────────────────────────────────────────────────┐
│   Receive, by a wireless device from a base station, a DCI  │
│ comprising: a power control command of an uplink shared     │
│ channel; a CSI request field; a hybrid automatic repeat     │
│ request process number; and a redundancy version            │
│                         5410                                │
└─────────────────────────────────────────────────────────────┘
                             │
                             ▼
┌─────────────────────────────────────────────────────────────┐
│ Validate the DCI for an activation of a semi-persistent CSI │
│ reporting based on: a radio network temporary identifier of │
│ the semi-persistent CSI reporting; the hybrid automatic     │
│ repeat request process number; and the redundancy version   │
│                         5420                                │
└─────────────────────────────────────────────────────────────┘
                             │
                             ▼
┌─────────────────────────────────────────────────────────────┐
│ Activate the semi-persistent CSI reporting indicated by the │
│ CSI request field in response to the validation being       │
│ achieved                                                    │
│                         5430                                │
└─────────────────────────────────────────────────────────────┘
                             │
                             ▼
┌─────────────────────────────────────────────────────────────┐
│ Transmit, based on the activated semi-persistent CSI        │
│ reporting, a semi-persistent CSI report via the uplink      │
│ shared channel with a transmission power determined based   │
│ on the power control command                                │
│                         5440                                │
└─────────────────────────────────────────────────────────────┘
```

FIG. 54

Transmit from a wireless device, a semi-persistent CSI report for a semi-persistent CSI reporting
5510 receiving a DCI comprising: a CSI request field; a hybrid automatic repeat request process number; a value of modulation and coding scheme; a parameter of resource block assignment; and a redundancy version
5520

Validate the DCI for a deactivation of the semi-persistent CSI reporting based on: a radio network temporary identifier of the semi-persistent CSI reporting; the hybrid automatic repeat request process number; the redundancy version; the parameter of resource block assignment; and the value of modulation and coding scheme
5530

Deactivate the semi-persistent CSI reporting indicated by the CSI request field in response to the validation being achieved
5540

Stop transmitting the semi-persistent CSI report via an uplink shared channel
5550

FIG. 55

```
┌─────────────────────────────────────────────────────────┐
│ Receive, by a wireless device from a base station       │
│ message(s) comprising: parameters of a plurality of SP  │
│ CSI reporting; and a SP CSI radio network temporary     │
│ identifier                                              │
│ 5610                                                    │
└─────────────────────────────────────────────────────────┘
                            │
                            ▼
┌─────────────────────────────────────────────────────────┐
│ Receive a DCI comprising: a power control command of an │
│ uplink shared channel; a channel state information      │
│ request filed indicating a SP CSI reporting of the      │
│ plurality of SP CSI reporting; a hybrid automatic repeat│
│ request process number; and a redundancy version        │
│ 5620                                                    │
└─────────────────────────────────────────────────────────┘
                            │
                            ▼
┌─────────────────────────────────────────────────────────┐
│ Perform a validation of the DCI for an activation of    │
│ the SP CSI reporting based on: the SP CSI radio network │
│ temporary identifier; the hybrid automatic repeat       │
│ request process number; and the redundancy version      │
│ 5630                                                    │
└─────────────────────────────────────────────────────────┘
                            │
                            ▼
┌─────────────────────────────────────────────────────────┐
│ Transmit, in response to the validation being achieved  │
│ and based on the SP CSI reporting, a SP CSI report via  │
│ the uplink shared channel with a transmission power     │
│ determined based on the power control command           │
│ 5640                                                    │
└─────────────────────────────────────────────────────────┘
```

FIG. 56

```
┌─────────────────────────────────────────────────────────────┐
│ Initiate, by a wireless device, a beam failure recovery     │
│ procedure in response to detecting a 1st number of beam     │
│ failure instances                                            │
│                         5810                                 │
└─────────────────────────────────────────────────────────────┘
                              │
                              ▼
┌─────────────────────────────────────────────────────────────┐
│        Start a beam failure recovery timer with a 1st       │
│                        timer value                          │
│                           5820                              │
└─────────────────────────────────────────────────────────────┘
                              │
                              ▼
┌─────────────────────────────────────────────────────────────┐
│  Selecting a 1st reference signal in response to an expiry  │
│            of the beam failure recovery timer               │
│                           5830                              │
└─────────────────────────────────────────────────────────────┘
                              │
                              ▼
┌─────────────────────────────────────────────────────────────┐
│     Transmit a 1st preamble associated with the 1st         │
│                     reference signal                        │
│                           5840                              │
└─────────────────────────────────────────────────────────────┘
                              │
                              ▼
┌─────────────────────────────────────────────────────────────┐
│ Monitor, during a response window and in response to        │
│ transmit the 1st preamble, a downlink control channel       │
│ for a DCI                                                    │
│                         5850                                 │
└─────────────────────────────────────────────────────────────┘
                              │
                              ▼
┌─────────────────────────────────────────────────────────────┐
│ Increment a preamble transmission counter, from a value     │
│ of the preamble transmission counter before the expiry of   │
│ the beam failure recovery timer, in response to not         │
│ receiving the DCI during the response window                │
│                         5860                                 │
└─────────────────────────────────────────────────────────────┘
                              │
                              ▼
┌─────────────────────────────────────────────────────────────┐
│ Transmit, in response to the preamble transmission counter  │
│ indicating a 2nd number equal to or less than a 3rd number  │
│ for preamble transmissions, a 2nd preamble for the beam     │
│ failure recovery procedure                                   │
│                         5870                                 │
└─────────────────────────────────────────────────────────────┘
```

FIG. 58

Initiate, by a wireless device, a beam failure recovery procedure in response to detecting a 1st number of beam failure instances
5910

Start a beam failure recovery timer with a 1st timer value
5920

Selecting a 1st reference signal in response to an expiry of the beam failure recovery timer
5930

Transmit a 1st preamble associated with the 1st reference signal
5940

Monitor, during a response window and in response to transmit the 1st preamble, a downlink control channel for a DCI
5950

Increment a preamble transmission counter, from a value of the preamble transmission counter before the expiry of the beam failure recovery timer, in response to not receiving the DCI during the response window
5960

Transmit, in response to the preamble transmission counter indicating a 1st number equal to or less than a 2nd number for preamble transmissions, a 2nd preamble for the beam failure recovery procedure
5970

FIG. 59

Receive, by a wireless device, a MAC CE identified by a MAC subheader, where the MAC CE comprises: a 1st field associated with a 1st cell of a plurality of cells, where the 1st field being set to a 1st value indicates a command of activation/deactivation of SP CSI reporting on the 1st cell is present; a SP CSI reporting activation/deactivation indicator; and a SP CSI report trigger field indicating a SP CSI reporting of a plurality of SP CSI reporting on the 1st cell
6310

Transmit, in response to the SP CSI reporting activation/deactivation indicator indicating an activation of the SP CSI reporting on the 1st cell, a SP CSI report for the 1st cell via an uplink control channel
6320

FIG. 63

```
┌─────────────────────────────────────────────────────────┐
│  Receive, by a wireless device from a base station,     │
│  message(s) comprising: 1st configuration parameter(s)  │
│  of cells; 2nd configuration parameter(s) of a          │
│  plurality of SP CSI reporting                          │
│                      6410                               │
└─────────────────────────────────────────────────────────┘
                            │
                            ▼
┌─────────────────────────────────────────────────────────┐
│  Receive a MAC CE identified by a MAC subheader, where  │
│  the MAC CE comprises: a 1st field associated with a    │
│  1st cell of the cells, where the 1st field being set   │
│  to a 1st value indicates a command of                  │
│  activation/deactivation of SP CSI reporting on the     │
│  1st cell is present; a SP CSI reporting                │
│  activation/deactivation indicator; and a SP CSI report │
│  trigger field indicating a SP CSI reporting of SP CSI  │
│  reporting on the 1st cellg                             │
│                      6420                               │
└─────────────────────────────────────────────────────────┘
                            │
                            ▼
┌─────────────────────────────────────────────────────────┐
│  Transmit, in response to the SP CSI reporting          │
│  activation/deactivation indicator indicating an        │
│  activation of the SP CSI reporting on the 1st cell,    │
│  a SP CSI report for the 1st cell via an uplink         │
│  control channel                                        │
│                      6430                               │
└─────────────────────────────────────────────────────────┘
```

FIG. 64

SEMI-PERSISTENT CHANNEL STATE INFORMATION REPORT

CROSS-REFERENCE TO RELATED APPLICATIONS

This application claims the benefit of U.S. Provisional Application No. 62/615,905, filed Jan. 10, 2018, U.S. Provisional Application No. 62/626,723, filed Feb. 6, 2018, and U.S. Provisional Application No. 62/613,572, filed Jan. 4, 2018, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 22 is an example of various beam management procedures as per an aspect of an embodiment of the present disclosure.

FIG. 25A is an example diagram for timing for CSI report when activation of a secondary cell as per an aspect of an embodiment of the present disclosure.

FIG. 25B is an example diagram for timing for CSI report when activation of a secondary cell as per an aspect of an embodiment of the present disclosure.

FIG. 26 is an example diagram for downlink control information (DCI) formats as per an aspect of an embodiment of the present disclosure.

FIG. 29 is an example diagram for various CSI reporting mechanisms as per an aspect of an embodiment of the present disclosure.

FIG. 47 is an example diagram of a MAC CE of activation/deactivation of SP CSI report for multiple SCells as per an aspect of an embodiment of the present disclosure.

FIG. 49A and FIG. 49B are example diagrams of a MAC CE and a MAC subheader of activation/deactivation and RS resource configuration of SP CSI report for multiple SCells as per an aspect of an embodiment of the present disclosure.

FIG. 50 is an example diagram of a MAC CE of activation/deactivation and RS resource configuration of SP CSI report for multiple SCells as per an aspect of an embodiment of the present disclosure.

FIG. 51 is a flow diagram of an aspect of an embodiment of the present disclosure.

FIG. 52 is a flow diagram of an aspect of an embodiment of the present disclosure.

FIG. 53 is a flow diagram of an aspect of an embodiment of the present disclosure.

FIG. 54 is a flow diagram of an aspect of an embodiment of the present disclosure.

FIG. 55 is a flow diagram of an aspect of an embodiment of the present disclosure.

FIG. 56 is a flow diagram of an aspect of an embodiment of the present disclosure.

FIG. 58 is a flow diagram of an aspect of an embodiment of the present disclosure.

FIG. 59 is a flow diagram of an aspect of an embodiment of the present disclosure.

FIG. 63 is a flow diagram of an aspect of an embodiment of the present disclosure.

FIG. 64 is a flow diagram of an aspect of an embodiment of the present disclosure.

DETAILED DESCRIPTION OF EMBODIMENTS

Figure 1:
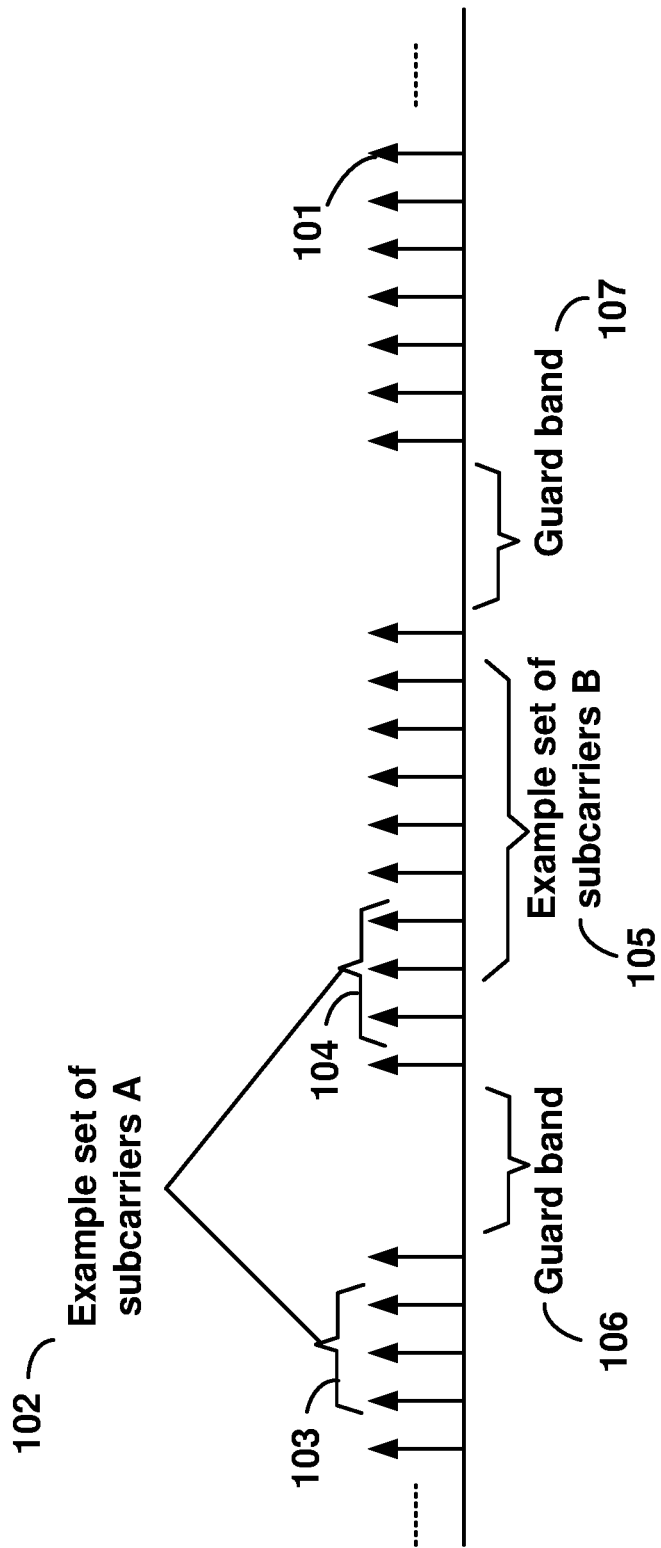
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal transmission in a multicarrier communication system.

The following Acronyms are used throughout the present disclosure:

ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DL downlink
DU distributed unit
eMBB enhanced mobile broadband
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HDL hardware description languages
HARQ hybrid automatic repeat request
IE information element
LTE long term evolution
MAC media access control
MCG master cell group
MeNB master evolved node B
MIB master information block
MME mobility management entity
mMTC massive machine type communications
NAS non-access stratum
NGC next generation core
NG CP next generation control plane core
NG-C NG-control plane NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RB resource blocks
RBG resource block groups
RLC radio link control
RRC radio resource control
SCC secondary component carrier
SCell secondary cell
SCG secondary cell group
SC-OFDM single carrier-OFDM
SDU service data unit
SeNB secondary evolved node B
SIB system information block
SFN system frame number
sTAGs secondary timing advance group
S-GW serving gateway
SRB signaling radio bearer
TA timing advance
TAG timing advance group
TAI tracking area identifier
TAT time alignment timer
TB transport block
TDD time division duplexing
TDMA time division multiple access
TTI transmission time interval
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
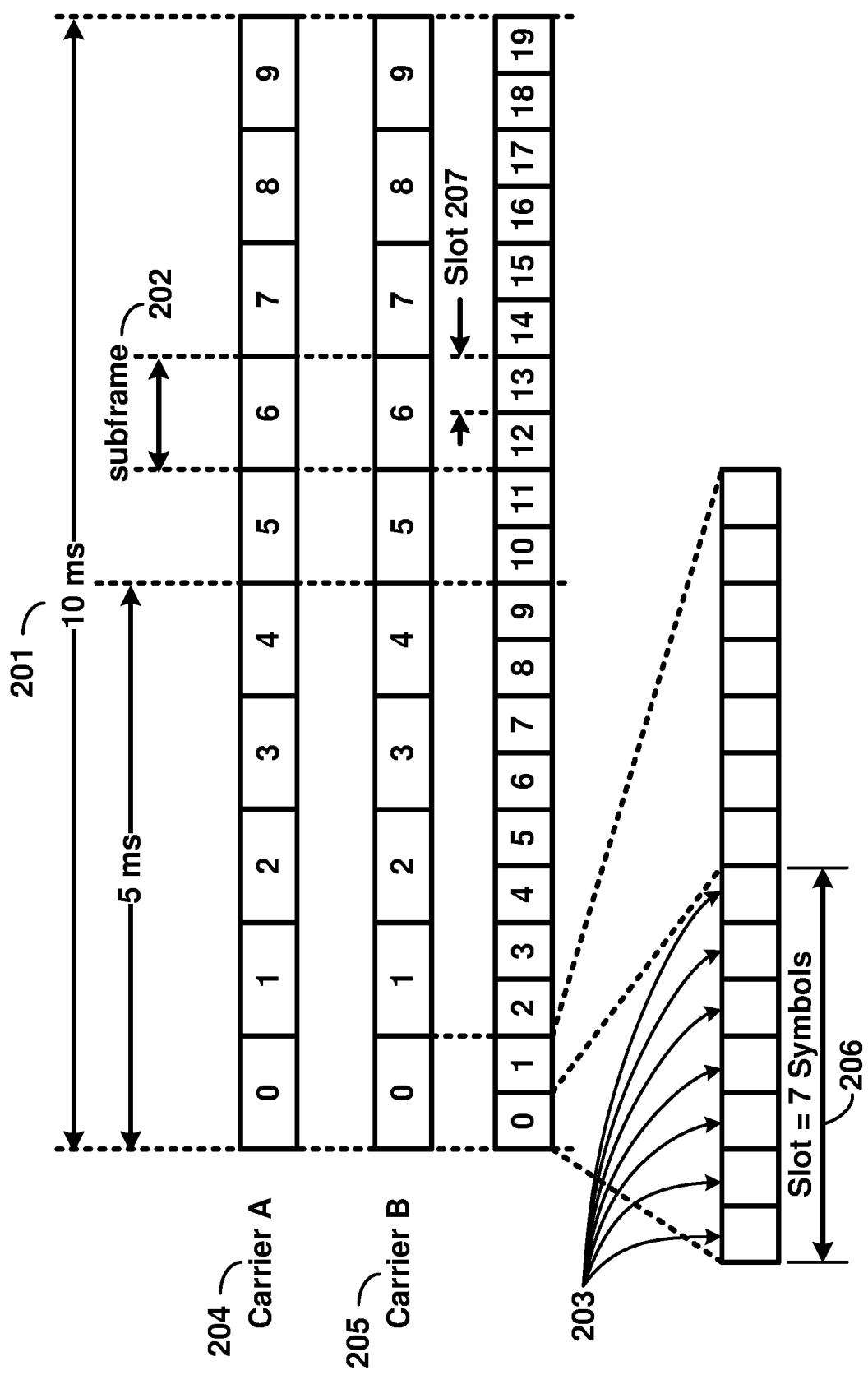
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
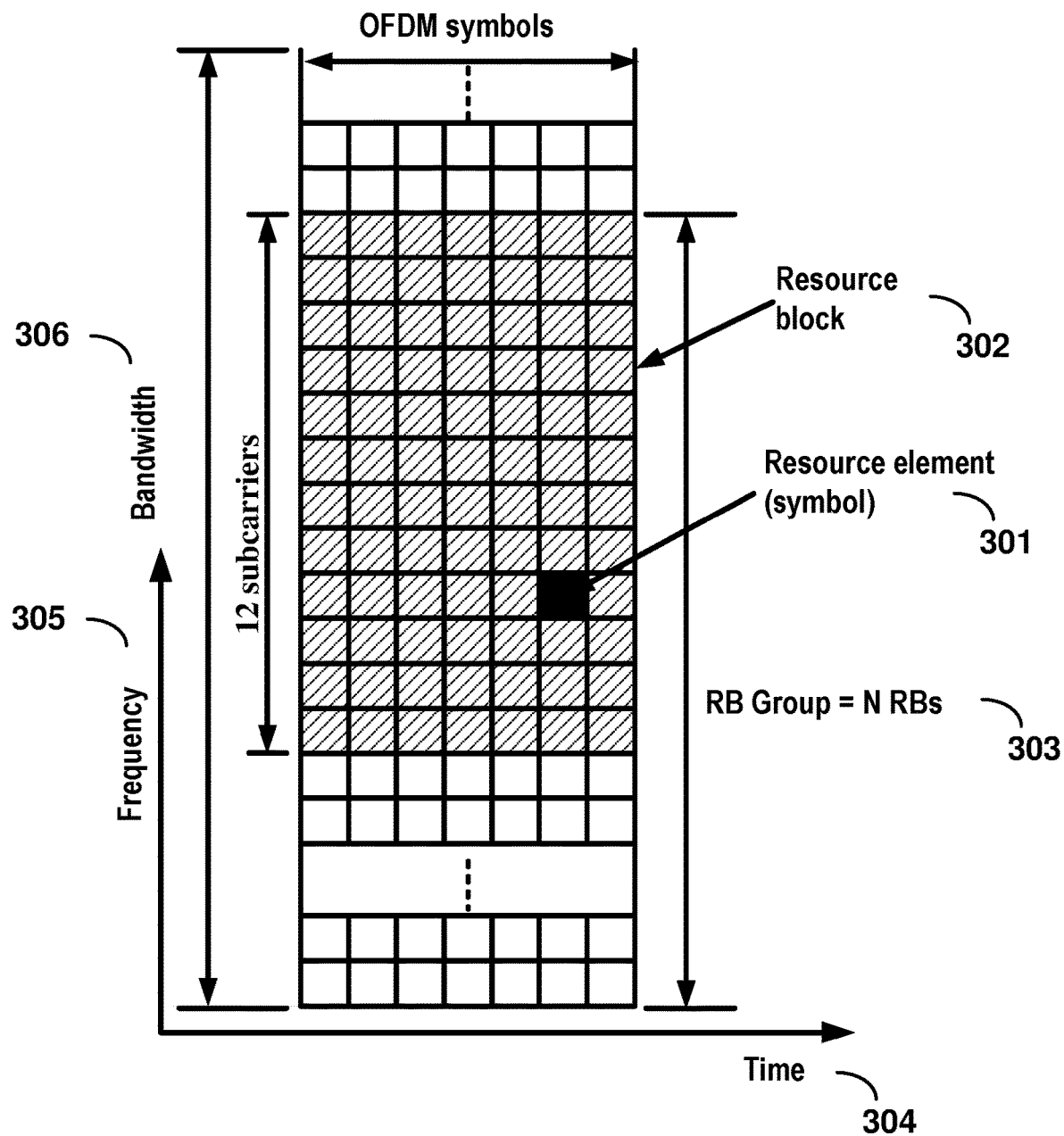
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
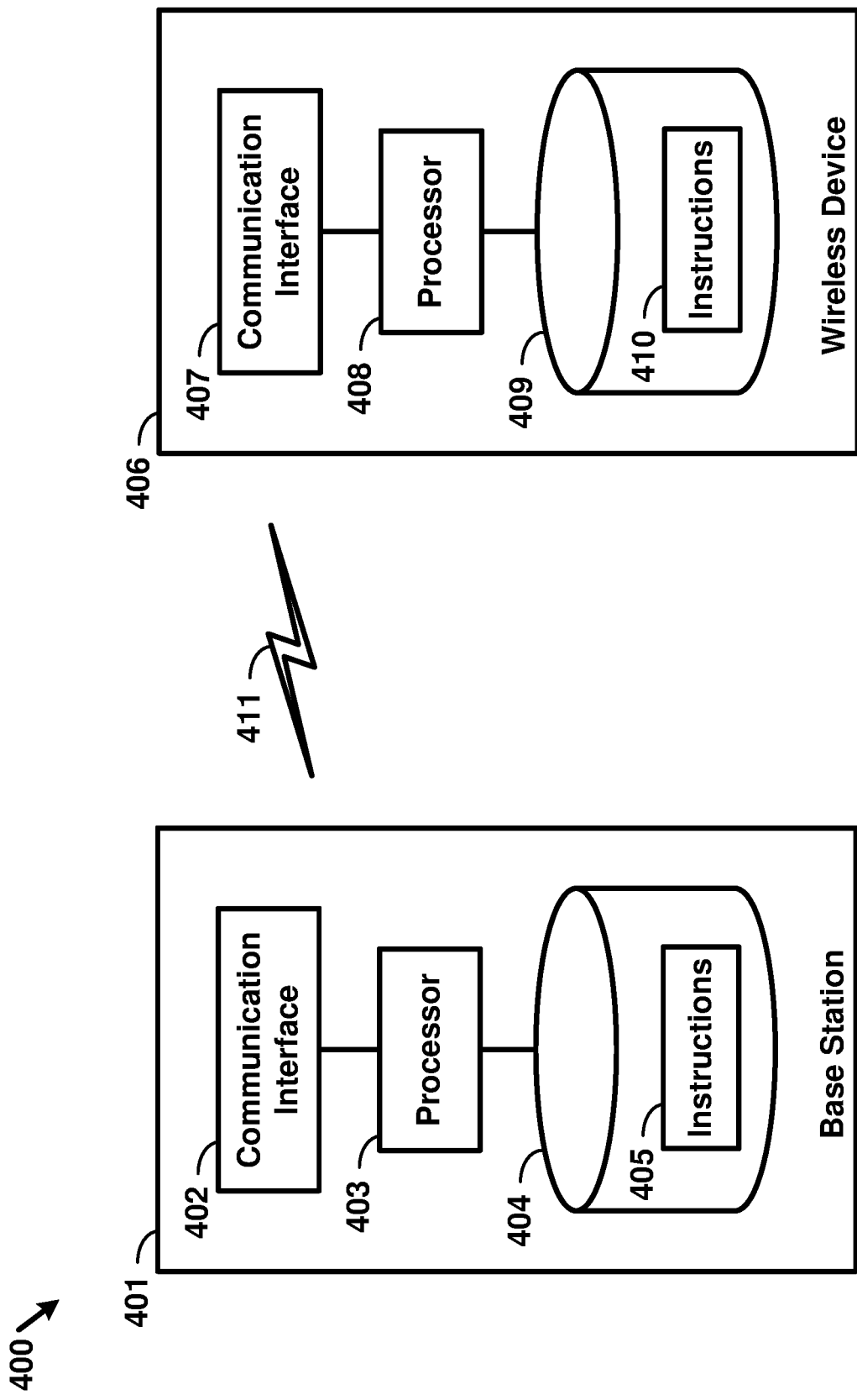
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
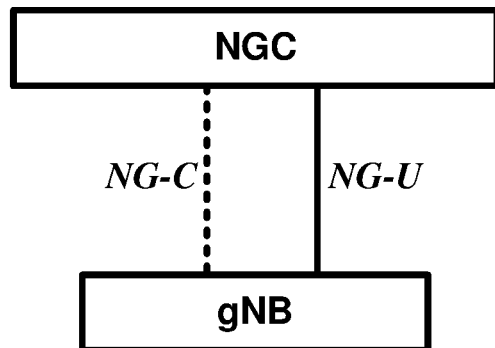
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
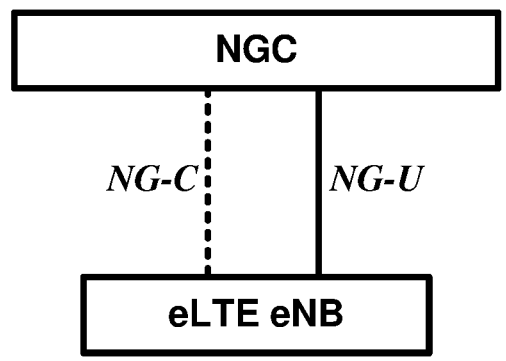

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
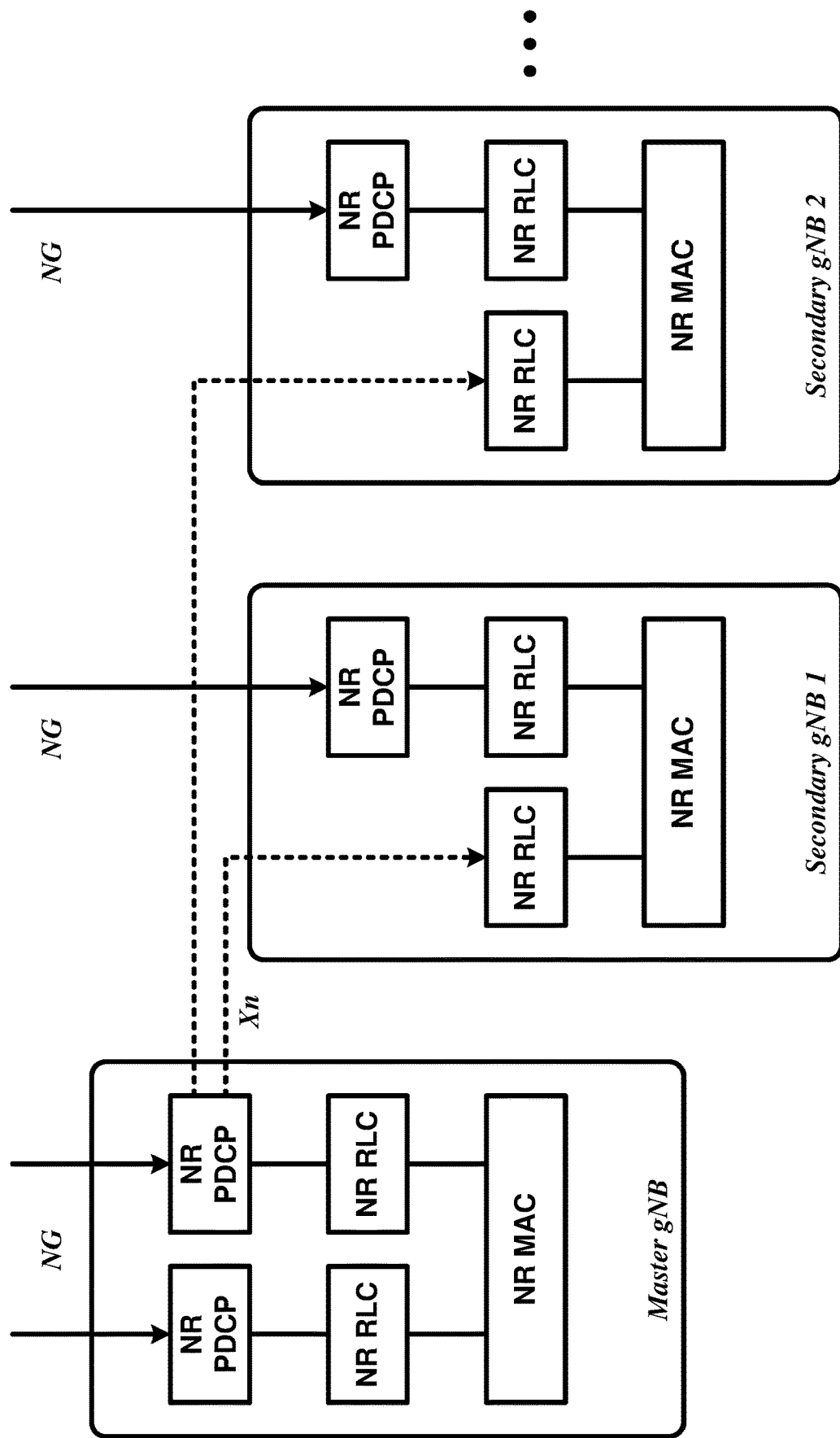
FIG. 6 is an example diagram for a protocol structure with multi-connectivity as per an aspect of an embodiment of the present disclosure.
Figure 7:
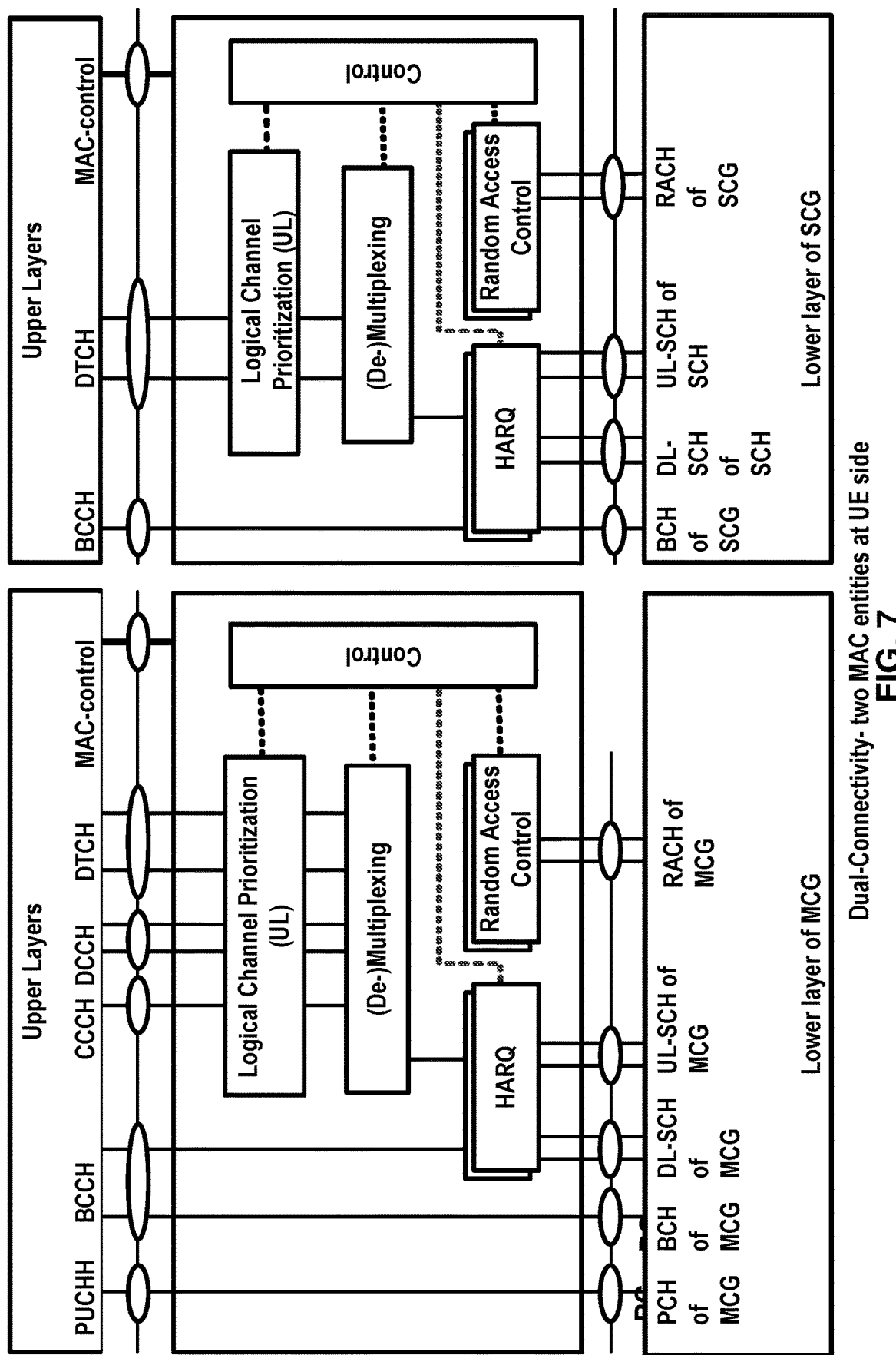
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as an MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
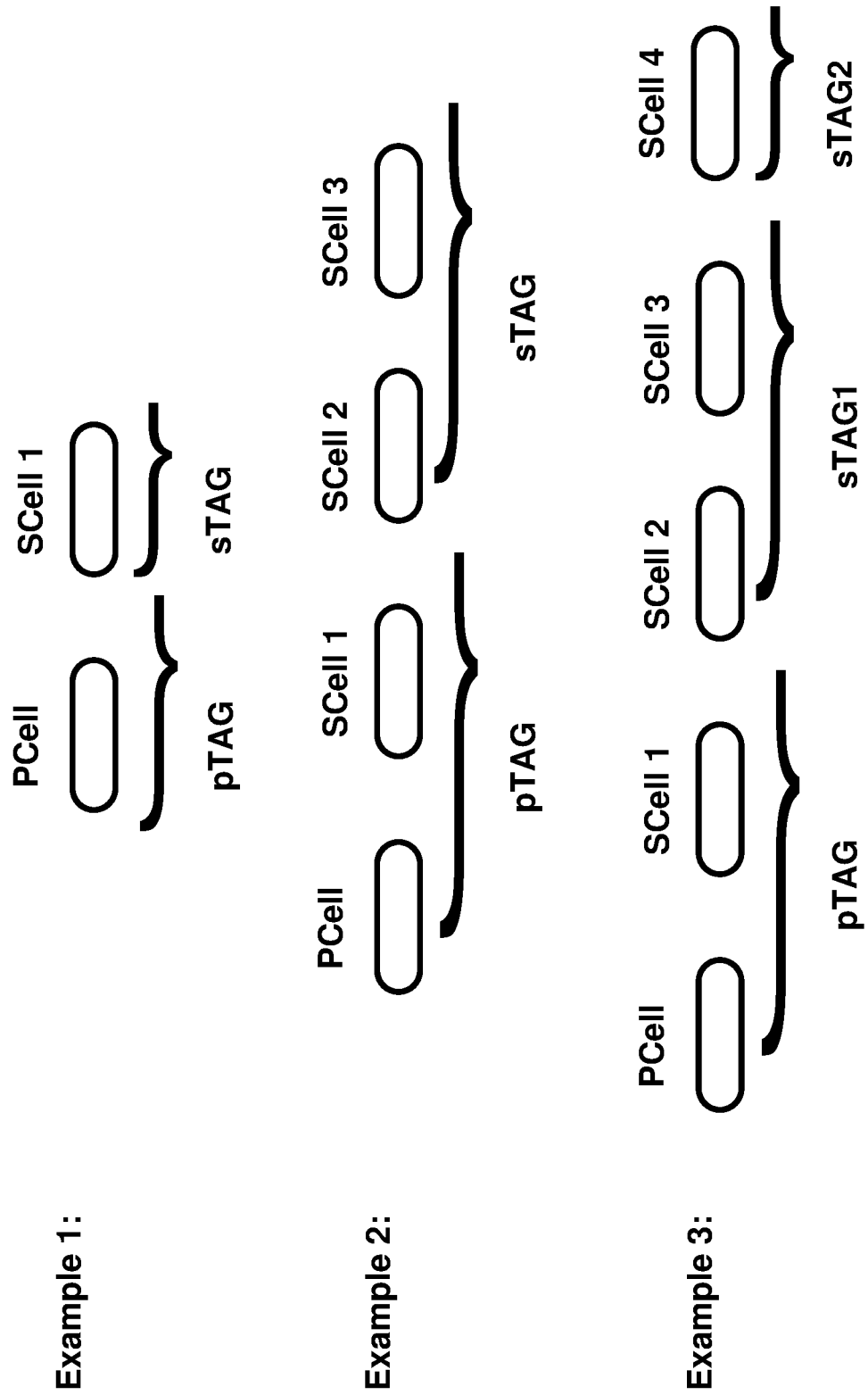
FIG. 8 shows example TAG configurations as per an aspect of an embodiment of the present disclosure.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
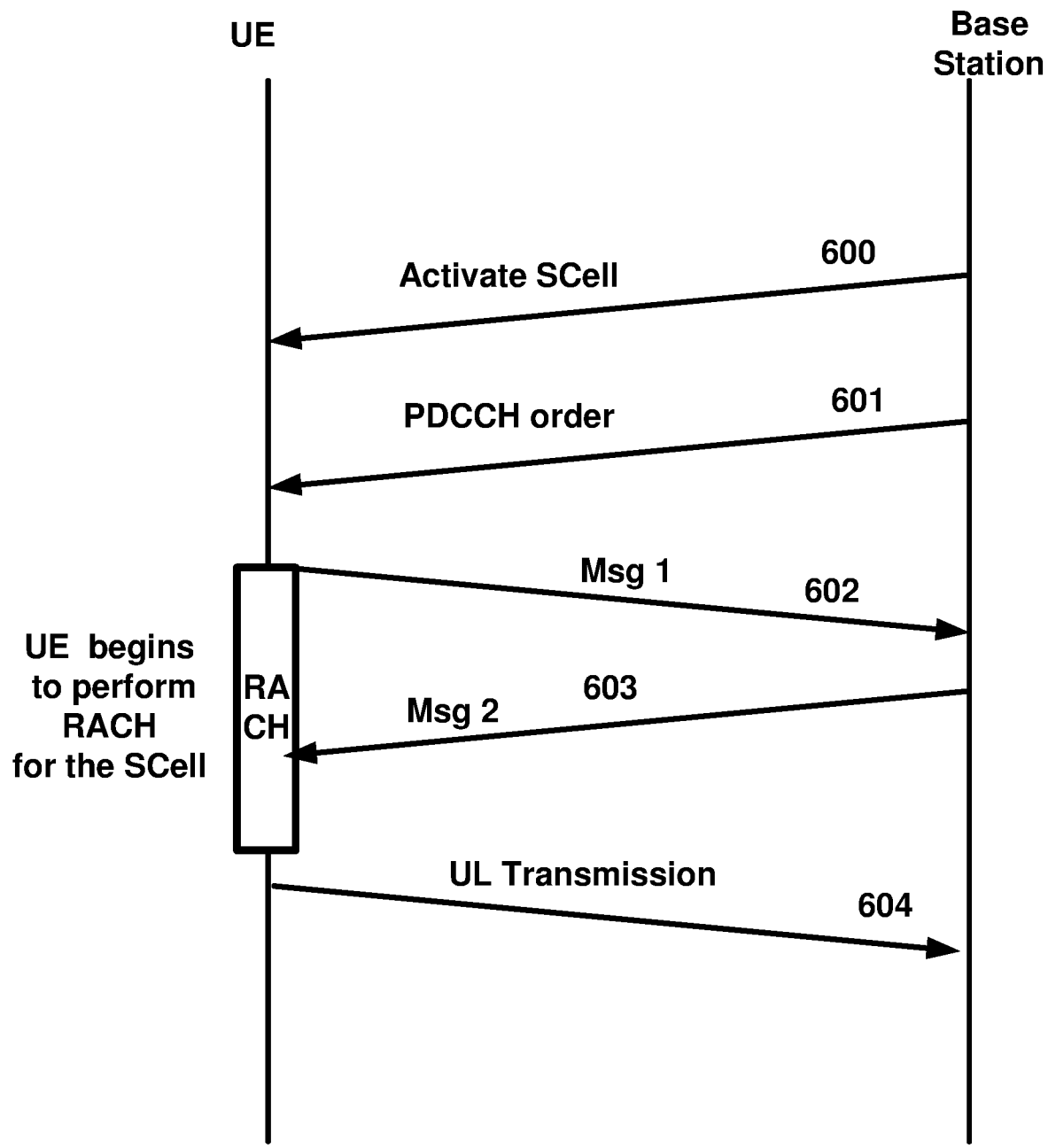
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
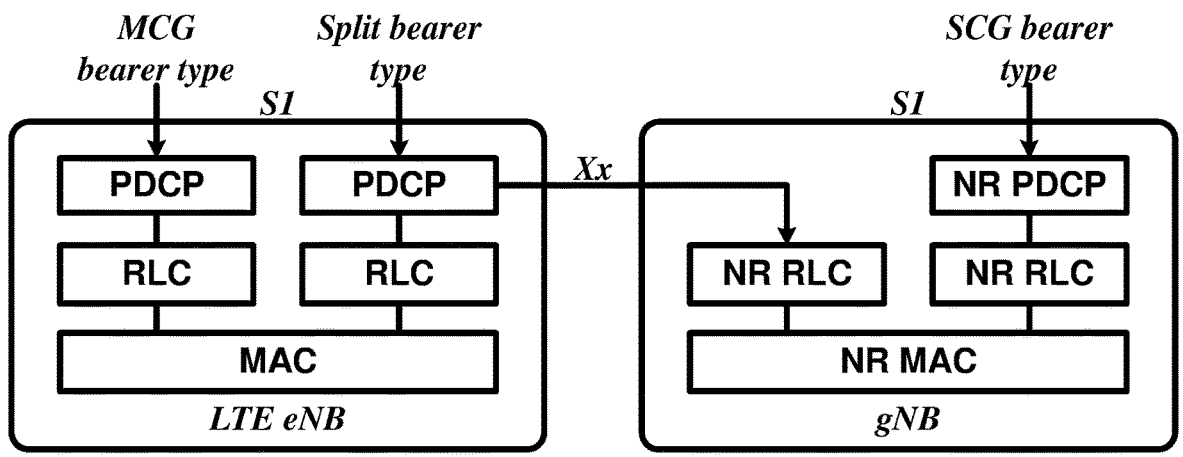
FIG. 12A, FIG. 12B, and FIG. 12C are example diagrams for radio protocol structures of tight interworking bearers as per an aspect of an embodiment of the present disclosure.
Figure 12B:
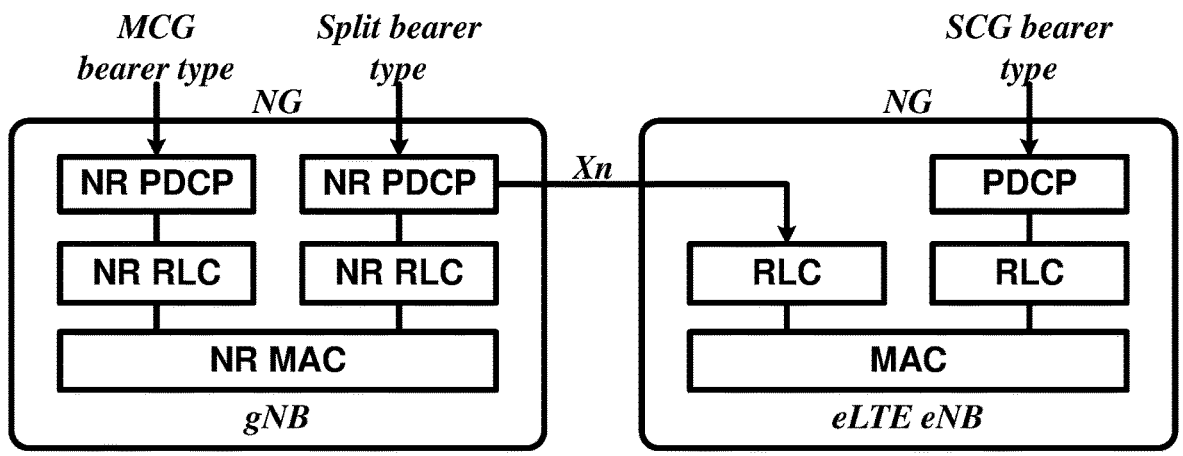
Figure 12C:
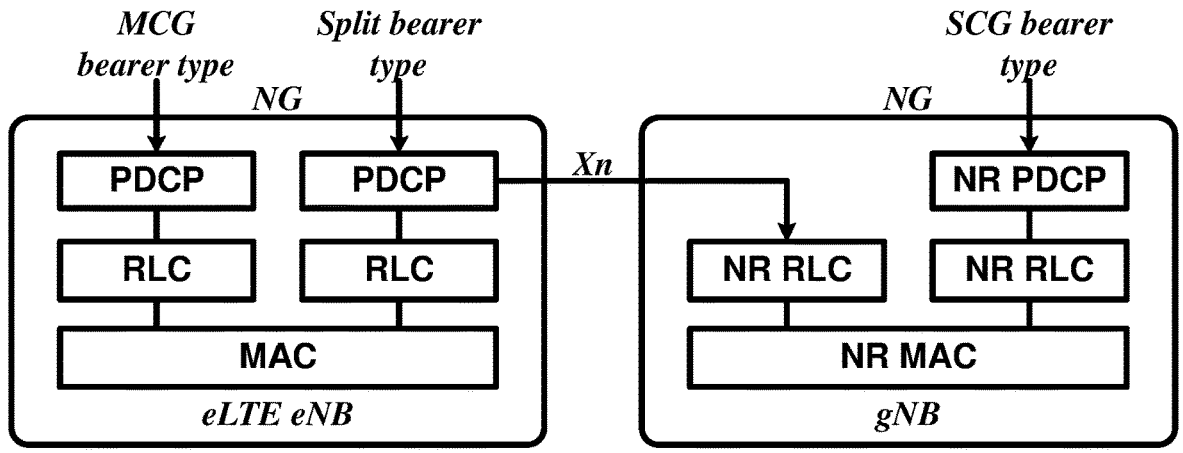

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
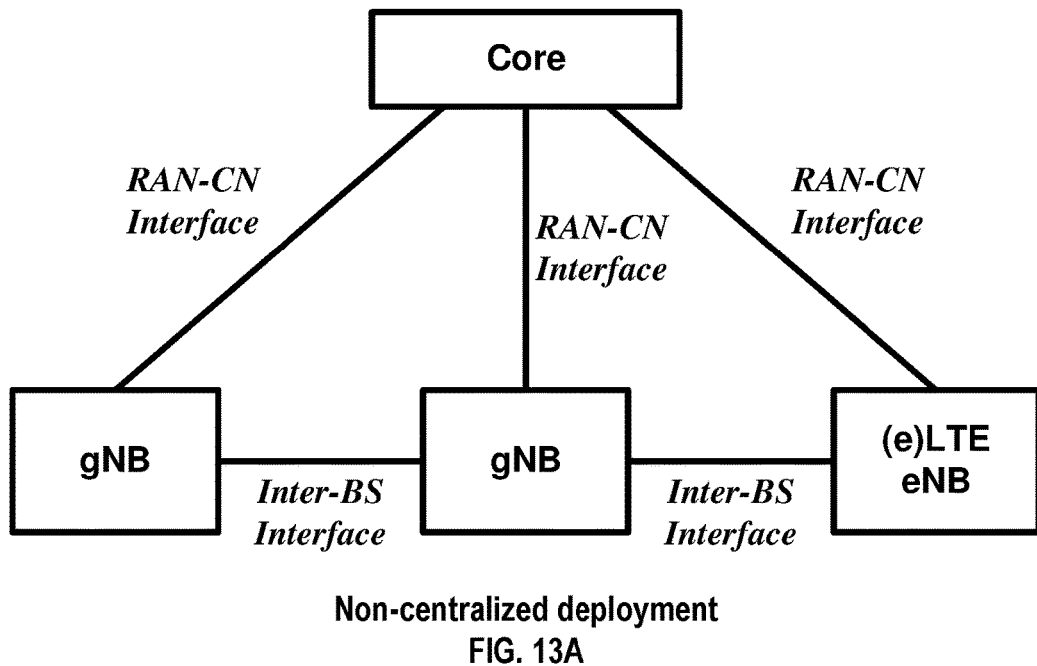
FIG. 13A and FIG. 13B are example diagrams for gNB deployment scenarios as per an aspect of an embodiment of the present disclosure.
Figure 13B:
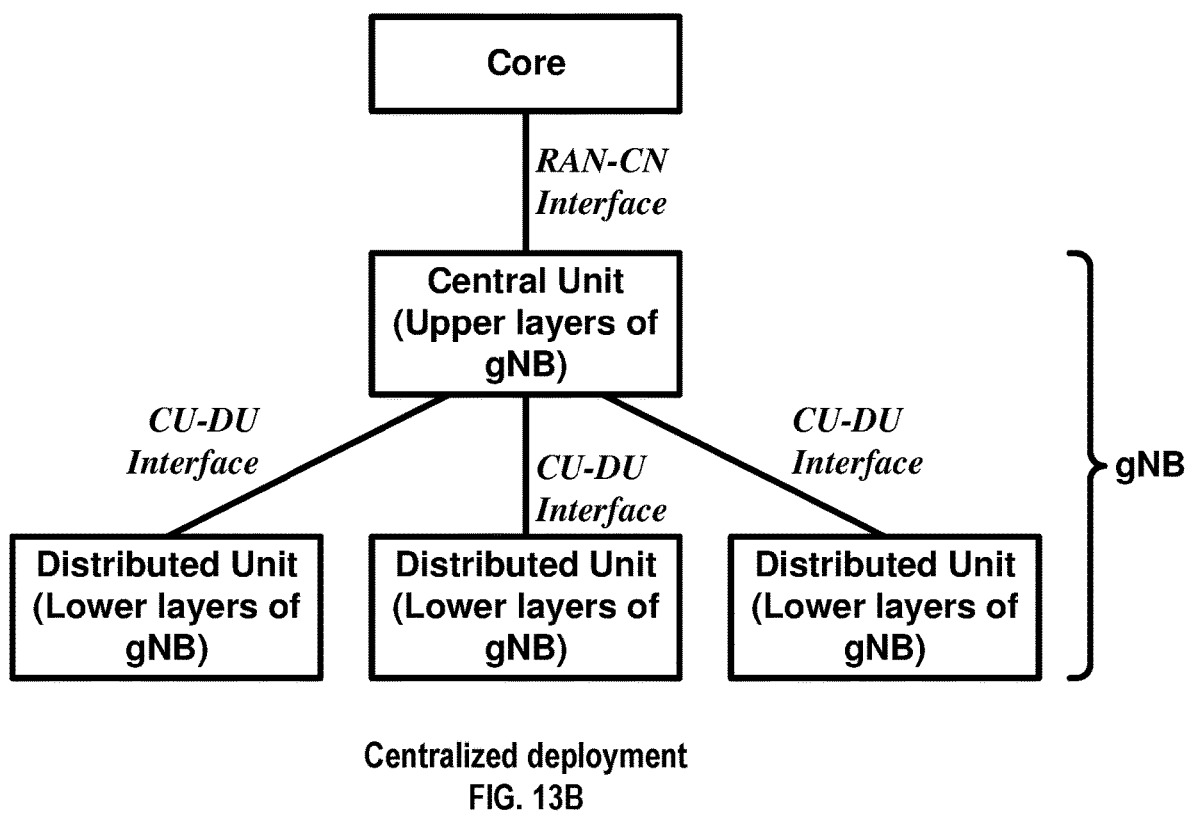

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
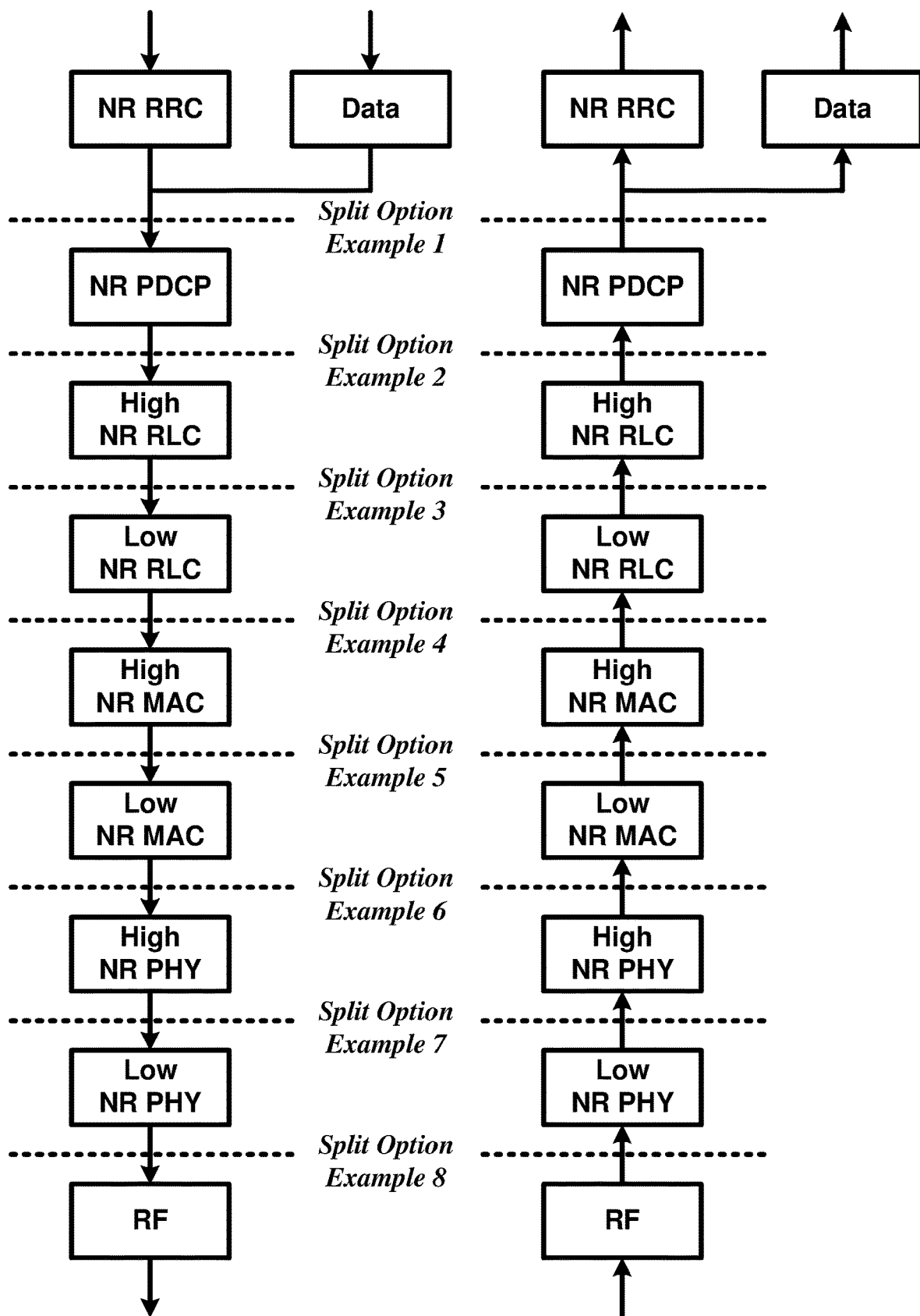
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time & frequency synchronization of wireless devices.

In an example embodiment, DL LAA design may employ subframe boundary alignment according to LTE-A carrier aggregation timing relationships across serving cells aggregated by CA. This may not imply that the base station transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple wireless devices in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from a base station perspective. In an example, in case of a base station operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
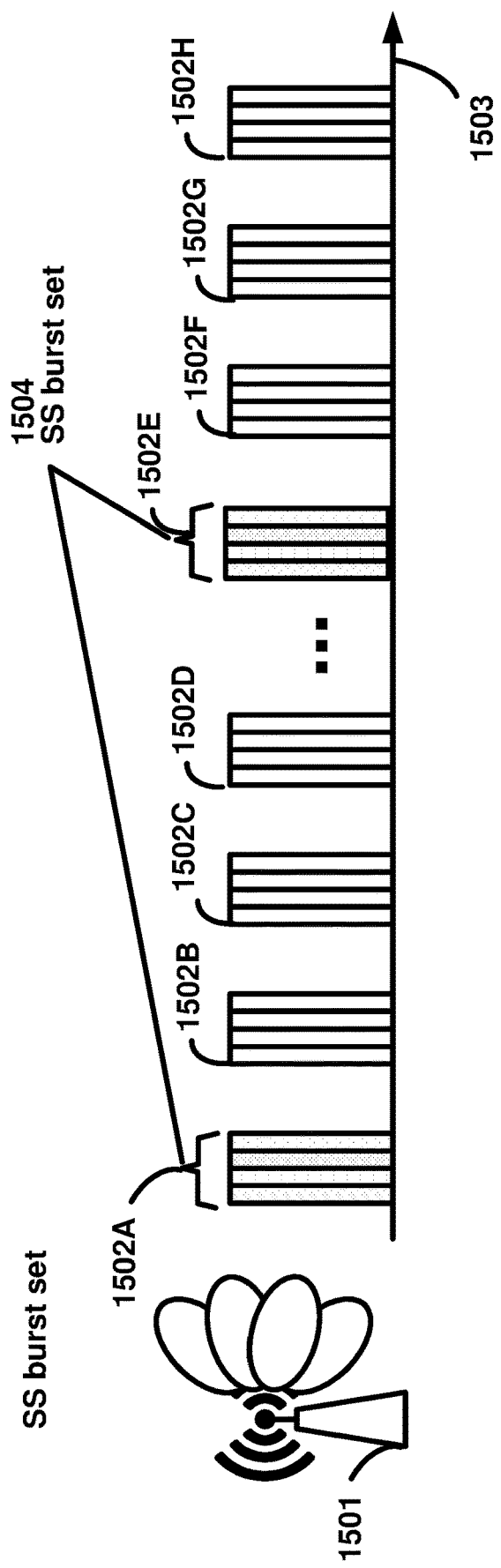
FIG. 15 is an example diagram for synchronization signal block transmissions as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figure 16B:
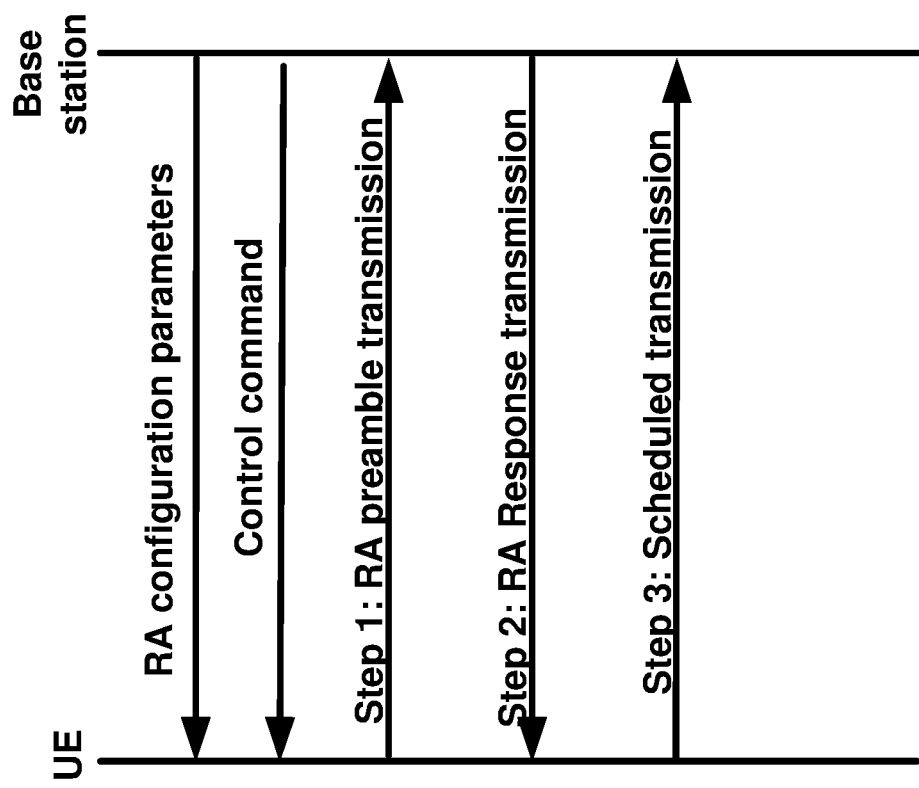
FIG. 16A and FIG. 16B are example diagrams of random access procedures as per an aspect of an embodiment of the present disclosure.
Figure 16A:
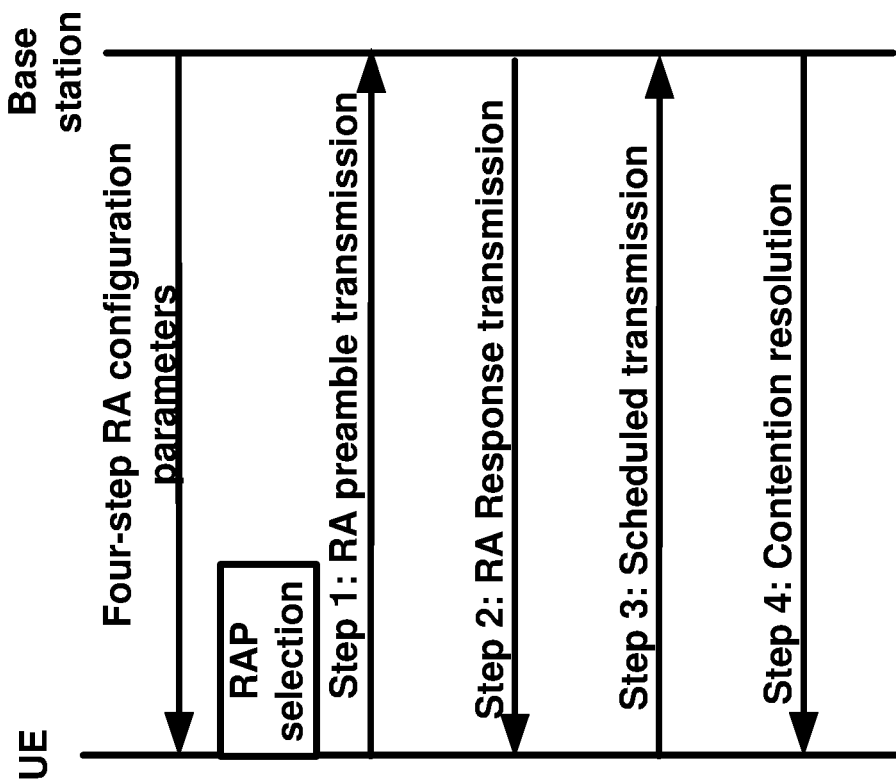

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-Radio Network Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is an index of a first subframe of a specified PRACH ($0 \leq t\_id < 10$), and f_id is an index of a specified PRACH within the subframe, in ascending order of frequency domain ($0 \leq f\_id < 6$). In an example, different types of UEs, e.g. NB-IoT, BL-UE, or UE-EC may employ different formulas for RA-RNTI calculations.

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs.

Figure 17:
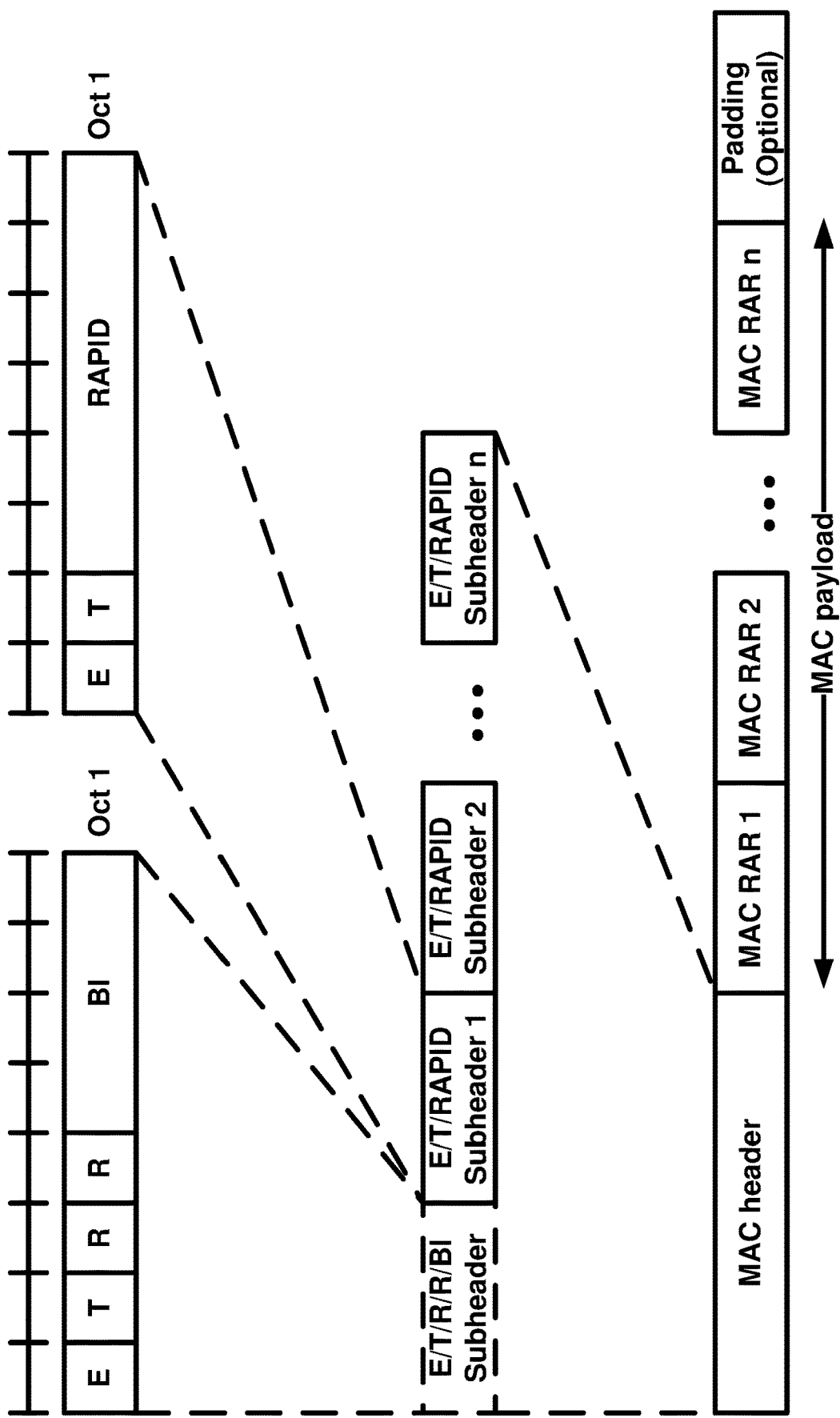
FIG. 17 is an example diagram of a MAC PDU comprising a RAR as per an aspect of an embodiment of the present disclosure.

FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR.

Figure 18A:
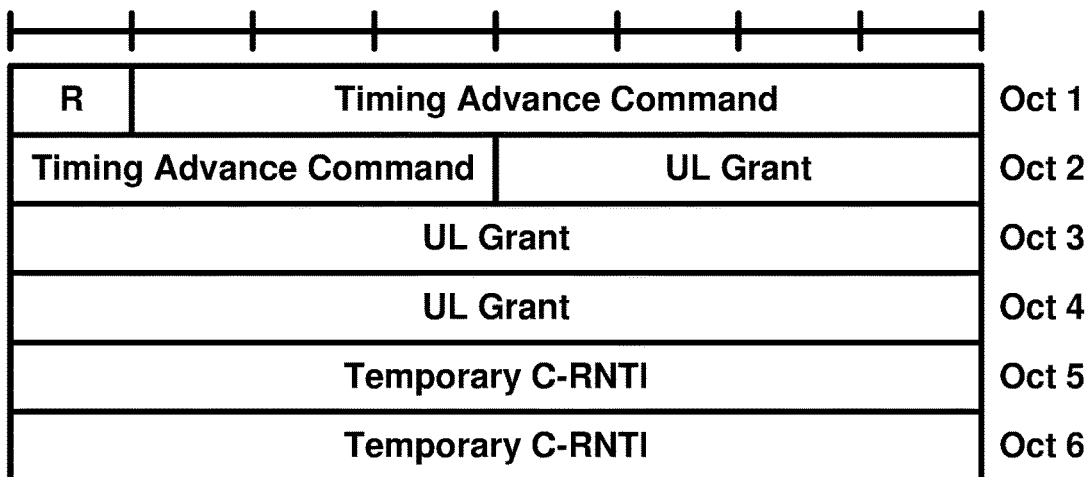
FIG. 18A, FIG. 18B and FIG. 18C are example diagrams of RAR MAC CEs as per an aspect of an embodiment of the present disclosure.
Figure 18B:
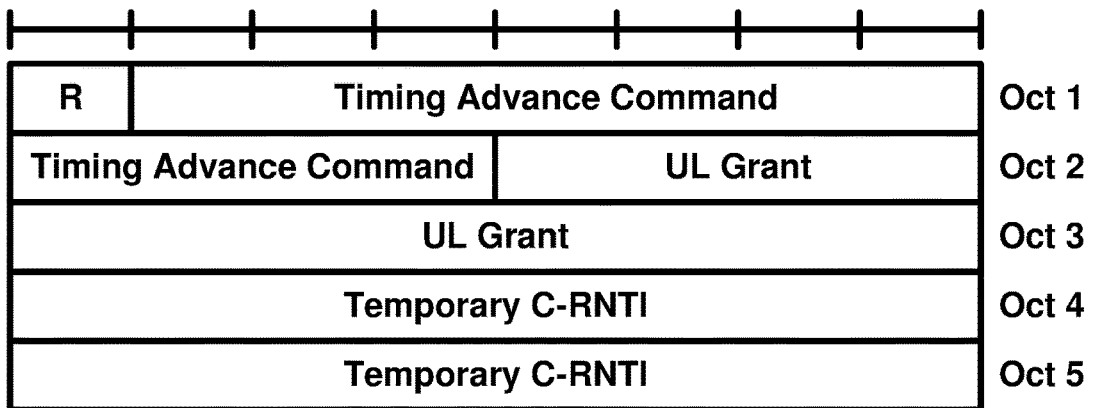
Figure 18C:
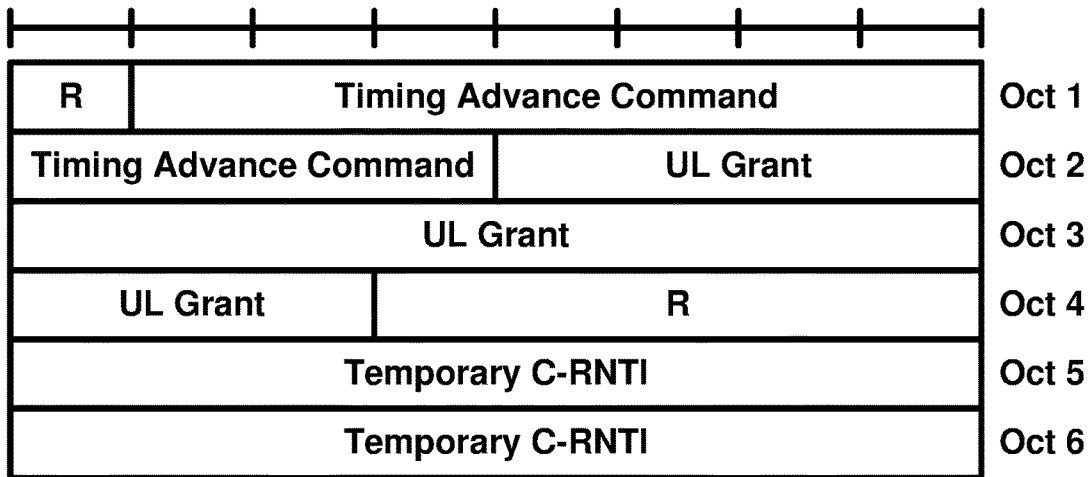

FIG. 18A, FIG. 18B and FIG. 18C show contents of a MAC RAR. Specifically, FIG. 18A shows the contents of a MAC RAR of a normal UE. FIG. 18B shows the contents of a MAC RAR of a MTC UE. FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 19:
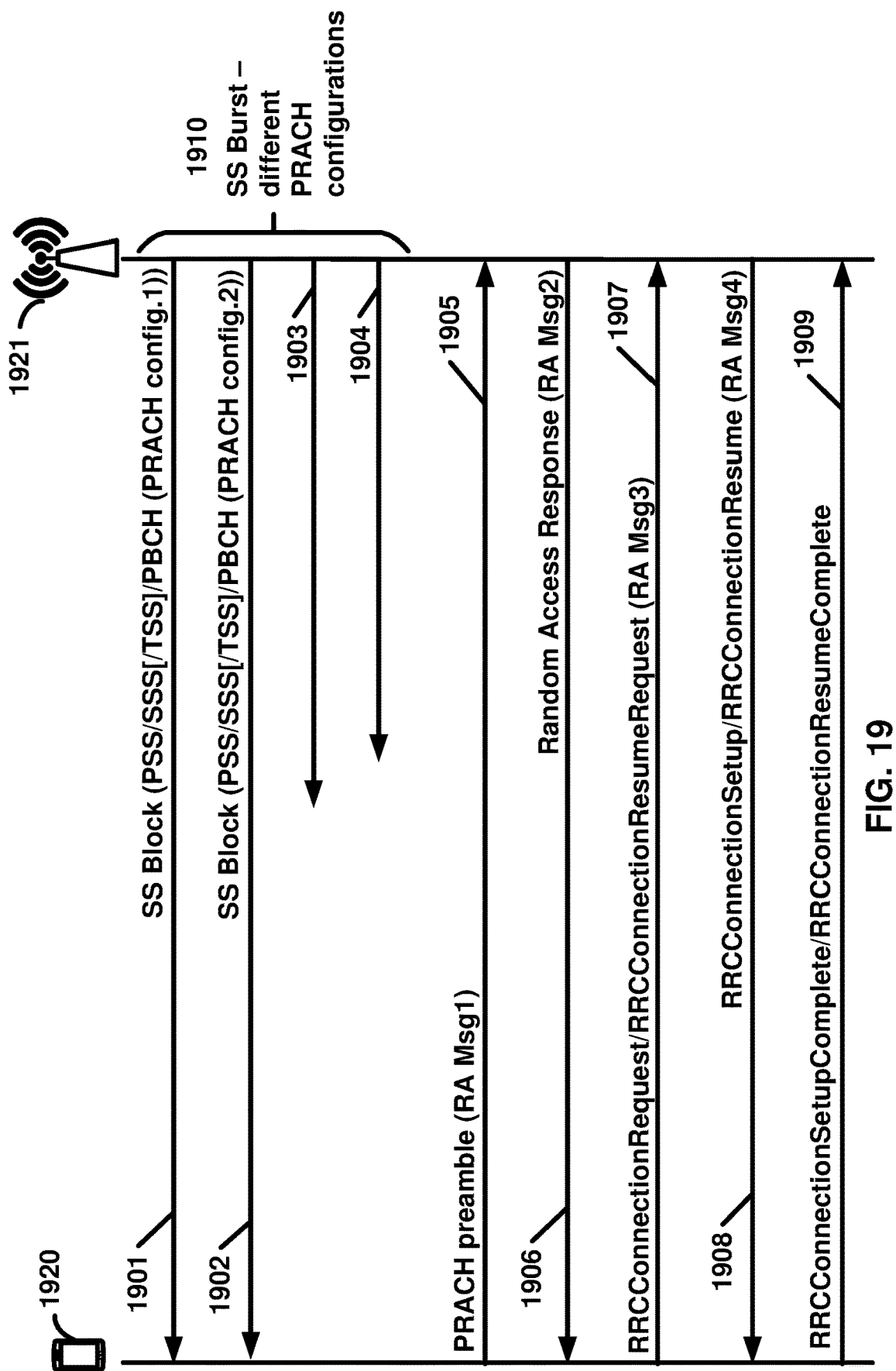
FIG. 19 is an example diagram for random access procedure when configured with multiple beams as per an aspect of an embodiment of the present disclosure.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, e.g., after or in response to receiving one or more SS blocks or SS bursts. The preamble may comprise a PRACH preamble and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, e.g., after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1621 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, e.g., after or in response to receiving the RAR. The base station 1921 may send to the wireless device 1920 an RRCConnectionSetup and/or RRCConnectionResume message, which may be referred to as RA Msg4, at step 1908, e.g., after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, e.g., after or in response to receiving the RRCConnectionSetup and/or RRCConnectionResume. An RRC connection may be established between the wireless device 1920 and the base station 1921, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 20:
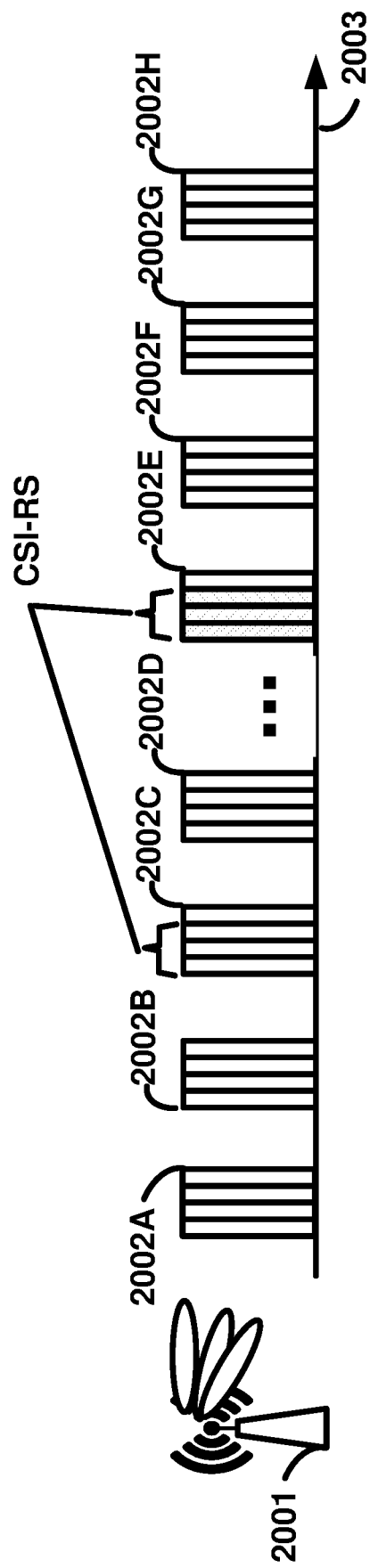
FIG. 20 is an example of channel state information reference signal transmissions when configured with multiple beams as per an aspect of an embodiment of the present disclosure.

FIG. 20 shows an example of transmitting CSI-RSs periodically for a beam. A base station 2001 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
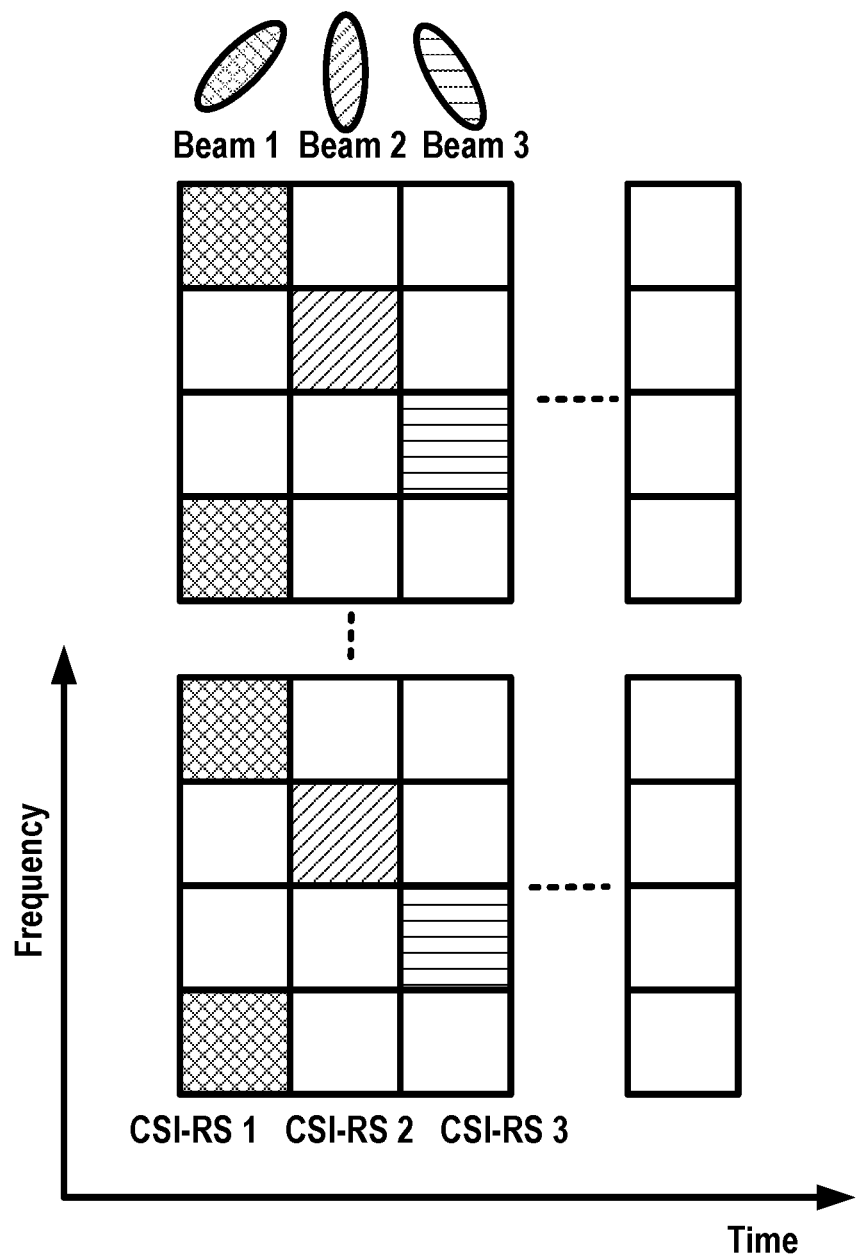
FIG. 21 is an example of channel state information reference signal transmissions when configured with multiple beams as per an aspect of an embodiment of the present disclosure.

FIG. 21 shows an example of a CSI-RS that may be mapped in time and frequency domains. Each square shown in FIG. 21 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 21 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in an RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 23A:
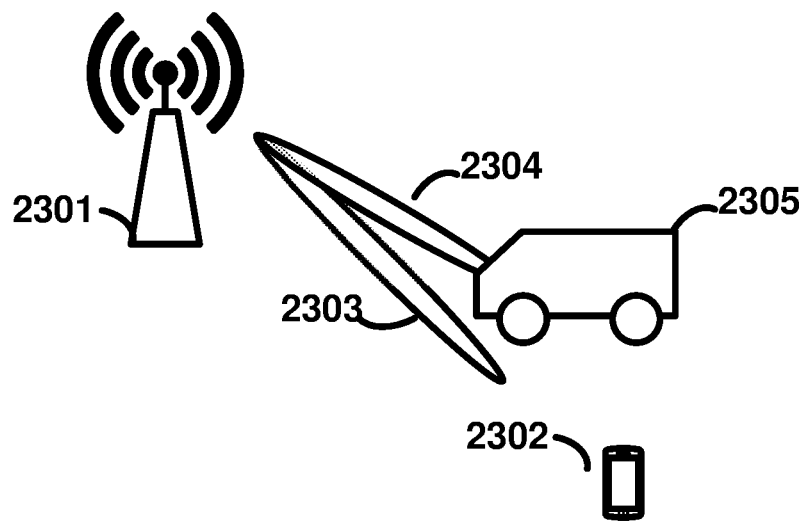
FIG. 23A is an example diagram for downlink beam failure scenario in a transmission receiving point (TRP) as per an aspect of an embodiment of the present disclosure.
Figure 23B:
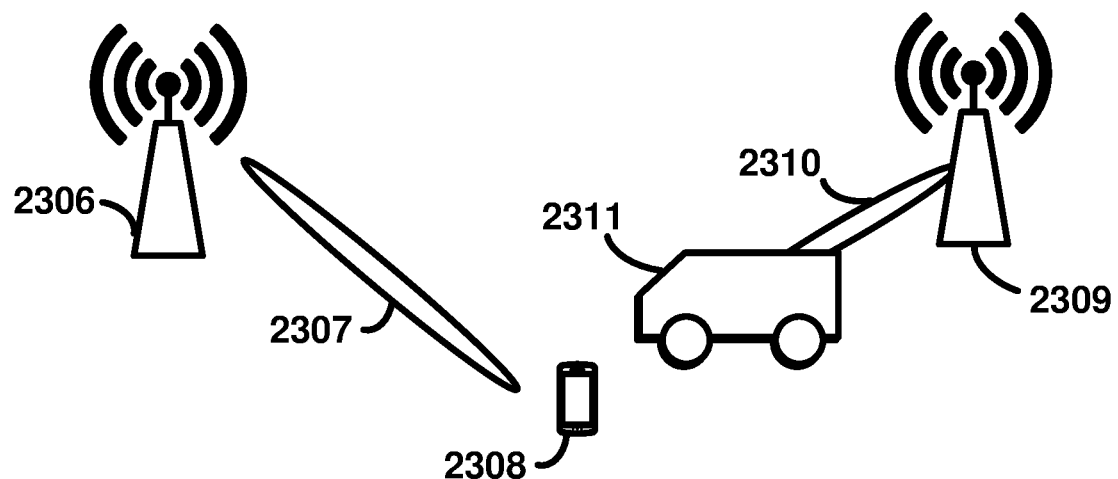
FIG. 23B is an example diagram for downlink beam failure scenario in multiple TRPs as per an aspect of an embodiment of the present disclosure.

A base station and/or a wireless device may perform a downlink L1/L2 beam management procedure. One or more downlink L1/L2 beam management procedures may be performed within one or multiple transmission and receiving points (TRPs), such as shown in FIG. 23A and FIG. 23B, respectively.

FIG. 22 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 2201, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 2201 uses beamforming.

A wireless device 2201 (e.g., a UE) and/or abase station 2202 (e.g., a gNB) may trigger a beam failure recovery mechanism. The wireless device 2201 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2201 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2202 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2201, and the channel characteristics from a transmission via a control channel to the wireless device, are similar or the same under a configured criterion.

FIG. 23A shows an example of a beam failure event involving a single TRP. A single TRP such as at a base station 2301 may transmit, to a wireless device 2302, a first beam 2303 and a second beam 2304. A beam failure event may occur if, e.g., a serving beam, such as the second beam 2304, is blocked by a moving vehicle 2305 or other obstruction (e.g., building, tree, land, or any object) and configured beams (e.g., the first beam 2303 and/or the second beam 2304), including the serving beam, are received from the single TRP. The wireless device 2302 may trigger a mechanism to recover from beam failure when a beam failure occurs.

FIG. 23B shows an example of a beam failure event involving multiple TRPs. Multiple TRPs, such as at a first base station 2306 and at a second base station 2309, may transmit, to a wireless device 2308, a first beam 2307 (e.g., from the first base station 2306) and a second beam 2310 (e.g., from the second base station 2309). A beam failure event may occur when, e.g., a serving beam, such as the second beam 2310, is blocked by a moving vehicle 2311 or other obstruction (e.g., building, tree, land, or any object) and configured beams (e.g., the first beam 2307 and/or the second beam 2310) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A gNB may respond a confirmation message to a UE after receiving one or multiple BFR request. The confirmation message may include the CRI associated with the candidate beam the UE indicates in the one or multiple BFR request. The confirmation message may be a L1 control information.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figures 24A, 24B:
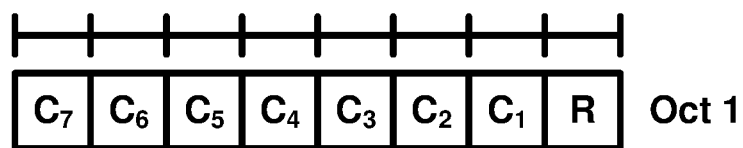
FIG. 24A is an example diagram for a secondary activation/deactivation medium access control control element (MAC CE) as per an aspect of an embodiment of the present disclosure.
FIG. 24B is an example diagram for a secondary activation/deactivation MAC CE as per an aspect of an embodiment of the present disclosure.

FIG. 24A shows an example of an SCell Activation/Deactivation MAC CE of one octet. A first MAC PDU subheader with a first LCID (e.g., '111010') may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

FIG. 24B shows an example of an SCell Activation/Deactivation MAC CE of four octets. A second MAC PDU subheader with a second LCID (e.g., '111001') may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 24A and/or FIG. 24B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 24A and FIG. 24B, an R field may indicate a reserved bit. The R field may be set to zero.

FIG. 25A and FIG. 25B show timeline when a UE receives a MAC activation command. When a UE receives a MAC activation command for a secondary cell in subframe n, the corresponding actions in the MAC layer shall be applied no later than the minimum requirement defined in 3GPP TS 36.133 or TS 38.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133 or TS 38.133, except for the actions related to CSI reporting which shall be applied in subframe n+8.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the SCell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivationTimer in the UE may not be in-sync with the corresponding sCellDeactivationTimer in the eNB. Also, eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors.

FIG. 26 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCIs may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, if a UE is configured with higher layer parameter, e.g., cif-InSchedulingCell, the carrier indicator field value may correspond to cif-InSchedulingCell.

In an example, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform CRC scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

Figure 27:
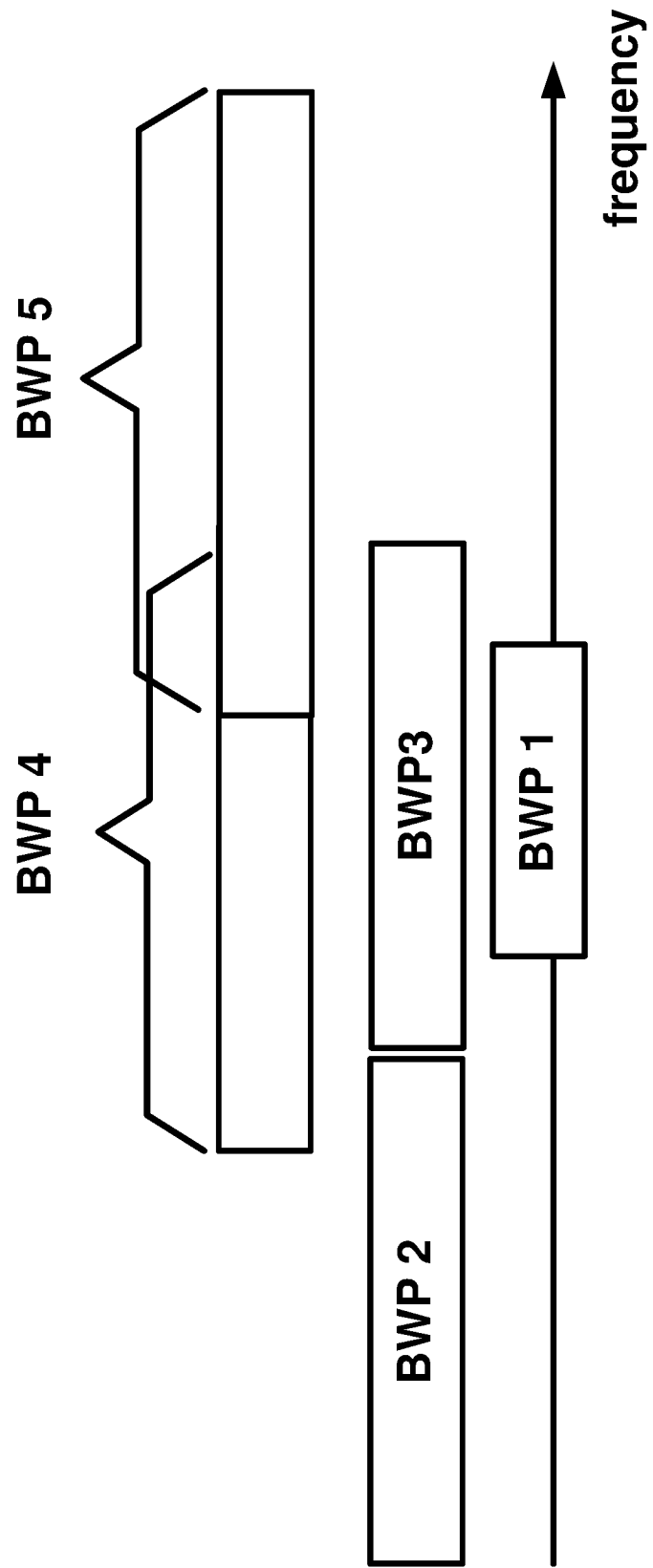
FIG. 27 is an example diagram for bandwidth part (BWP) configurations as per an aspect of an embodiment of the present disclosure.

FIG. 27 shows example of multiple BWPs configuration. A gNB may transmit one or more messages comprising configuration parameters of one or more bandwidth parts (BWP) of a cell. The cell may be a PCell or a SCell. The one or more messages may comprise: RRC connection reconfiguration message (e.g., RRCReconfiguration); RRC connection reestablishment message (e.g., RRCReestablishment); and/or RRC connection setup message (e.g., RRCSetup). The one or more BWPs may have different numerologies. A gNB may transmit one or more control information for cross-BWP scheduling to a UE. One BWP may overlap with another BWP in frequency domain.

In an example, a gNB may transmit one or more messages comprising configuration parameters of one or more DL and/or UL BWPs for a cell, with at least one BWP as the active DL or UL BWP, and zero or one BWP as the default DL or UL BWP. For the PCell, the active DL BWP may be the DL BWP on which the UE may monitor one or more PDCCH, and/or receive PDSCH. The active UL BWP is the UL BWP on which the UE may transmit uplink signal. For a secondary cell (SCell) if configured, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE. Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting or receiving, the UE may switch the BWP to the default BWP, which may reduce power consumption.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP. A gNB may transmit one or more messages comprising a BWP inactivity timer to a UE. The UE starts the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example, a BWP may be configured with: a subcarrier spacing, a cyclic prefix, a number of contiguous PRBs, an offset of the first PRB in the number of contiguous PRBs relative to the first PRB, or Q control resource sets if the BWP is a DL BWP.

In an example, on a SCell, there may be no initial active BWP since the initial access is performed on the PCell. For example, the initially activated DL BWP and/or UL BWP, when the SCell is activated, may be configured or reconfigured by RRC signaling. In an example, the default BWP of the SCell may also be configured or reconfigured by RRC signaling.

In an example, gNB may configure UE-specific default DL BWP other than initial active BWP after RRC connection, e.g., for the purpose of load balancing. The default BWP may support other connected mode operations (besides operations supported by initial active BWP), e.g., fall back and/or connected mode paging. In this case, the default BWP may comprise common search space, e.g., at least a search space needed for monitoring a pre-emption indication.

In an example, a DL BWP other than the initial active DL BWP may be configured to a UE as the default DL BWP. The reconfiguring the default DL BWP may be due to load balancing and/or different numerologies employed for active DL BWP and initial active DL BWP.

In an example, for a paired spectrum, DL and UL BWPs may be independently activated while, for an unpaired spectrum DL and UL BWPS are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, making an association between DL BWP and UL BWP may allow that one activation/deactivation command may switch both DL and UL BWPs at once. Otherwise, separate BWP switching commands may be necessary.

In an example, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, when a new BWP is activated, a configured downlink assignment may be initialized (if not active) or re-initialized (if already active) using PDCCH. In an example, via one or more RRC messages/signaling, a wireless device may be configured with at least one UL BWP, at least one DL BWP, and one or more configured grants for a cell. The one or more configured grants may be semi-persistent scheduling (SPS), Type 1 grant-free (GF) transmission/scheduling, and/or Type 2 GF transmission/scheduling. In an example, one or more configured grants may be configured per UL BWP. For example, one or more radio resources associated with one or more configured grants may not be defined/assigned/allocated across two or more UL BWPs.

In an example, an BWP may be in active during a period of time when a BWP inactivity timer is running. For example, a base station may transmit a control message to a wireless device to configure a first timer value of an BWP inactivity timer. The first timer value may determine how long a BWP inactivity timer runs, e.g., a period of time that a BWP inactivity timer runs. For example, the BWP inactivity timer may be implemented as a count-down timer from a first timer value down to a value (e.g., zero). In an example embodiment, the BWP inactivity timer may be implemented as a count-up timer from a value (e.g., zero) up to a first timer value down. In an example embodiment, the BWP inactivity timer may be implemented as a down-counter from a first timer value down to a value (e.g., zero). In an example embodiment, the BWP inactivity timer may be implemented as a count-up counter from a value (e.g., zero) up to a first timer value down. For example, a wireless device may restart a BWP inactivity timer (e.g., UL BWP and/or DL BWP inactivity timers) when the wireless device receives (and/or decodes) a DCI to schedule PDSCH(s) in its active BWP (e.g., its active UL BWP, its active DL BWP, and/or UL/DL BWP pair).

Figure 28:
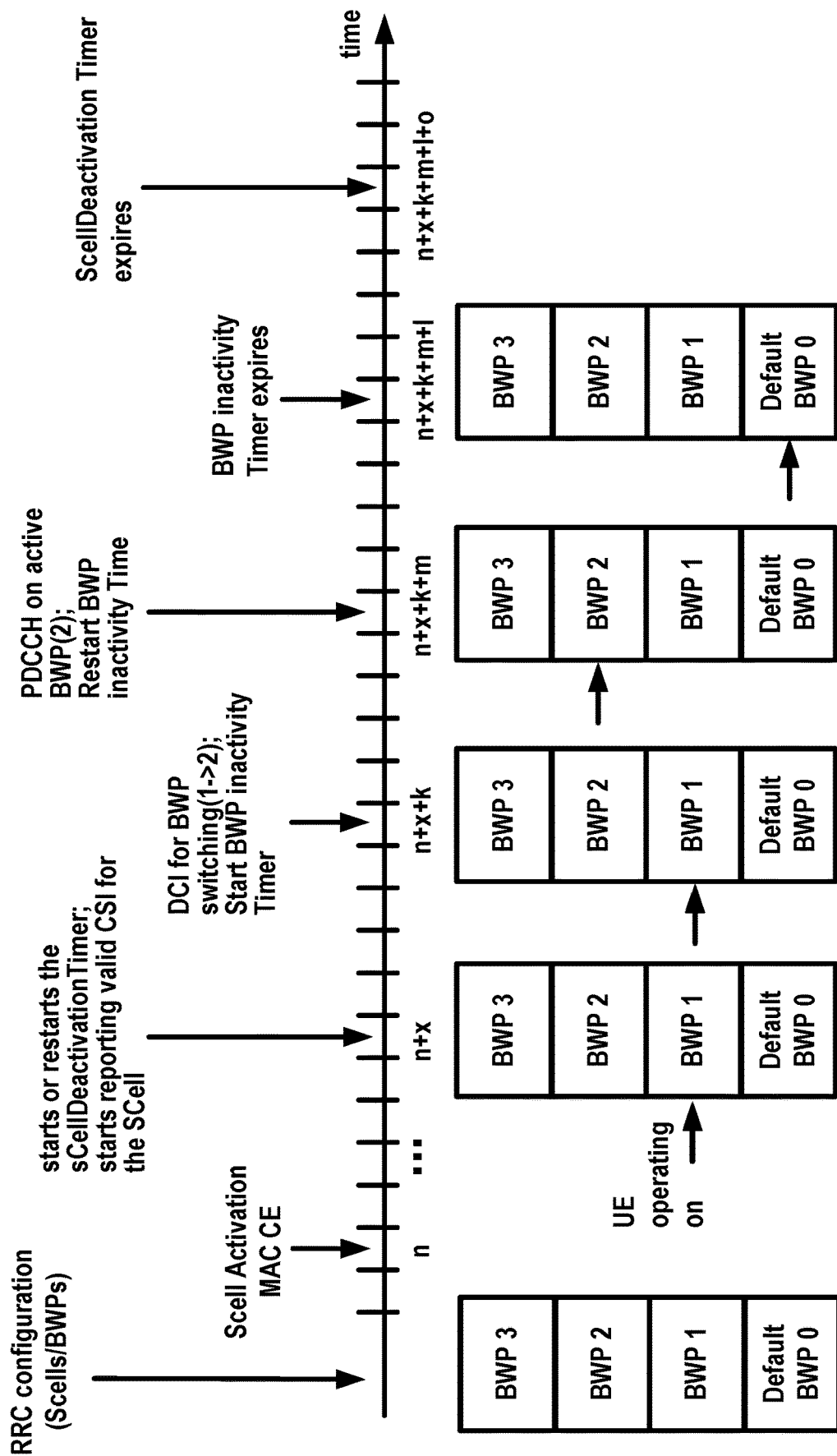
FIG. 28 is an example diagram for BWP operation in a secondary cell as per an aspect of an embodiment of the present disclosure.

FIG. 28 shows example of BWP switching mechanism. A UE may receive RRC message comprising parameters of a SCell and one or more BWP configuration associated with the SCell. Among the one or more BWPs, at least one BWP may be configured as the first active BWP (e.g., BWP 1 in FIG. 28), one BWP as the default BWP (e.g., BWP 0 in FIG. 28). The UE may receive a MAC CE to activate the SCell at the $n^{th}$ slot. The UE may start the sCellDeactivationTimer, and start CSI related actions for the SCell, and/or start CSI related actions for the first active BWP of the SCell at the $(n+x)^{th}$ slot. The UE may start the BWP inactivity timer at the $(n+x+k)^{th}$ slot in response to receiving a DCI indicating switching BWP from BWP 1 to BWP 2. When receiving a PDCCH indicating DL scheduling on BWP 2, for example, at the $(n+x+k+m)^{th}$ slot, the UE may restart the BWP inactivity timer. The UE may switch back to the default BWP (e.g., BWP 0) as an active BWP when the BWP inactivity timer expires, at the $(n+x+k+m+l)^{th}$ slot. The UE may deactivate the SCell when the sCellDeactivationTimer expires.

In an example, a BWP inactivity timer may be applied in a PCell. A base station may transmit one or more RRC messages comprising a BWP inactivity timer to a wireless device. The wireless device may start the BWP inactivity timer if the wireless devices switches its active DL BWP to a DL BWP other than the default DL BWP on the PCell. The wireless device may restart the BWP inactivity timer if it successfully decodes a DCI to schedule PDSCH(s) in its active DL BWP. The wireless device may switch its active DL BWP to the default DL BWP if the BWP inactivity timer expires.

In an example, employing the BWP inactivity timer may reduce UE's power consumption when the UE is configured with multiple BWPs on a cell (a PCell or a SCell). The UE may switch to a default BWP on the PCell or SCell when there is no activity on an active BWP (e.g., when the BWP inactivity timer expires).

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or semi-persistent (SP) CSI-RS. In an example, a CSI-RS resource set may comprise at least one of: one CSI-RS type (e.g., periodic, aperiodic, or semi-persistent); one or more CSI-RS resources comprising at least one of: CSI-RS resource configuration identity (or index); number of CSI-RS ports; CSI-RS configuration (symbol and RE locations in a subframe); CSI-RS subframe configuration (subframe location, offset, and/or periodicity in radio frame); CSI-RS power parameter; CSI-RS sequence parameter; CDM type parameter; frequency density; transmission comb; and/or QCL parameters.

In an example, one or more CSI-RS resources may be transmitted periodically, using aperiodic transmission, using a multi-shot transmission, and/or using a SP transmission. In a periodic transmission, the configured CSI-RS resource may be transmitted using a configured periodicity in time domain. In an aperiodic transmission, the configured CSI-RS resource may be transmitted in a dedicated time slot or subframe. In a multi-shot or SP transmission, the configured CSI-RS resource may be transmitted within a configured period. In an example, a gNB may transmit one or more SP CSI-RSs with a periodicity. The gNB may stop transmission of the one or more SP CSI-RSs if the CSI-RS is configured with a transmission duration. The gNB may stop transmission of the one or SP CSI-RSs in response to transmitting a MAC CE or DCI for deactivating (or stopping the transmission of) the one or more SP CSI-RSs.

In an example, a CSI reporting setting may comprise at least one of: one report configuration identifier; one report type; one or more reported CSI parameter(s); one or more CSI type (e.g., type I or type II); one or more codebook configuration parameters; one or more parameters indicating time-domain behavior; frequency granularity for CQI and PMI; and/or measurement restriction configurations. The report type may indicate a time domain behavior of the report (aperiodic, SP, or periodic). The CSI reporting setting may further comprise at least one of: one periodicity parameter; one duration parameter; and/or one offset (e.g., in unit of slots), if the report type is a periodic or SP report. The periodicity parameter may indicate a periodicity of a CSI report. The duration parameter may indicate a duration of CSI report transmission. The offset parameter may indicate value of timing offset of CSI report.

In an example, a CSI measurement setting may comprise one or more links comprising one or more link parameters.

The link parameter may comprise at least one of: one CSI reporting setting indication, CSI-RS resource setting indication, and one or more measurement parameters.

FIG. 29 shows example of various CSI report triggering mechanisms. In an example, a gNB may trigger a CSI reporting by transmitting an RRC message, or a MAC CE, or a DCI, as shown in FIG. 29. In an example, a UE may perform periodic CSI reporting (e.g., P-CSI reporting in FIG. 29) based on an RRC message and one or more periodic CSI-RSs. In an example, a UE may not be allowed (or required) to perform periodic CSI reporting based on one or more aperiodic CSI-RSs and/or one or more SP CSI-RSs. In an example, a UE may perform SP CSI reporting (e.g., SP-CSI reporting in FIG. 29) based on a MAC CE and/or a DCI and based on one or more periodic or SP CSI-RSs. In an example, a UE may not be allowed (or required) to perform SP CSI reporting based on one or more aperiodic CSI-RSs. In an example, a UE may perform aperiodic CSI reporting (e.g., Ap-CSI reporting in FIG. 29) based on a DCI and based on one or more periodic, SP, or aperiodic CSI-RSs. In an example, a wireless device may perform a SP CSI reporting on a PUCCH in response to the SP CSI reporting being activated (or triggered) by a MAC CE. The wireless device may perform a SP CSI reporting on a PUSCH in response to the SP CSI reporting being activated (or triggered). In an example, a base station may instruct (e.g., by transmitting the MAC CE) a wireless device to perform SP CSI reporting on PUCCH when a compact CSI (e.g., small amount of report contents) is required by the base station, or DCI transmission is not convenient for the base station, and/or the CSI is not urgently required by the base station. In an example, a base station may instruct (e.g., by transmitting the DCI) a wireless device to perform SP CSI reporting on PUSCH when a large-sized CSI (e.g., big amount of report contents) is required by the base station, or a DCI transmission is convenient for the base station, and/or the CSI is urgently required by the base station.

Figure 30:
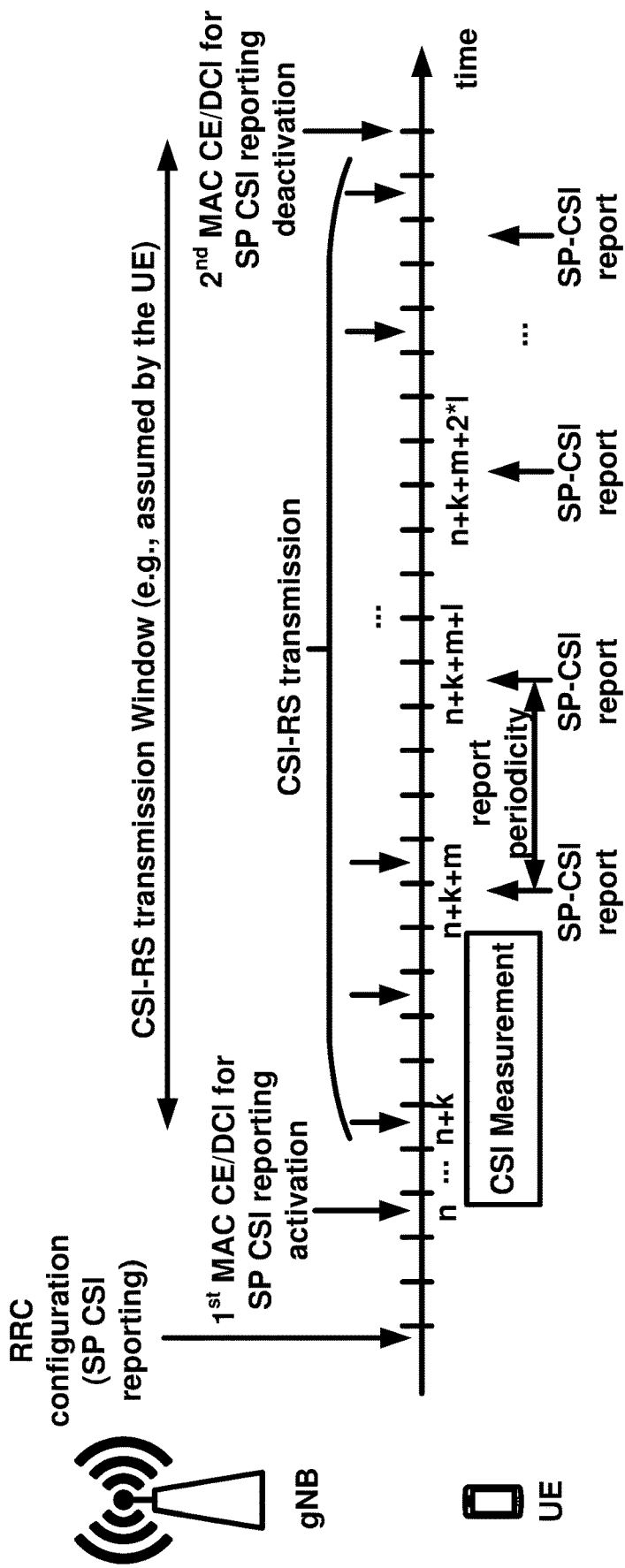
FIG. 30 is an example diagram for semi-persistent CSI reporting mechanism as per an aspect of an embodiment of the present disclosure.

FIG. 30 shows an example of SP CSI reporting in a cell. In an example, a base station (e.g., gNB in FIG. 30) may transmit to a wireless device (e.g., UE in FIG. 30) one or more RRC messages comprising configuration parameters of one or more SP CSI reporting configurations. The base station may transmit to the wireless device, at slot (or subframe) n, a $1^{st}$ MAC CE or DCI indicating an activation of a SP CSI reporting configuration of the one or more SP CSI reporting configurations. The base station may start transmitting one or more SP CSI-RSs at slot (or subframe) n+k. In an example, k may be zero or an integer greater than zero, configured by an RRC message, or be predefined as a fixed value.

As shown in FIG. 30, after or in response to receiving the $1^{st}$ MAC CE or the $1^{st}$ DCI, the wireless device may perform CSI measurements on one or more CSI-RSs according to the activated SP CSI reporting configuration. In an example, after or in response to receiving the $1^{st}$ MAC CE or the $1^{st}$ DCI, the wireless device may transmit one or more SP CSI reports (e.g., based on the CSI measurements) at slot/subframe n+k+m, n+k+m+l, n+k+m+2*l, etc., with a periodicity of l subframes (or slots). The periodicity may be configured in an RRC message. In an example, the UE may receive a $2^{nd}$ MAC/DCI indicating a deactivation of the SP CSI reporting configuration. After receiving the $2^{nd}$ MAC/DCI, or in response to the $2^{nd}$ MAC/DCI, the UE may stop transmitting the one or more SP CSI reports. In an example, k may be zero (configured, or predefined). In an example, m (e.g., when k=0) may be a time offset between the wireless device receives the $1^{st}$ MAC CE/DCI for activation of the SP CSI reporting and the wireless device transmits a first SP CSI report of the one or more SP CSI reports. In an example, m may be configured by an RRC message, or be predefined as a fixed value. A value of m may depend on the capability of a UE and/or the network.

As shown in FIG. 30, a wireless device may assume a CSI-RS transmission period (e.g., CSI-RS transmission Window in FIG. 30), in response to a $1^{st}$ MAC CE/DCI for activation of a SP CSI reporting configuration and based on one or more configuration parameters of the activated SP CSI reporting configuration. The base station may transmit one or more CSI-RSs at least in the CSI-RS transmission period, based on the activated SP CSI reporting configuration. In an example, the wireless device may perform CSI measurements on the one or more CSI-RSs transmitted in the CSI-RS transmission period.

In existing technologies, a base station may transmit a DCI to a UE to trigger a Semi-Persistent Scheduling (SPS) assignment for some types (e.g., VoIP, V2X) of data transmission. When the UE receives the DCI triggering the SPS assignment for downlink transmission or uplink transmission, the UE may keep receiving downlink packets via a PDSCH or keep transmitting uplink packets via a PUSCH. The PDSCH or the PUSCH may be indicated in the DCI. By doing so, the base station may reduce downlink signaling transmission for some types of data transmission.

Figure 31:
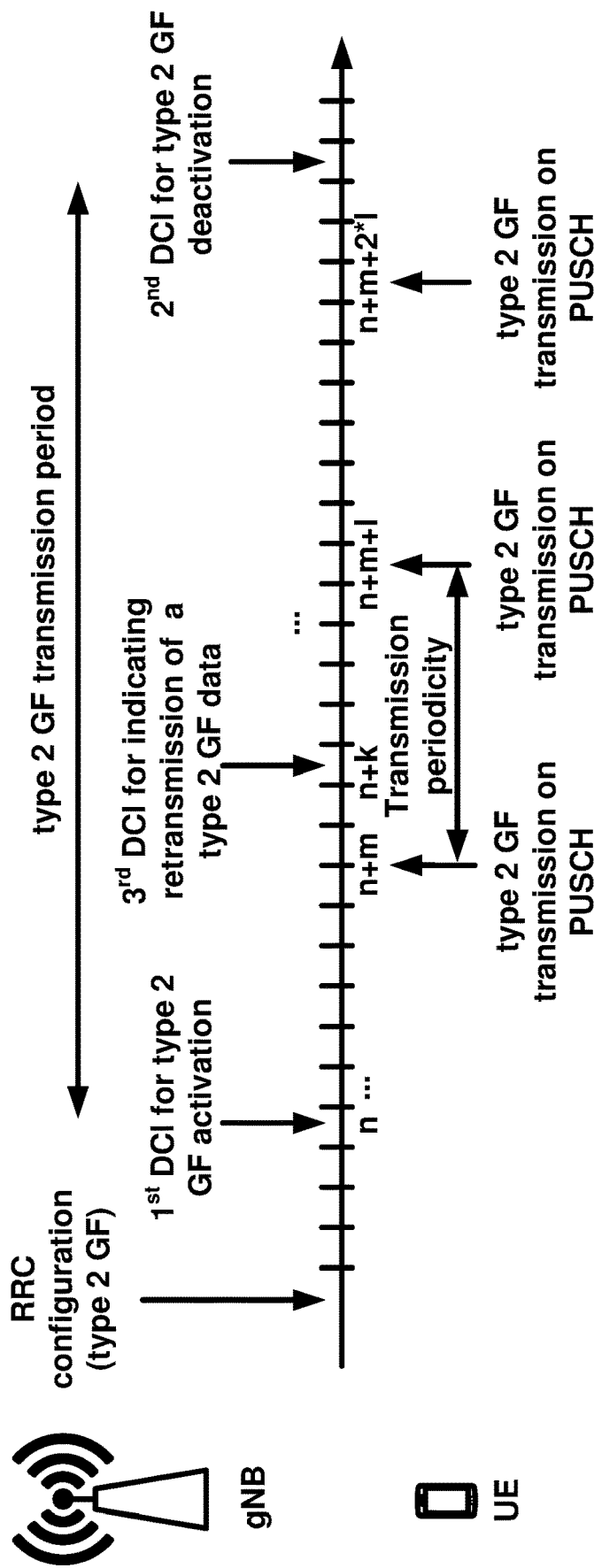
FIG. 31 is an example diagram for semi-persistent CSI reporting mechanism as per an aspect of an embodiment of the present disclosure.

FIG. 31 shows example of the embodiment, where, a gNB may trigger a SPS (e.g., for downlink transmission) or type 2 grant-free (GF, e.g., for uplink transmission) activation by transmitting a DCI at subframe n. In order to differentiate from normal dynamic scheduling, the DCI may be CRC scrambled by a first RNTI (e.g., SPS C-RNTI for downlink transmission or CS-RNTI for uplink transmission) different from a second RNTI for normal dynamic scheduling (e.g., C-RNTI). In an example, a gNB may transmit one or more DCI via a PDCCH for uplink data scheduling. When receiving a first DCI with CRC scrambled by a first RNTI, the UE may consider a PUSCH assignment indicated by the first DCI is for SPS/type 2 GF scheduling. The UE may transmit uplink data via the PUSCH in multiple subframes, with a configured periodicity. When receiving a second DCI with CRC scrambled by the second RNTI, the UE may consider a PUSCH assignment indicated by the second DCI is for dynamic scheduling. The UE may transmit uplink data via the PUSCH in a subframe. The subframe may be indicated by the second DCI, or a subframe after a predefined subframes when receiving the second DCI.

In an example, as shown in FIG. 31, a base station (e.g., gNB in FIG. 31) transmits to a wireless device (e.g., UE in FIG. 31) one or more RRC messages comprising configuration parameters of a type 2 GF transmission. The base station may transmit to the wireless device a first DCI indicating activation of the type 2 GF transmission (e.g., at slot/subframe n as shown in FIG. 31). The UE may transmit, in response to the first DCI, uplink data packets (e.g., from slot/subframe n+m as shown in FIG. 31) for the activated type 2 GF with a transmission periodicity on PUSCH indicated by an RRC message or the first DCI. The UE may keep transmitting uplink data packets with a periodicity associated with the activated type 2 GF (e.g., at subframe n+m+l, n+m+2*l . . . , as shown in FIG. 31). The base station may transmit to the wireless device a second DCI indicating deactivation of the type 2 GF. The wireless device may stop, in response to the second DCI, the transmissions of the uplink data packets.

In general, a HARQ procedure may apply for a SPS/type 2 GF transmission, to guarantee a gNB correctly receive the data. As shown in FIG. 31, the base station may transmit a third DCI indicating retransmission of an uplink data packet (e.g., at subframe n+k). In an example, in order to differentiate the DCI for indicating activation/deactivation of a type 2 GF transmission from indicating a retransmission of the uplink data packet, the base station may transmit the second DCI indicating, by setting a first field of the second DCI to a first value, that a last PUSCH transmission for the uplink data packet is not correctly received. For example, the first field may be a new data indicator (e.g., NDI). The gNB may indicate an uplink data packet transmission is not correctly received and request a UE to retransmit the uplink data packet, by setting the NDI to 1 (e.g., for 1-bit NDI field), and a HARQ process number to a value associated with the uplink data packet for retransmission. When the UE receives the second DCI for indicating retransmission, the UE may retransmit the uplink data packet associated with the HARQ process number via a PUSCH. The PUSCH may be indicated by the second DCI.

In general, a base station may use, one or more fields of a DCI, and/or CRC of the DCI, to indicate a SPS/type 2 GF activation/deactivation, and/or retransmission of the activated SPS/type 2 GF data. In order to differentiate whether the DCI is for activation or deactivation, or retransmission of a SPS/type 2 GF data, the gNB may set one or more fields of the DCI indicating activation, deactivation, or retransmission.

In an example, the one or more fields of the DCI may comprise at least one of: a TPC for PUSCH; an NDI field; an MCS field; a HARQ process number field; a resource assignment (RA) field; and/or a redundancy version (RV) field. An NDI field may indicate whether there is new data. A HARQ process number may identify a HARQ process associated with a PUSCH transmission of a transmission block. A RV field may indicate the redundancy version in case of retransmission. An MCS field comprising at least a Most Significant Bit (MSB, e.g., the first bit in the left of the MCS field) may indicate a modulation and code scheme for the PUSCH transmission.

In an example, a base station may use, one or more fields of a DCI, and/or CRC of the DCI, to indicate a SPS/type 2 GF activation/deactivation, and/or retransmission of the activated SPS/type 2 GF data. The base station may set the NDI field to '1' indicating a DCI is for retransmission of a SPS data, when the DCI is CRC scrambled by a CS-RNTI (or SPS C-RNTI). In an example, the base station may set the NDI field to '0' indicating the DCI is for activation/deactivation of the SPS transmission, when the DCI is CRC scrambled by the CS-RNTI (or SPS C-RNTI). In an example, the base station may indicate whether the DCI is for activation or deactivation by setting one or more fields of the DCI, in addition to setting the NDI field. In an example, the base station may transmit a PDCCH with a DCI indicating activation of the SPS/type 2 GF uplink transmission by setting the TPC field to a first value (e.g., '00' for a 2-bit TPC field), the MSB bit of the MCS and RV field to a second value (e.g., '0') in the DCI (e.g., DCI format 0), for a first DCI format (e.g., DCI format 0). In an example, the base station may transmit a PDCCH with a DCI indicating activation of the SPS/type 2 GF transmission by setting the TPC field to a first value (e.g., '00'), the RV field to a second value (e.g., '00'), and the HARQ process number to a third value (e.g., '000') in the DCI, for a second DCI format (e.g., DCI format 6-0A). In an example, the first DCI format (e.g., DCI format 0) may be transmitted on a first PDCCH. The second DCI format (e.g., DCI format 6-0A) may be transmitted on a second PDCCH (e.g., MPDCCH). The first PDCCH may be different from the second PDCCH, at least on transmit format, radio resource for the transmission, since the second PDCCH is for an MTC UE which may be located in a deep coverage area and have a limited receiving capacity, the first PDCCH is for a normal UE which may be in a normal coverage area, and have normal receiving capacity. When a UE receives a DCI scrambled by the SPS C-RNTI or CS-RNTI, the UE may perform a validation of the PDCCH to determine whether the DCI is for activation, if the NDI field is set to 0. In an example, The UE may not perform a validation of the PDCCH, if the NDI field is set to 1. In this case, the UE may perform a retransmission according to the DCI.

In an example, when performing a PDDCH validation for a first DCI format (e.g., DCI format 0), if the TPC command is the first value (e.g., '00'), the MSB bit of the MCS and RV field is the second value (e.g., '0') in a received DCI, the UE may consider the received DCI information accordingly as a valid SPS/type 2 GF activation. In response to the DCI being a valid SPS/type 2 GF activation, the UE may activate the SPS/type 2 GF and/or transmit uplink data packet according to the DCI. In an example, when performing a PDCCH validation for the second DCI format (e.g., DCI format 6-0A), if the TPC command is '00', the RV field is '00' and the HARQ process number is '000' in the received DCI, the UE may consider the received DCI information accordingly as a valid SPS/type 2 GF activation. In response to the DCI being a valid SPS/type 2 GF activation, the UE may transmit uplink data packets according to the DCI.

In an example, when performing a PDCCH validation, the UE may consider a received DCI information accordingly as an invalid SPS/type 2 GF activation, if the TPC command is not a '00', and/or the MSB bit of the MCS and RV field is not a '0' in the received DCI, for DCI format 0. In an example, when performing the PDCCH validation, the UE may consider the received DCI information accordingly as an invalid SPS/type 2 GF activation, if the TPC command is not a '00', and/or the RV field is not a '00', and/or the HARQ process number is not a '000' in the received DCI, for DCI format 6-0A. In response to the DCI being an invalid SPS/type 2 GF activation, the UE may consider the DCI format has been received with a non-matching CRC. In an example, the UE may discard the DCI, and/or not perform actions indicated by the DCI, in response to the received DCI being with a non-matching CRC.

In an example, the gNB may transmit a PDCCH with a DCI indicating deactivation of the SPS/type 2 GF transmission by setting the TPC command to '00', the MCS and RV field to '11111', the Cyclic shift DM RS field to '000' if present, and the RA and hopping field to all '1's in the DCI (e.g., DCI format 0), for a normal UE. In an example, the gNB may transmit a PDCCH with a DCI indicating deactivation of the SPS/type 2 GF transmission by setting the TPC command to '00', the RV field to '00', the repetition number to '00', the MCS field to '1111', the RA field to all '1's and a HARQ process number to '000' in the DCI (e.g., DCI format 6-0A), for a MTC UE. When a UE receive a DCI scrambled by the SPS C-RNTI or CS-RNTI, the UE may perform a validation of the PDCCH to determine whether the DCI is for deactivation, if the NDI field is set to '0'. In an example, The UE may not perform a validation of the PDCCH, if the NDI field is set to '1'. In this case, the UE may perform a retransmission according to the DCI.

In an example, when performing a PDCCH validation for DCI format 0, if the TPC command is '00', the MCS and RV field is '11111', the Cyclic shift DM RS field is '000' if present, and the RA and hopping field is set to all '1's, in a received DCI, the UE may consider the received DCI information accordingly as a valid SPS/type 2 GF deactivation. In response to the DCI being a valid SPS/type 2 GF deactivation, the UE may stop transmission of the uplink data packets or stop receiving downlink data packets. In an example, when performing a PDCCH validation for DCI format 6-0A, if the TPC command is '00', the RV field is '00', the repetition number is '00', the MCS field is '1111', the RA field is set to all '1's, and the HARQ process number is '000', in the received DCI, the UE may consider the received DCI information accordingly as a valid SPS/type 2 GF deactivation. In response to the DCI being a valid SPS/type 2 GF deactivation, the UE may stop transmission of the uplink data packets or stop receiving downlink data packets.

In an example, when performing the PDCCH validation, the UE may consider the received DCI information accordingly as an invalid SPS/type 2 GF deactivation, if the TPC command is not '00', and/or the MCS and RV field is not '11111', and/or the cyclic shift DM RS field is not '000' if present, and/or the RA and hopping field is not set to all '1's, in the received DCI, for DCI format 0. In an example, when performing the PDCCH validation, the UE may consider the received DCI information accordingly as an invalid SPS/type 2 GF activation, if the TPC command is not '00', and/or the RV field is not '00', and/or the repetition number is not '00', and/or the MCS field is not '1111', and/or the RA field is not set to all '1's, and/or the HARQ process number is not '000', in the received DCI, for DCI format 6-0A. In response to the DCI being an invalid SPS/type 2 GF deactivation, the UE may consider the DCI format has been received with a non-matching CRC. In an example, the UE may skip the DCI in response to the received DCI being with a non-matching CRC.

In an example, when there is a big amount of transmission blocks (TBs) to be transmitted to a UE and/or the UE is in a changing channel condition, a UE may transmit frequent CSI reports to a base station for facilitating downlink channel scheduling. In an example, aperiodic CSI report may not be efficient in this case, where the UE may transmit the aperiodic CSI report in one shot. The aperiodic CSI report may be triggered by a DCI. Request for multiple and/or frequent CSI reports may be achieved by transmitting multiple DCIs, which may increase DCI transmission and reduce the capacity of PDCCH. In an example, periodic CSI report may not work efficient or convenient in this case. The periodic CSI report may be configured or reconfigured in an RRC message. An RRC message for the periodic CSI report may not be efficient to enable or disable the frequent CSI reports. A DCI based activation/deactivation mechanism may be efficient and/or convenient for frequent CSI reports when there is a big amount of transmission blocks (TBs) to be transmitted to a UE and/or the UE is in a changing channel condition. CSI reports based on activation/deactivation of a DCI may be SP CSI reports. Example embodiments improve efficiency of downlink transmission, batter power consumption for SP CSI report.

In an example, it may be straightforward or obvious that a DCI based mechanism of SPS/type 2 GF activation/deactivation (A/D) in LTE system may apply in a case when a DCI is used to indicate A/D of SP CSI reporting. There are several differences between SPS/type 2 GF transmission and SP CSI reports which may result in inefficiency or extra complexity in the UE when a base station and/or a UE applies the mechanism of SPS/type 2 GF A/D for SP CSI report A/D.

In an example, a SP CSI report A/D may be different from a SPS/type 2 GF A/D, e.g., on retransmission mechanism. A HARQ based retransmission mechanism may not be applied in SP CSI report, compared with SPS/type 2 GF transmission. In the case, a UE may not check whether the DCI is for retransmission or for deactivation of the activated SP CSI report. Implementing the same mechanism of SPS/type 2 GF A/D may increase implementation complexity and/or power consumption at the UE when performing validation of a PDCCH for A/D of a SP CSI report. Example embodiments provides mechanisms to improve implementation complexity and/or power consumption of the UE for the SP CSI report.

In an example, a SP CSI report A/D may be different from a SPS/type 2 GF A/D, e.g., on power control mechanism. In LTE system, a base station may transmit a DCI for triggering type 2 GF transmission by setting the TPC field (e.g., if the DCI comprises the TPC field) of the DCI to a predefined value (e.g., 0 or 00). In this case, the TPC field, after being set to a predefined value may not indicate a power command for the uplink data transmission via a PUSCH. The UE may determine the transmission power according to the RRC message. In an example, when transmitting the SP CSI reports, the UE may transmit the SP CSI reports with uplink data packets on a PUSCH. Transmission power of the uplink data packets and/or the SP CSI reports may be indicated in a TPC field in a SP CSI A/D DCI. In an example, the TPC field may not be allowed to set to a predefined value (e.g., 0 or 00) when the DCI is used for activating the SP CSI reporting. Implementing the same mechanism of SPS/type 2 GF A/D may result in incorrect (e.g., less than required or over than required) transmission power determination of the SP CSI report transmission via the PUSCH. Example embodiments provides mechanisms to improve transmission power determination accuracy of the UE for the SP CSI report transmission via a PUSCH. Example embodiments provides mechanisms to improve uplink interference to other UEs or improve efficiency of uplink transmission when transmitting a SP CSI report via a PUSCH. Example embodiments provides mechanisms to improve implementation complexity and/or power consumption of the UE for the SP CSI report.

Figure 32:
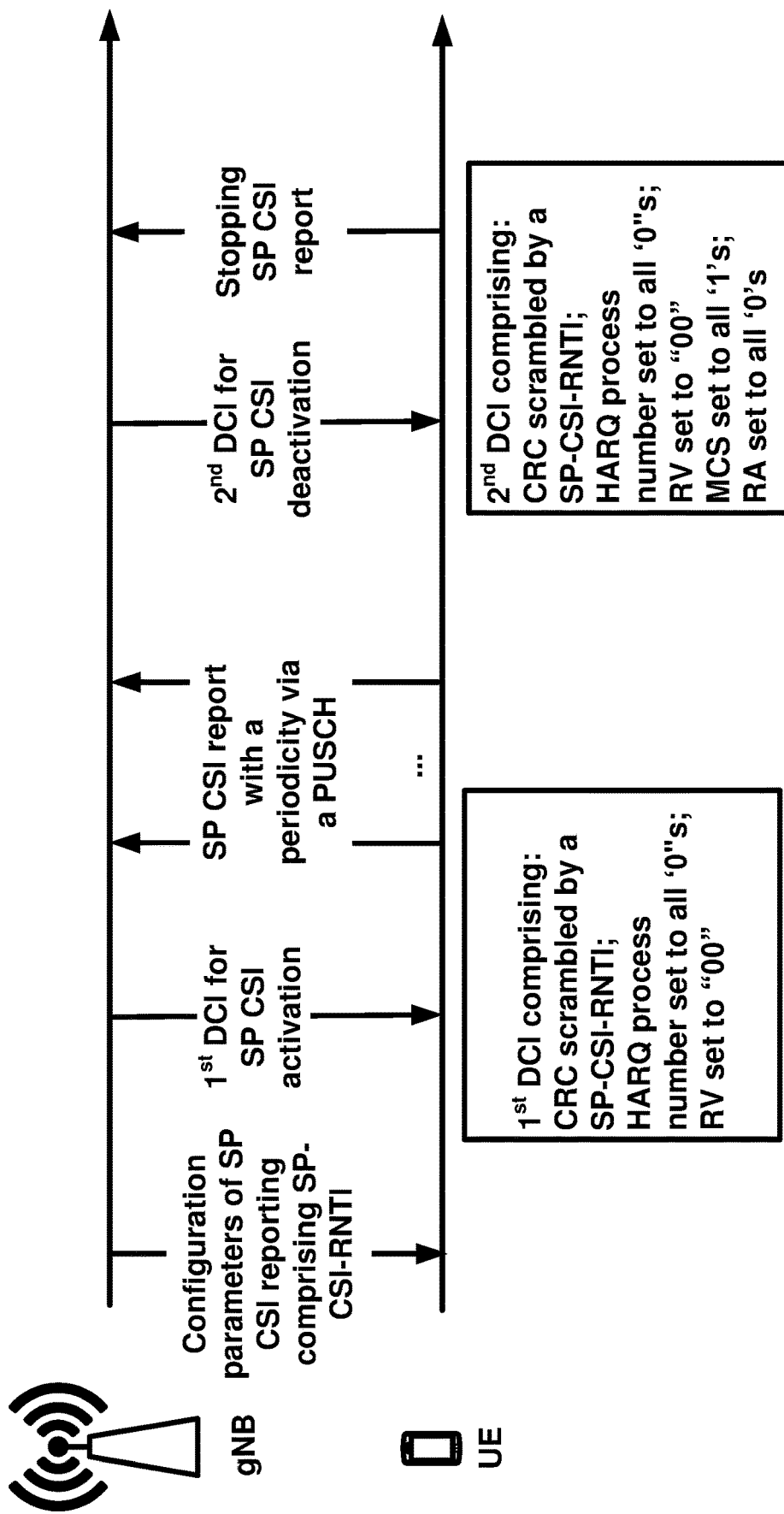
FIG. 32 is an example diagram for semi-persistent CSI reporting mechanism as per an aspect of an embodiment of the present disclosure.

FIG. 32 shows an example embodiment of SP CSI report A/D mechanism. In an example, a base station (e.g., gNB in FIG. 32) transmits to a wireless device (e.g., UE in FIG. 32) one or more RRC messages comprising configuration parameters of SP CSI reporting, wherein, the configuration parameters comprising at least one of: a first radio network temporary identifier (e.g., SP-CSI-RNTI as shown in FIG. 32); and at least one or more SP CSI reporting settings.

In an example, the one or more RRC messages may comprise configuration parameters of one reference signal (RS) resource setting. The RS resource setting may comprise a set of RS resources, wherein, a RS resource may be associated with: a RS resource configuration identifier; radio resource configuration (e.g., number of ports; time and frequency resource allocation; frequency density; etc.). In an example, the RS may be a CSI-RS, and/or a SS block.

In an example, a SP CSI report setting may comprise a set of SP CSI report parameters comprising at least one of: a SP CSI report identifier; and/or one or more parameters for SP CSI reporting comprising at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity and slot offset of CSI report.

In an example, the one or more RRC messages may further comprise parameters indicating multiple trigger states for SP CSI reports on PUSCH. In an example, a SP CSI report trigger state may comprise at least one of: a SP CSI report trigger index; a RS resource configuration identifier; and/or a SP CSI report identifier. The RS resource configuration identifier may indicate a RS resource associated with a SP CSI report. The SP CSI report identifier may indicate parameters for the SP CSI report.

In an example, the UE may receive a first DCI (e.g., $1^{st}$ DCI in FIG. 32) via a PDCCH, wherein the first DCI may comprise at least one of: a TPC for PUSCH; a NDI field; a MCS field; a HARQ process number field; a RA field; a RV field; a CSI request field; a first downlink assignment index; a second downlink assignment index; a first parameter indicating uplink precoding information and number of layers if present; a second parameter indicating antenna ports; and/or a third parameter indicating CBG transmission information if present.

In an example, in response to or after receiving the first DCI, the UE may perform PDCCH validation for a SP CSI activation or release/deactivation, based on at least one of: CRC parity bits of the first DCI; one or more fields of the first DCI being set to predefined values.

In an example, the UE may determine the PDCCH validation for an activation of a SP CSI report is achieved in response to: the CRC parity bits of the first DCI being scrambled by the first RNTI (e.g., the SP-CSI-RNTI); the HARQ process number field being set to all '0's; and/or the RV field being set to "00". In response to the validation of the PDCCH being achieved for activation of the SP CSI report, the UE may transmit via a radio resource of PUSCH, the SP CSI report associated with a SP CSI report trigger index with a transmission periodicity in multiple subframes/slots. The radio resource of the PUSCH may be indicated in the RA field of the first DCI. The SP CSI report trigger index may be indicated in the CSI request field of the first DCI. The transmission periodicity may be configured in the at least one messages. In response to the validation of the PDCCH being achieved for activation of the SP CSI report, the UE may determine a RS resource indicated by the RS resource configuration identifier associated with the SP CSI report trigger index. The UE may measure CSI parameters indicated by the SP CSI report identifier associated with the SP CSI report trigger index. The UE may transmit SP CSI reports based on the measured CSI parameters on the PUSCH in multiple subframes/slots, starting from a first subframe/slot. In an example, the first subframe/slot may be a first available PUSCH subframe/slot after the subframe/slot when receiving the first DCI. In an example, the first subframe/slot may be an offset to the subframe/slot when receiving the first DCI. In an example, the offset may be indicated by the first DCI, or configured by the RRC message, or a predefined (or fixed) value. In an example, the UE may determine a transmission power for the SP CSI report via the PUSCH according to the TPC field of the first DCI. In an example, the TPC field (e.g., for PUSCH) of the first DCI may indicate power control of the SP CSI report transmission on the PUSCH. The TPC field may not be set to a predefined value for indicating activation/deactivation of the SP CSI report.

In an example, the UE may determine the PDCCH validation for an activation of a SP CSI report is not achieved in response to at least one of: the CRC parity bits of the first DCI not being scrambled by the first RNTI (e.g., the SP-CSI-RNTI); the HARQ process number field not being set to all '0's; and/or the RV field not being set to "00". In response to the validation of the PDCCH not being achieved for activation of the SP CSI report, the UE may consider the first DCI as having been detected with a non-matching CRC. In response to the validation of the PDCCH not being achieved for activation of the SP CSI report, the UE may ignore the first DCI received on the PDCCH, or not perform actions according to the first DCI, or not perform actions related to SP CSI report according to the first DCI.

By the example embodiment, not setting the TPC field to a predefined value may allow a base station flexibly control transmission power of a UE for SP CSI report. By the example embodiment, not checking NDI field for SP CSI activation/deactivation may reduce implementation complexity of a UE for SP CSI report. Example embodiments may improve transmission power determination accuracy of the UE for the SP CSI report transmission via a PUSCH. Example embodiments may improve uplink interference to other UEs or improve efficiency of uplink transmission when transmitting a SP CSI report via a PUSCH. Example embodiments may improve implementation complexity and/or power consumption of the UE for the SP CSI report.

In an example, the UE may receive a second DCI (e.g., $2^{nd}$ DCI in FIG. 32) via the PDCCH, wherein the second DCI may comprise at least one of: a TPC for PUSCH; a NDI field; a MCS field; a HARQ process number field; a RA field; a RV field; a CSI request field; a first downlink assignment index; a second downlink assignment index; a first parameter indicating uplink precoding information and number of layers if present; a second parameter indicating antenna ports; and/or a third parameter indicating CBG transmission information if present.

In an example, in response to or after receiving the second DCI, the UE may perform PDCCH validation for a SP CSI activation or release/deactivation, based on at least one of: CRC parity bits of the second DCI; one or more fields of the second DCI being set to predefined values.

In an example, the UE may determine the PDCCH validation for a deactivation of a SP CSI report is achieved in response to: the CRC parity bits of the second DCI being scrambled by the first RNTI (e.g., the SP-CSI-RNTI); the HARQ process number field being set to all '0's; and/or the RV field being set to "00"; the MCS field being set to all '1's; and/or the RA field being set to a predefined value (e.g., all '0's or all '1's). In response to the validation of the PDCCH being achieved for deactivation of the SP CSI report, the UE may stop the transmissions of the SP CSI report associated with a SP CSI report trigger index. The SP CSI report trigger index may be indicated in the CSI request field of the second DCI.

In an example, the UE may determine the PDCCH validation for deactivation of a SP CSI report is not achieved in response to at least one of: the CRC parity bits of the second DCI not being scrambled by the first RNTI (e.g., the SP-CSI-RNTI); the HARQ process number field not being set to all '0's; and/or the RV field not being set to "00"; the MCS field not being set to all '1's; and/or the RA field not being set to a predefined value (e.g., all '0's or all '1's). In response to the validation of the PDCCH not being achieved for deactivation of the SP CSI report, the UE may consider the second DCI as having been detected with a non-matching CRC. In response to the validation of the PDCCH not being achieved for deactivation of the SP CSI report, the UE may ignore the second DCI received on the PDCCH, or not perform actions according to the first DCI. In response to the validation of the PDCCH not being achieved for deactivation of the SP CSI report, the UE may keep transmitting the SP CSI report.

By the example embodiment, not setting the TPC field to a predefined value may allow a base station flexibly control transmission power of a UE for uplink data packets, when deactivating a SP CSI report. By the example embodiment, not checking NDI field for SP CSI activation/deactivation may reduce implementation complexity of a UE for SP CSI report. Example embodiments may improve transmission power determination accuracy of the UE for a PUSCH transmission. Example embodiments may improve uplink interference to other UEs or improve efficiency of uplink transmission via a PUSCH. Example embodiments may improve implementation complexity and/or power consumption of the UE.

Figure 33:
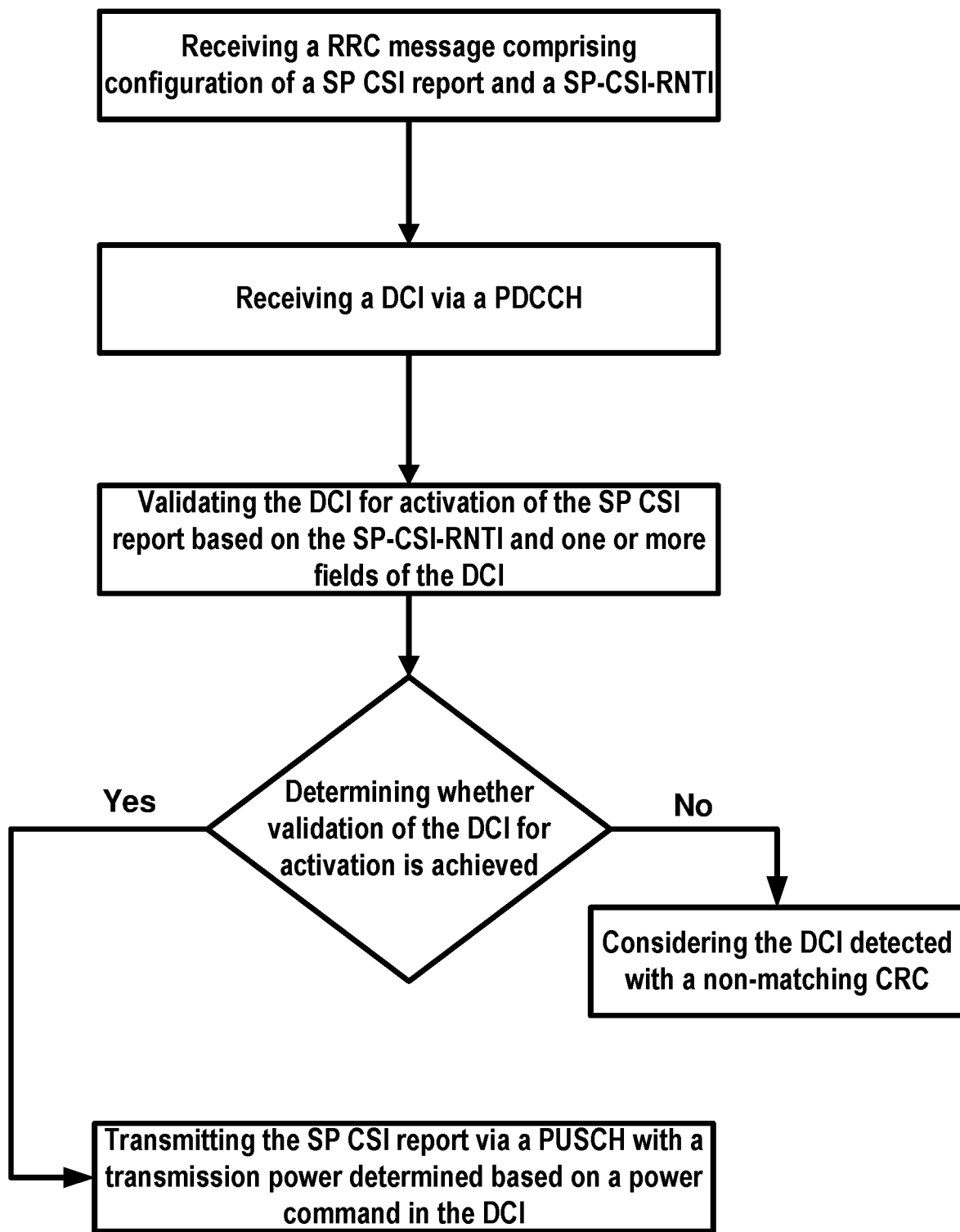
FIG. 33 is an example flowchart of semi-persistent CSI reporting mechanism as per an aspect of an embodiment of the present disclosure.

FIG. 33 shows an example flowchart of the embodiment for SP CSI activation. In an example, a wireless device may receive at least an RRC message comprising configuration of a SP CSI report and a RNTI value (e.g., a SP-CSI-RNTI as shown in FIG. 33). The wireless device may receive a DCI via a PDSCH. In response to or after receiving the DCI, the wireless device may perform validation of the DCI for activation of the SP CSI report based on the RNTI value and one or more fields of the DCI. The one or more fields may comprise a HARQ process number and a RV field. The wireless device may determine whether the validation is achieved or not based on the RNTI value and the one or more fields. In an example, the wireless device may determine the validation for activation of the SP CSI report is achieved in response to: CRC parity bits of the DCI being scrambled by the SP-CSI-RNTI; the HARQ process number being set to a first predefined value (e.g., all '0's); and the RV field being set to a second predefined value (e.g., '00'). In response to the validation for activation of the SP CSI report being achieved, the wireless device may transmit the SP CSI report via a PUSCH with a transmission power determined based on a power control command in the DCI.

In an example, a wireless device may determine a transmission power for a PUSCH transmission (e.g., comprising an uplink data transmission and/or CSI report) in subframe i for a serving cell c may be given by an equation:

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

$[dBm]$.

wherein $P_{CMAX,c}(i)$ may be a configured transmission power of the wireless device in subframe i for the serving cell c. $M_{PUSCH,c}(i)$ may be a bandwidth of the PUSCH resource assignment expressed in number of resource blocks valid for subframe i and the serving cell c, and/or $PL_c$ may be a downlink pathloss estimate for the wireless device serving cell c in dB. $P_{O\_PUSCH}$ may be a target received power value configured in an RRC message. α may be a power compensation factor configured in the RRC message. A may be a power offset value. MO may be a power control adjustment state and be equal to a sum of $f_c(i-1)$ and a power control command. The power control command may be indicated by the TPC of the DCI.

In an example, the wireless device may determine the validation for activation of the SP CSI report is not achieved in response to at least one of: CRC parity bits of the DCI not being scrambled by the SP-CSI-RNTI; the HARQ process number not being set to the first predefined value; and the RV field not being set to the second predefined value. In response to the validation for activation of the SP CSI report not being achieved, the wireless device may consider the DCI as having been detected with a non-matching CRC.

Figure 34:
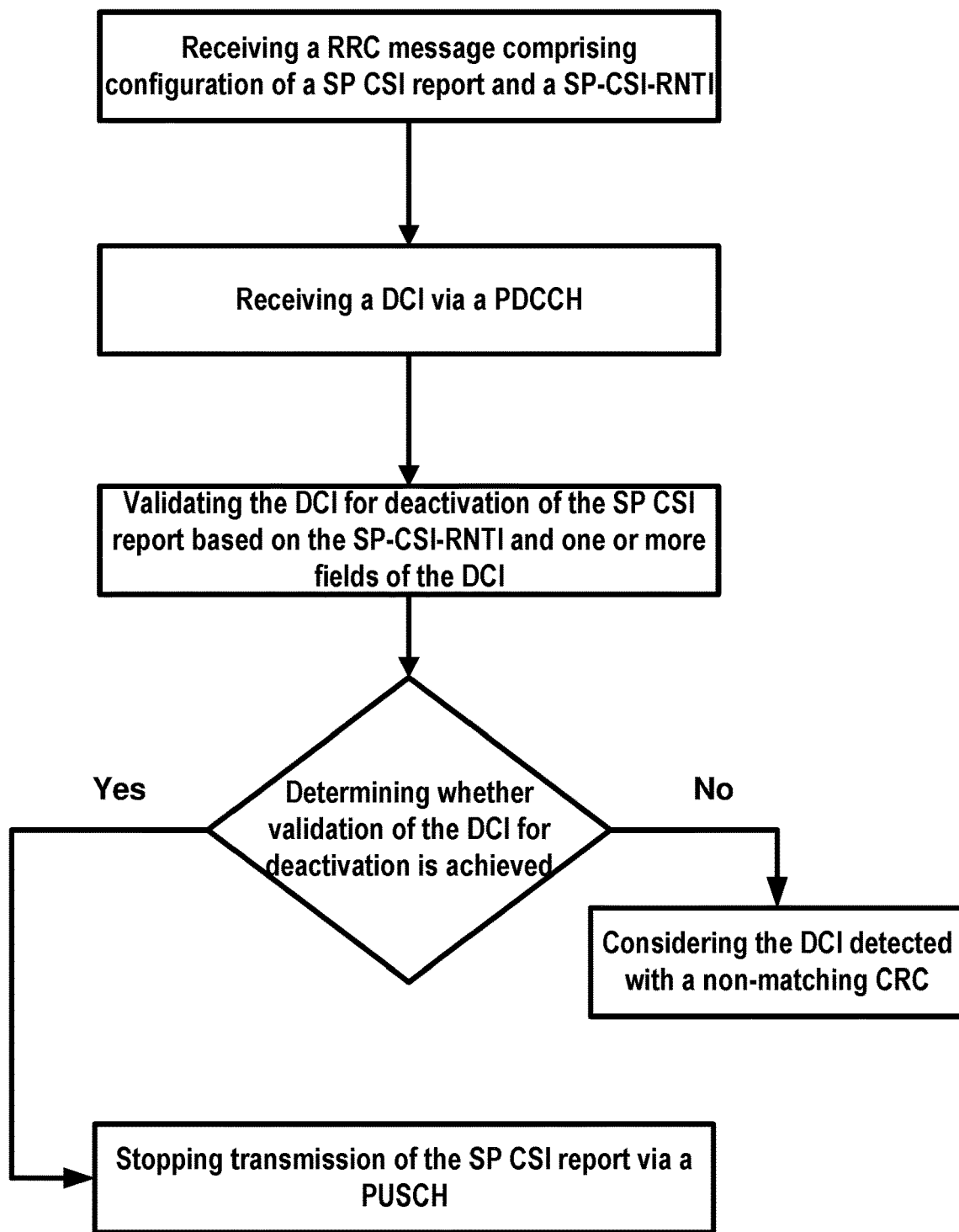
FIG. 34 is an example flowchart of semi-persistent CSI reporting mechanism as per an aspect of an embodiment of the present disclosure.

FIG. 34 shows an example flowchart of the embodiment for SP CSI deactivation. In an example, a wireless device may receive at least an RRC message comprising configuration of a SP CSI report and a RNTI value (e.g., a SP-CSI-RNTI as shown in FIG. 34). The wireless device may receive a DCI via a PDSCH. In response to or after receiving the DCI, the wireless device may perform validation of the DCI for deactivation of the SP CSI report based on the RNTI value and one or more fields of the DCI. The one or more fields may comprise a HARQ process number; a RV field; an MCS field; and/or a resource assignment field. The wireless device may determine whether the validation is achieved or not based on the RNTI value and the one or more fields. In an example, the wireless device may determine the validation for deactivation of the SP CSI report is achieved in response to: CRC parity bits of the DCI being scrambled by the SP-CSI-RNTI; the HARQ process number being set to a first predefined value (e.g., all '0's); the RV field being set to a second predefined value (e.g., '00'); the MCS field being set to a third predefined value (e.g., all '1's); and/or the resource assignment field being set to a fourth predefined value (e.g., all '0's or all '1's). In response to the validation for deactivation of the SP CSI report being achieved, the wireless device may stop transmission of the SP CSI report via a PUSCH.

In an example, the wireless device may determine the validation for deactivation of the SP CSI report is not achieved in response to at least one of: CRC parity bits of the DCI not being scrambled by the SP-CSI-RNTI; the HARQ process number not being set to the first predefined value; the RV field not being set to the second predefined value; the MCS field not being set to a third predefined value (e.g., all '1's); and/or the resource assignment field not being set to a fourth predefined value (e.g., all '0's or all '1's). In response to the validation for activation of the SP CSI report not being achieved, the wireless device may consider the DCI as having been detected with a non-matching CRC.

In an example, when receiving a DCI, a UE may perform validation of a PDCCH for SP CSI report activation/deactivation based on at least one of: CRC parity bits of the DCI; the NDI field of the DCI; and/or the at least second field of the DCI.

In an example, when the CRC parity bits of the DCI is scrambled by the SP-CSI-RNTI, the UE may determine the PDCCH is for activation of a SP CSI reporting, or deactivation of a SP CSI reporting, based on the NDI field of the DCI. In an example, the UE may perform validation of the PDCCH based on the NDI field. In an example, the validation of the PDCCH is to check whether the PDCCH is for activation, or deactivation of a SP CSI reporting. In an example, the UE may determine the PDCCH is for activation of a SP CSI reporting, if the NDI field is set to a first value (e.g., '0' or '1' for a 1-bit NDI field). In response to the PDCCH being for activation of a SP CSI report, the UE may determine a RS resource indicated by the RS resource configuration identifier associated with the SP CSI report trigger index. The UE may measure CSI parameters indicated by the SP CSI report identifier associated with the SP CSI report trigger index. The UE may transmit SP CSI reports based on the measured CSI parameters on the PUSCH in multiple subframes (or slot), starting from a first subframe (or slot). In an example, the first subframe (or slot) may be a first available PUSCH subframe (or slot) after the subframe (or slot) when receiving the DCI. In an example, the first subframe (or slot) may be an offset to the subframe (or slot) when receiving the DCI. In an example, the offset may be indicated by the DCI, or configured by the RRC message, or a predefined (or fixed) value. In an example, the UE may determine the PDCCH is for deactivation of a SP CSI reporting, if the NDI field is set to a second value (e.g., '0' or '1' for a 1-bit NDI field). The second value may be different from the first value. In response to the PDCCH being for deactivation of a SP CSI report, the UE may stop transmitting the SP CSI report associated with the SP CSI report trigger index, starting from a second subframe (or slot). In an example, the second subframe (or slot) may be indicated by the DCI, or the RRC message. In an example, the second subframe (or slot) may be a predefined offset from the subframe (or slot) when receiving the DCI. Implementing the example embodiment may reduce complexity for checking a DCI indicating an activation/deactivation of a SP CSI report, comparing with the validation of activation/deactivation of SPS/type 2 uplink transmission.

In an example, in order to reduce detection error for DCI reception, a gNB may transmit a PDCCH with a DCI indicating activation/deactivation of a SP CSI reporting by setting more than one fields in the DCI to one or more fixed values. In an example, when performing SP CSI reporting related actions in response to receiving the DCI, a UE may determine (or validate) the PDCCH is valid for activation of a SP CSI reporting, or deactivation of a SP CSI reporting, based on at least one of: the NDI field; the HARQ process number; the RV field; the TPC field; the MCS field; a first downlink assignment index; a second downlink assignment index; and/or the RA field. In an example, the UE may determine (or validate) the PDCCH is valid for activation of a SP CSI reporting, if at least one of: the NDI field is set to a first fixed value (e.g., '0' or '1' for a 1-bit NDI field); the HARQ process number is set to a second fixed value (e.g., '0000', or '11111', or a predefined value for a 4-bit HARQ process field); the RV field is set to a third fixed value (e.g., '00', or '11', or a predefined value for a 2-bit RV field). In response to the PDCCH being valid for activation of a SP CSI report, the UE may transmit the SP CSI report associated with the SP CSI report trigger index in multiple subframes. In an example, the UE may determine (or validate) the PDCCH is valid for deactivation of a SP CSI reporting, if at least one of: the NDI field is set to a forth fixed value (e.g., '0' or '1', different from the first fixed value); the HARQ process number is set to a fifth fixed value (e.g., '0000', or '11111', or a predefined value for a 4-bit HARQ process field); the RV field is set to a sixth fixed value (e.g., '00', or '11', or a predefined value for a 2-bit RV field); the TPC field is set to a seventh fixed value (e.g., '00' or a predefined value, for a 2-bit TPC field); the MCS field is set to an eighth fixed value (e.g., '1111', or a predefined value, for a 4-bit MCS field); and/or the RA field is set to a ninth fixed value (e.g., set to all '1's). In an example, the fifth value may be same as the second fixed value. In an example, the sixth value may be same as the third fixed value. In response to the PDCCH being valid for deactivation of a SP CSI report, the UE may stop transmitting the SP CSI report associated with the SP CSI report trigger index.

In an example, a gNB may change one or more transmission parameters of an activated SP CSI reporting, to accommodate channel/interference situation with dynamic change. In an example, the gNB may indicate an MCS change, or a RA change, or power control command update, by sending a new DCI. The new DCI may overwrite the corresponding fields of a DCI sent previously for activation of a SP CSI report. In order to differentiate a DCI indicating parameter change from a DCI for activation/deactivation, there is a need for a new DCI for indicating parameters changing of an activated SP CSI reporting. In an example, a gNB may transmit a DCI with the NDI field set to a first fixed value (e.g., '0', or '1' for a 1-bit NDI field) indicating one or more transmission parameter change (or updates), for an activated SP CSI reporting. The gNB may transmit a DCI with the NDI field set to a second fixed value (e.g., '0' or '1', different from the first fixed value, for a 1-bit NDI field) indicating activation/deactivation of a SP CSI report.

In an example, when performing a SP CSI reporting related actions, a UE may determine a DCI is for indicating transmission parameters change (or updates) for an activated SP CSI reporting, if the NDI field of the DCI is set to the first fixed value. In response to the DCI indicating one or more parameters change (or updates), the UE may employ the one or more parameters indicated by the DCI and transmit the activated SP CSI reporting accordingly. In an example, the UE may determine the DCI is for activation/deactivation of a SP CSI reporting, if the NDI field is set to the second fixed value. In response to the DCI being activation/deactivation of a SP CSI reporting, the UE may perform validation of the PDCCH on which the DCI is transmitted. In an example, the validation is to determine whether the DCI is for activation of a SP CSI reporting, or deactivation of a SP CSI reporting, or the DCI is received with a non-matching CRC. In an example, the UE may perform validation of the PDCCH for activation of a SP CSI reporting, based on at least a first field of the at least second field. In an example, the UE may perform validation of the PDCCH for deactivation of a SP CSI reporting, based on at least a second field of the at least second field.

In an example, a UE may perform a validation of a PDCCH for activation of a SP CSI reporting based on at least one of: a HARQ process number; a MCS field; a RA field; a TPC for PUSCH field; a RV field; a CSI request field; a first downlink assignment index; a second downlink assignment index; a first parameter indicating uplink precoding information and number of layers if present; a second parameter indicating antenna ports; and/or a third parameter indicating CBG transmission information if present. In an example, the UE may determine the validation is achieved, if at least one of: the HARQ process number is set to a first fixed value (e.g., '0000', or '1111', or a predefined value, for a 4-bit HARQ process number); the RV field is set to a second fixed value (e.g., '00', or '11', or a predefined value for a 2-bit RV field); the MCS field is not a third fixed value (e.g., '00000', or '11111', or a predefined value, for a 5-bit MCS field); the TPC for PUSCH field is not a fourth fixed value (e.g., '00', or '11', or a predefined value, for a 2-bit TP field); the RA field is not a fifth fixed value (e.g., set to all '1's); the first parameter is not a first predefined (or fixed) value if present; the second parameter is not a second predefined (or fixed) value; and/or the third parameter is not a third predefined (or fixed) value if present. Otherwise, the UE may determine the validation is not achieved. In the example, the TPC field may indicate the power control command for PUSCH transmission, and/or may not be used for validation of PDCCH for activation of SP CSI report. Therefore, the TPC field may not be set to a fixed value (e.g., the fourth value), when activating a SP CSI report by the DCI.

In an example, a UE may perform a validation of a PDCCH for deactivation of a SP CSI reporting based on at least one of: a HARQ process number; a MCS field; a RA field; a TPC for PUSCH field; a RV field; a CSI request field; a first downlink assignment index; a second downlink assignment index; a first parameter indicating uplink precoding information and number of layers if present; a second parameter indicating antenna ports; and/or a third parameter indicating CBG transmission information if present. In an example, the UE may determine the validation is achieved, if at least one of: the HARQ process number is set to a sixth fixed value (e.g., '0000', or '1111', or a predefined value, for a 4-bit HARQ process number); the RV field is set to a seventh fixed value (e.g., '00', or '11', or a predefined value for a 2-bit RV field); the MCS field is set to an eighth fixed value (e.g., '00000', or '11111', or a predefined value, for a 5-bit MCS field); the TPC for PUSCH field is set to a ninth fixed value (e.g., '00', or '11', or a predefined value, for a 2-bit TP field); the RA field is set to a tenth fixed value (e.g., set to all '1's); the first parameter is a first predefined (or fixed) value if present; the second parameter is a second predefined (or fixed) value; and/or the third parameter is a third predefined (or fixed) value if present. Otherwise, the UE may determine the validation is not achieved. In an example, the sixth fixed value may be same as the first fixed value. In an example, the seventh fixed value may be same as the second fixed value. In an example, the eighth fixed value may be same as the third fixed value. In an example, the ninth fixed value may be same as the fourth fixed value. In an example, the tenth fixed value may be same as the fifth fixed value.

In an example, the UE may determine the DCI is received with a non-matching CRC, if the validation of the PDDCH for activation of a SP CSI reporting is not achieved, and/or the validation of the PDCCH for deactivation a SP CSI reporting is not achieved. In response to the DCI being received with a non-matching CRC, the UE may skip the PDCCH, and/or not perform actions according to the DCI.

In example embodiments, a gNB may transmit a DCI to indicate activation or deactivation of a SP CSI report, by setting one or more values of one or more DCI fields, without changing the content or format of the CSI request field of the DCI or designing a new DCI. These embodiments may reduce blind decoding attempts of a UE when receiving a PDCCH. The one or more DCI fields for activation/deactivation of SP CSI report may be different from one more DCI fields for validation of activation/deactivation of SPS/type 2 uplink transmission, since retransmission and/or power control mechanism may be different for these two cases.

In an example, a DCI indicating activation/deactivation of a SP CSI report may be different from a DCI for normal dynamic scheduling, or a SPS/type 2 uplink scheduling. In an example, the DCI may not comprise at least one of: an NDI field; a HARQ process number; the first downlink assignment index; the second downlink assignment index; and/or a RV, since the at least one of these fields may not be necessary for indication of activation/deactivation of SP CSI report, due to no retransmission required for a SP CSI report on PUSCH. In the example, a new DCI not having at least one of these fields for activation/deactivation of SP CSI report, may reduce transmission overhead, and or blind decoding complexity. A new DCI for activation or deactivation of a SP CSI report, without these fields may reduce the overhead of a DCI transmission, carry more CSI parameters, and/or increase the robustness of the DCI transmission. In an example, a gNB may transmit to a UE, a DCI for activation/deactivation of SP CSI reporting comprising at least one of: at least one CSI request field; an MCS field; a TPC field; and/or a RA field. The at least one CSI request field may comprise at least one of: an activation/deactivation indicator; and/or a SP CSI report trigger index. When the activation/deactivation indicator in the received DCI indicates activation of a SP CSI report, the UE may activate the SP CSI report associated with the SP CSI report trigger index. The UE may transmit the SP CSI report indicated by the SP CSI report trigger index in multiple subframes (or slots), starting from a subframe (or slot). In an example, the subframe (or slot) may be a first available PUSCH subframe (or slot) after the subframe (or slot) when receiving the DCI. In an example, the subframe (or slot) may be an offset to the subframe (or slot) when receiving the DCI. In an example, the offset may be indicated by the DCI, or configured by the RRC message, or a predefined (or fixed) value. The UE may transmit the SP CSI report by employing the TPC command and the MCS, indicated by the DCI. When the activation/deactivation indicator indicates deactivation of a SP CSI report, the UE may deactivate the SP CSI report associated with the CSI report trigger index. The UE may stop transmission of the SP CSI report starting from a subframe (or slot). In an example, the subframe (or slot) may be a first available PUSCH subframe (or slot) after the subframe (or slot) when receiving the DCI. In an example, the subframe (or slot) may be an offset to the subframe (or slot) when receiving the DCI. In an example, the offset may be indicated by the DCI, or configured by the RRC message, or a predefined (or fixed) value. In an example, the activation/deactivation indicator may have one or more bits. When it has 1 bit, the activation/deactivation indicator may indicate activation of a SP CSI report if the bit is '1', or deactivation of a SP CSI report if the bit is '0'.

In an example, a base station may transmit to a UE, a DCI indicating an activation/deactivation of a SPS/type 2 GF transmission, an activation/deactivation of a SP CSI report, or a dynamic scheduling of uplink transmission or downlink transmission. Example embodiments provide methods for dealing with the DCI in an efficient way.

Figure 35:
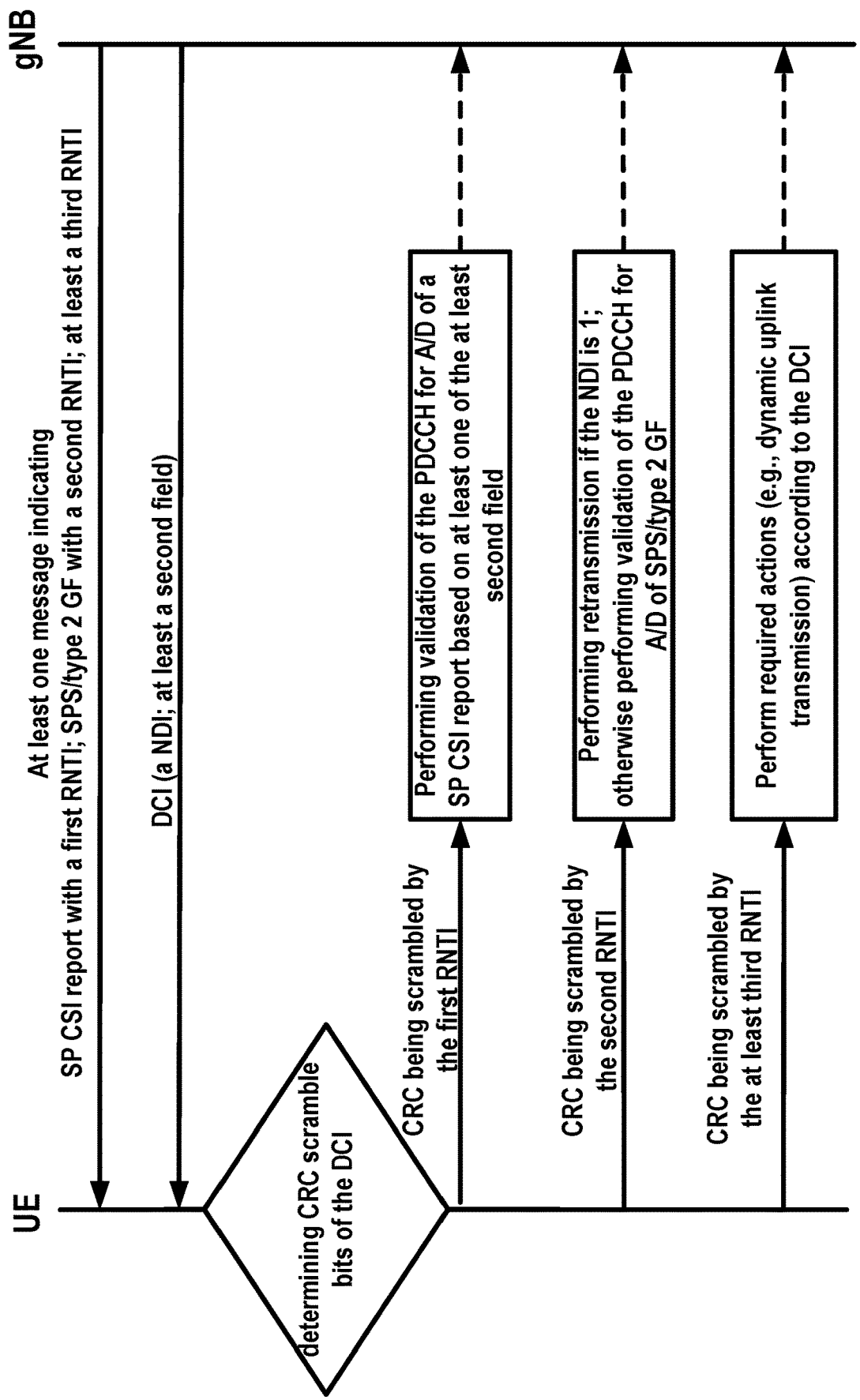
FIG. 35 is an example flowchart of semi-persistent CSI reporting mechanism as per an aspect of an embodiment of the present disclosure.

FIG. 35 shows an example embodiment of different actions when receiving a DCI when configured with SP CSI report. In an example, a base station (e.g., gNB in FIG. 35) may transmit to a wireless device (e.g., UE in FIG. 35), at least one message comprising configuration parameters of SP CSI report. The configuration parameters may comprise a first RNTI; and at least one or more SP CSI reporting settings. The at least one message may further comprise configuration parameters of SPS/type 2 GF transmission, wherein, the configuration parameters comprising at least one of: a second RNTI; and at least one or more SPS/type 2 GF resource configuration; at least one power control parameters. In an example, the at least one message may further comprise at least a third RNTI. The at least third RNTI may be used for downlink or uplink dynamic scheduling.

In an example, the UE may receive a DCI (e.g., DCI in FIG. 35) via a PDCCH, wherein the DCI may comprise at least one of: an NDI field; and at least a second field. The at least second field may comprise at least one of: a TPC for PUSCH; a MCS field; a HARQ process number field; a RA field; a RV field; a CSI request field; a first downlink assignment index; a second downlink assignment index; a first parameter indicating uplink precoding information and number of layers if present; a second parameter indicating antenna ports; and/or a third parameter indicating CBG transmission information if present. In an example, the at least second field may comprise at least one CSI request field indicating at least one of: a SP CSI report trigger index; and/or an indicator indicating activation/deactivation of a SP CSI report.

In an example, in response to or after receiving the DCI, the UE may determine based on CRC bits and/or one or more fields of the DCI, whether the DCI indicates actions (e.g., activation/deactivation) of SP CSI report, or actions (e.g., activation/deactivation/retransmission) of SPS/type 2 GF transmission, or other actions (e.g., dynamic downlink/uplink transmission).

In an example, in response to or after receiving the DCI, the UE may determine the CRC scramble bits. In an example, the UE may perform SP CSI reporting related actions, if the CRC scramble bits in the received DCI are the first RNTI indicated in the at least RRC message. In an example, the UE may perform SPS/type 2 related actions, if the CRC scramble bits in the received DCI are the second RNTI indicated in the at least RRC message. In an example, the UE may perform required actions (e.g., dynamic transmission), if the CRC scramble bits in the received DCI are the at least third RNTI indicated in the at least RRC message. In an example, when performing SPS/type 2 related actions, the UE may perform a retransmission of the SPS/type 2 uplink data, if the NDI field in the received DCI is set to '1'. In an example, when performing SPS/type 2 related actions, the UE may perform a validation of the PDCCH, if the NDI field in the received DCI is set to '0'. The UE may determine the validation of activation/deactivation (or release) of a SPS/type 2 uplink transmission based on at least one of: the TPC field; at least one bit of the MCS field; the HARQ process number field; the RA field; and/or the RV field.

In an example, a UE may receive, from a base station, at least one message comprising configuration parameters of semi-persistent CSI (SP CSI) reporting, wherein, the configuration parameters comprising at least one of: a first RNTI; and at least one or more SP CSI reporting settings comprising at least one of: a SP CSI report identifier; and/or one or more SP CSI report parameters. The UE may receive a DCI for activation/deactivation of a SP CSI report, via a PDCCH comprising at least one of: a SP CSI report identifier indicating the SP CSI report; a first field indicating transmission of new data; a second field indicating a HARQ process number; a third field indicating a redundancy version; a fourth field indicating radio resource for transmission of a PUSCH; a fifth field indicating an MCS index.

In an example, the UE may validate the PDCCH for activation/deactivation of the SP CSI report, in response to at least one of: CRC parity bits for the DCI being scrambled by the first RNTI; the second field; the third field; the fourth field; and/or the fifth field.

In an example, the UE may determine the validation for activation of the SP CSI report is achieved, if the second field is set to a first predefined value (e.g., all '0's) and the third field is set to a second predefined value (e.g., '00'). The UE may transmit the SP CSI report associated with the SP CSI report identifier, in response to the validation being achieved for the DCI indicating the activation of the SP CSI report.

In an example, the UE may determine the validation for deactivation of the SP CSI report is achieved, if the second field is set to the first predefined value, the third field is set to the second predefined value, the fourth field is set to a third predefined value (e.g., all '0's, all '1's, or the like), the fifth field is set to a fourth predefined value (e.g., all '1's). The UE may stop transmission of the SP CSI report associated with the SP CSI report identifier, in response to the validation being achieved for the DCI indicating the deactivation of the SP CSI report.

In an example, the one or more report parameters may comprise at least: CSI report periodicity; CSI type; one or more RS configurations.

In an example, the first RNTI is different from at least a RNTI for configured scheduling (e.g., CS-RNTI); a RNTI for semi-persistent scheduling (e.g., SPS C-RNTI); and/or a RNTI for dynamic scheduling (e.g., C-RNTI).

In an example, the first value is '0', or '1', when the first field is 1 bit. In an example, the second value is '0000', or '1111', or a predefined value, when the second field has 4 bits. In an example, the third value is '00', or '11', or a predefined value, when the third field has 2 bits. In an example, the fourth value is a value with bits set to all '1's.

In an example, the UE may determine the DCI has been received with a non-matching CRC, if the validation is not achieved. In an example, the UE may skip the DCI in response to the DCI being received with a non-matching CRC.

In a NR system, when configured with multiple beams, a gNB and/or a wireless device may perform one or more beam management procedure. For example, the wireless device may perform a beam failure recovery request (BFR) procedure, if one or more beam pair links between the gNB and the wireless device fail. The BFR procedure may be referred to as beam failure detection and recovery procedure, or a beam failure recovery procedure.

Figure 36:
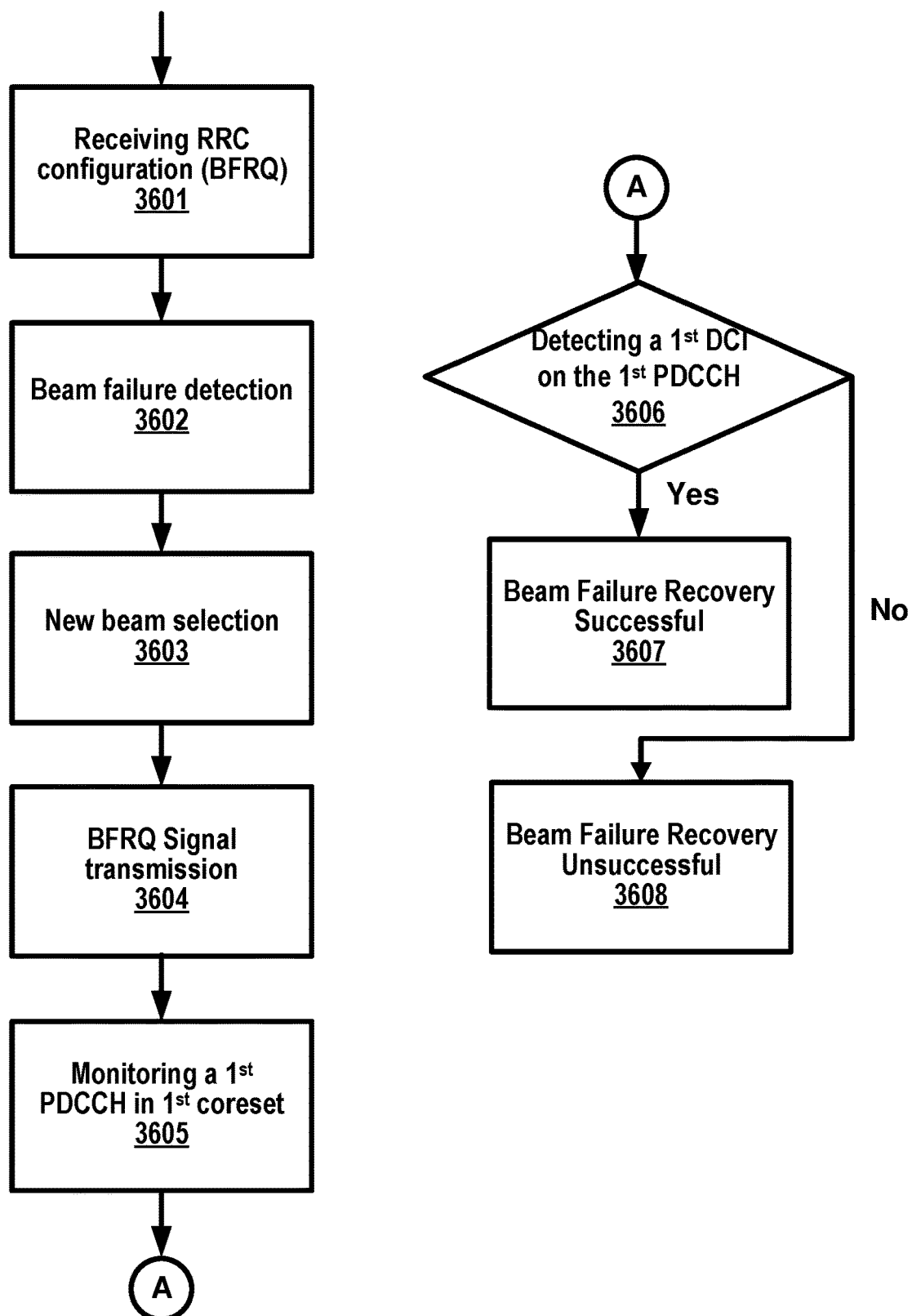
FIG. 36 is an example flowchart of beam failure recovery procedure as per an aspect of an embodiment of the present disclosure.

FIG. 36 shows example of the BFR procedure. A wireless device may receive one or more RRC messages comprising BFR parameters 3601. The wireless device may detect at least one beam failure 3602 according to at least one of BFR parameters. The wireless device may start a first timer in response to detecting the at least one beam failure. The wireless device may select a selected beam 3603 in response to detecting the at least one beam failure. The wireless device may transmit at least a first BFR signal 3604 to a gNB in response to the selecting the selected beam. The wireless device may start a response window in response to transmitting the at least first BFR signal. In an example, the response window may be a timer with a value configured by the gNB. When the response window is running, the wireless device may monitor a PDCCH in a first coreset 3605. The first coreset may be associated with the BFR procedure. In an example, the wireless device may monitor the PDCCH in the first coreset in condition of transmitting the at least first BFR signal. The wireless device may receive a first DCI via the PDCCH in the first coreset 3606 when the response window is running. The wireless device may consider the BFR procedure successfully completed 3607 when receiving the first DCI via the PDCCH in the first coreset before the response window expires. The wireless device may stop the first timer and/or stop the response window in response to the BFR procedure successfully being completed.

In an example, when the response window expires, the wireless device may set a BFR transmission counter to a value (e.g., one). In an example, in response to the response window expiring, the wireless device may, before the first timer expires, perform one or more actions comprising at least one of: a BFR signal transmission; starting the response window; monitoring the PDCCH; incrementing the BFR transmission counter (e.g., by one) in response to the response window expiring. In an example, the wireless device may repeat the one or more actions until the BFR procedure successfully is completed, or the first timer expires, or the BFR transmission counter indicates a value equal to or greater than a configured transmission number.

In an example, when the first timer expires, and the wireless device does not receive the DCI, the wireless device may declare (or indicate) the BFR procedure failure 3608. In an example, when the transmission number of the BFR signals is greater than the configured transmission number, the wireless device may declare (or indicate) the BFR procedure failure.

In an example, a wireless device may fail in a first random access procedure for a beam failure recovery. The first random access procedure may be a contention-free random access procedure as shown in FIG. 16B generally and/or as shown in FIG. 36 specifically. The wireless device may fail in the first random access procedure due to at least one of: an expiry of a beam failure recovery timer; preamble transmissions reaching a configured number.

In an example, existing beam failure recovery procedures may comprise two independent or separate random access procedures, a first contention-free random access procedure (e.g., as shown in FIG. 16B) for a beam failure recovery and a second contention-based random access procedure (e.g., as shown in FIG. 16A) for the beam failure recovery. A wireless device, implementing the existing beam failure recovery procedures, may initiate the second random access procedure when the wireless device fails in the first random access procedure. Since the first and the second random access procedures are independent, the wireless device may, by initiating the second random access procedure, reset a value of a preamble transmission counter to an initial value (e.g., 1), reset one or more power parameters to initial power values, and/or start transmission of a preamble with the preamble transmission counter setting to the initial value. In an example, resetting the preamble transmission counter to the initial value may increase a number of preamble transmissions in the second random access procedure. Existing beam failure recovery procedures may be inefficient, take a long time, or increase battery power consumption, e.g. the random access procedure may increase a duration of beam failure recovery procedure and increase power consumption for the wireless device. Example embodiments provide processes for the wireless device and the base station to enhance beam failure recovery procedures. Example embodiment may enhance efficiency of beam failure recovery procedure when the wireless device does not receive a response from a gNB after a beam failure recovery timer expires or a preamble transmission number reaches a configured number. Example embodiments may reduce a duration of beam failure recovery procedure and may reduce battery power consumption.

Figure 37:
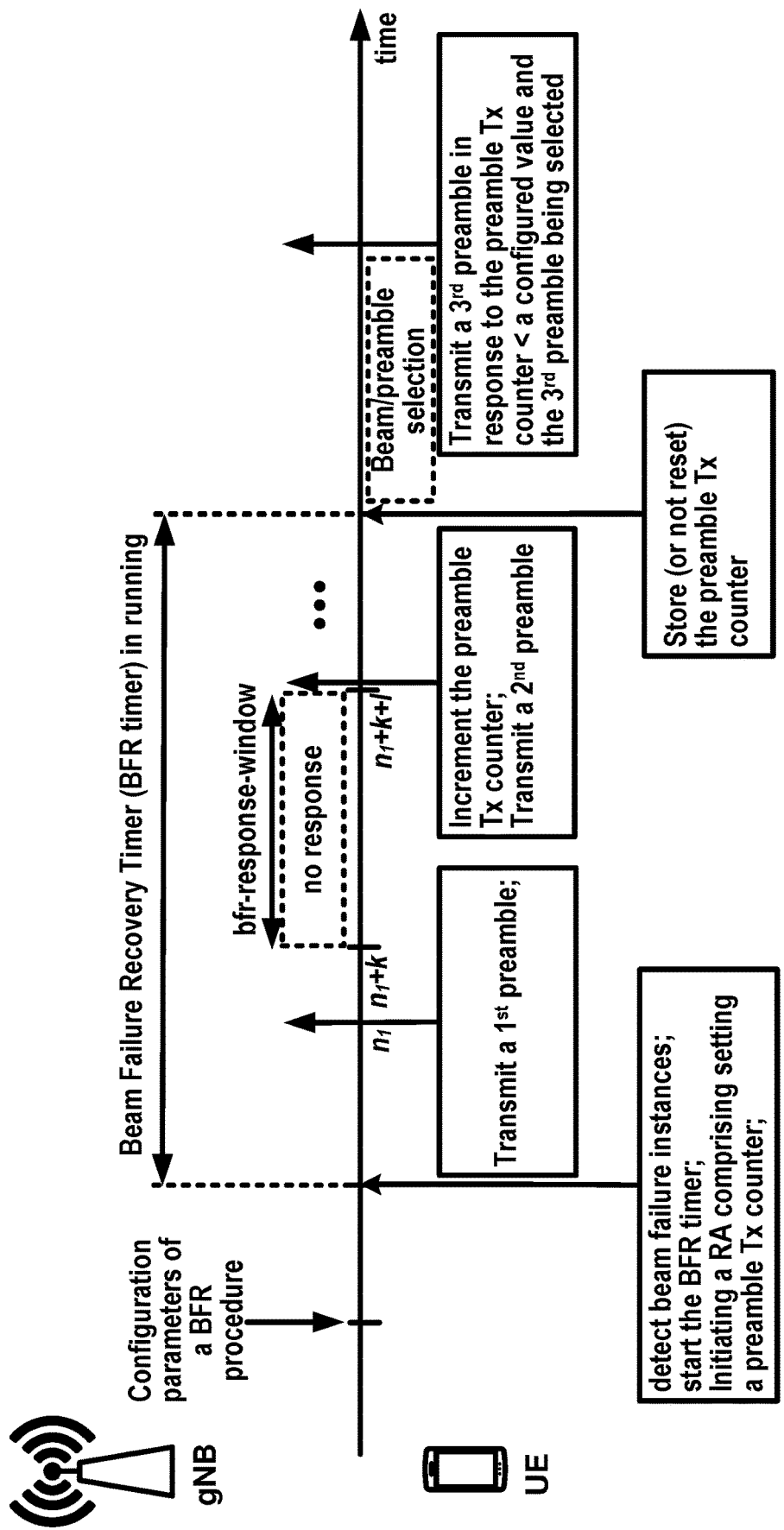
FIG. 37 is an example diagram of beam failure recovery procedure as per an aspect of an embodiment of the present disclosure.

FIG. 37 shows an example embodiment of an enhanced beam failure recovery (BFR) procedure. In an example, a base station (e.g., gNB in FIG. 37) may transmit to a wireless device (e.g., UE in FIG. 37), one or more RRC messages comprising one or more configuration parameters of a BFR procedure. The one or more configuration parameters of the BFR procedure may comprise a first threshold; a second threshold; and/or a first control resource set (e.g., coreset) associated with the BFR procedure. In an example, the first coreset may comprise multiple RBs in the frequency domain, at least a symbol in the time domain.

In an example, the one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources.

In an example, the one or more configuration parameters of the BFR procedure may indicate one or more PUCCH or scheduling request (SR) resources associated with a third set of RSs (beams). In an example, the one or more PUCCH or SR resource may comprise at least one of: time allocation; frequency allocation; cyclic shift; orthogonal cover code; and/or a spatial setting. In an example, each RS of the third set of RSs may be associated with each of the one or more PUCCH/SR resources.

In an example, the first set of RSs may be one or more first CSI-RSs or one or more first SSBs. In an example, the second set of RSs may be one or more second CSI-RSs or one or more second SSBs. In an example, the third set of RSs may be one or more third CSI-RSs or one or more third SSBs. In an example, a BFR signal may be a PRACH preamble transmitted via a time/frequency resource of a PRACH resource. The PRACH resource may be selected from the one or more PRACH resources associated with the second set of RSs (beams) for candidate beam selection, or from the one or more contention-based PRACH resources. In an example, a BFR signal may be a PUCCH/SR transmitted on a PUCCH/SR resource.

In an example, the one or more configuration parameters of the BFR procedure may further comprise a first timer value (e.g., one of 10 ms, 20 ms, 40 ms, 60 ms, 80 ms, 100 ms, 150 ms, 200 ms) of beam failure recovery timer (e.g., beamFailureRecoveryTimer), a preamble transmission number (e.g., preambleTransMax with a value of one of 3, 4, 5, 6, 7, 8, 10, 20, 50, 100, and 200), a second timer value (e.g., one of 1 slot, 2 slots, 4 slots, 8 slots, 10 slots, 20 slots, 40 slots and 80 slots) a beam failure recovery response window (e.g., bfr-reponse-window), and/or a beam failure instance number (e.g., beamFadureinstanceMaxCount with a value of one of 1, 2, 3, 4, 5, 6, 8 and 10).

In an example, the UE may detect one or more beam failure instances when a quality (e.g., RSRP or SINR) of at least one of the first set of RSs is lower than the first threshold. when the one or more beam failure instances reach the beam failure instance number (e.g., beamFadureinstanceMaxCount), the UE may start the beam failure recovery timer (e.g., BFR timer as shown in FIG. 37) with the first timer value and initiate a random access procedure (e.g., RA as shown in FIG. 37) for the beam failure recovery. The random access procedure may start from a contention-free random access procedure. Initiating the random access procedure may comprise setting a preamble transmission counter (e.g., preamble Tx counter as shown in FIG. 37) to an initial value (e.g., 1).

In an example, the UE may select at least one beam associated with at least one of the second set of RSs based on the second threshold. In an example, the UE may select the at least one beam when the measured quality (e.g., RSRP or SINR) of a RS associated the at least one beam is greater than the second threshold. The UE may select a BFR signal (e.g., a $1^{st}$ preamble as shown in FIG. 37) based on the at least one beam. The UE may transmit the BFR signal to a gNB (e.g, at slot/subframe $n_1$). In an example, the BFR signal may be a PRACH preamble associated with the at least one beam. the association between the BFR signal and the PRACH preamble may be indicated in the one or more configuration parameters of the BFR procedure. In an example, the BFR signal may be a PUCCH/SR signal associated with the at least one beam.

In an example, in response to transmitting the BFR signal, the UE may start monitoring a first PDCCH for receiving a DCI, in the first coreset, after a time period since transmitting the BFR signal (e.g., in slot/subframe $n_1+k$ as shown in FIG. 37). The DCI may comprise a response to the BFR signal. The time period may be a fixed period (e.g., 4 slots), or a configured value by an RRC message. The UE may start the beam failure recovery response window with the second timer value after the time period since transmitting the BFR signal. The wireless device may monitor the first PDCCH in the first coreset during the beam failure recovery response window.

In an example, the UE may receive the DCI via the first PDCCH in the first coreset during the beam failure recovery response window. The wireless device may consider the BFR procedure (e.g., successfully) completed in response to receiving the DCI via the first PDCCH in the first coreset.

In an example, the UE may not receive the DCI via the first PDCCH in the first coreset during the beam failure recovery response window. In response to an expiry of the beam failure recovery window (e.g., at slot/subframe $n_1+k+l$), the UE may increment the preamble transmission counter (e.g., by one) and transmit a second BFR signal (e.g., $2^{nd}$ preamble as shown in FIG. 37). In response to not receiving the DCI during the beam failure recovery response window, the UE may repeat one or more actions comprising at least one of: transmitting a preamble; starting the beam failure recovery response window; monitoring the first PDCCH; and/or incrementing the preamble transmission counter.

In an example, the beam failure recovery timer may expire during the beam failure recovery procedure. In response to an expiry of the beam failure recovery timer, the UE may store (keep or not reset) the preamble transmission counter. The UE may store (keep or not reset) the preamble transmission counter if the preamble transmission counter indicates a value equal to or less than the preamble transmission number (e.g., preambleTransMax). By storing (or keeping or not resetting) the preamble transmission counter, the UE may continue the random access procedure for the beam failure recovery. The UE may continue the random access procedure by using the one or more contention-based PRACH resources.

In an example, in response to the expiry of the beam failure recovery timer, the UE may store the preamble transmission counter. The UE may select a new beam and/or a third preamble. In response to the preamble transmission counter being less than the preamble transmission number (e.g., preambleTransMax), the UE may transmit the third preamble (e.g, 3rd preamble as shown in FIG. 37). Example embodiments improve existing BFR procedures by continuing a BFR procedure after a contention-free random access procedure fails, specially not resetting the preamble transmission counter. By the example embodiments, a first part of the random access procedure before a contention-free random access procedure fails and a second part of the random access procedure after the contention-free random access procedure fails, may become a single procedure, resulting in improved efficiency and batter power reduction for the UE when performing the beam failure recovery. Example embodiments may enhance efficiency of beam failure recovery procedure when the wireless device does not receive a response from a gNB after a beam failure recovery timer expires. Example embodiments may reduce a duration of beam failure recovery procedure and may reduce battery power consumption.

Figure 38:
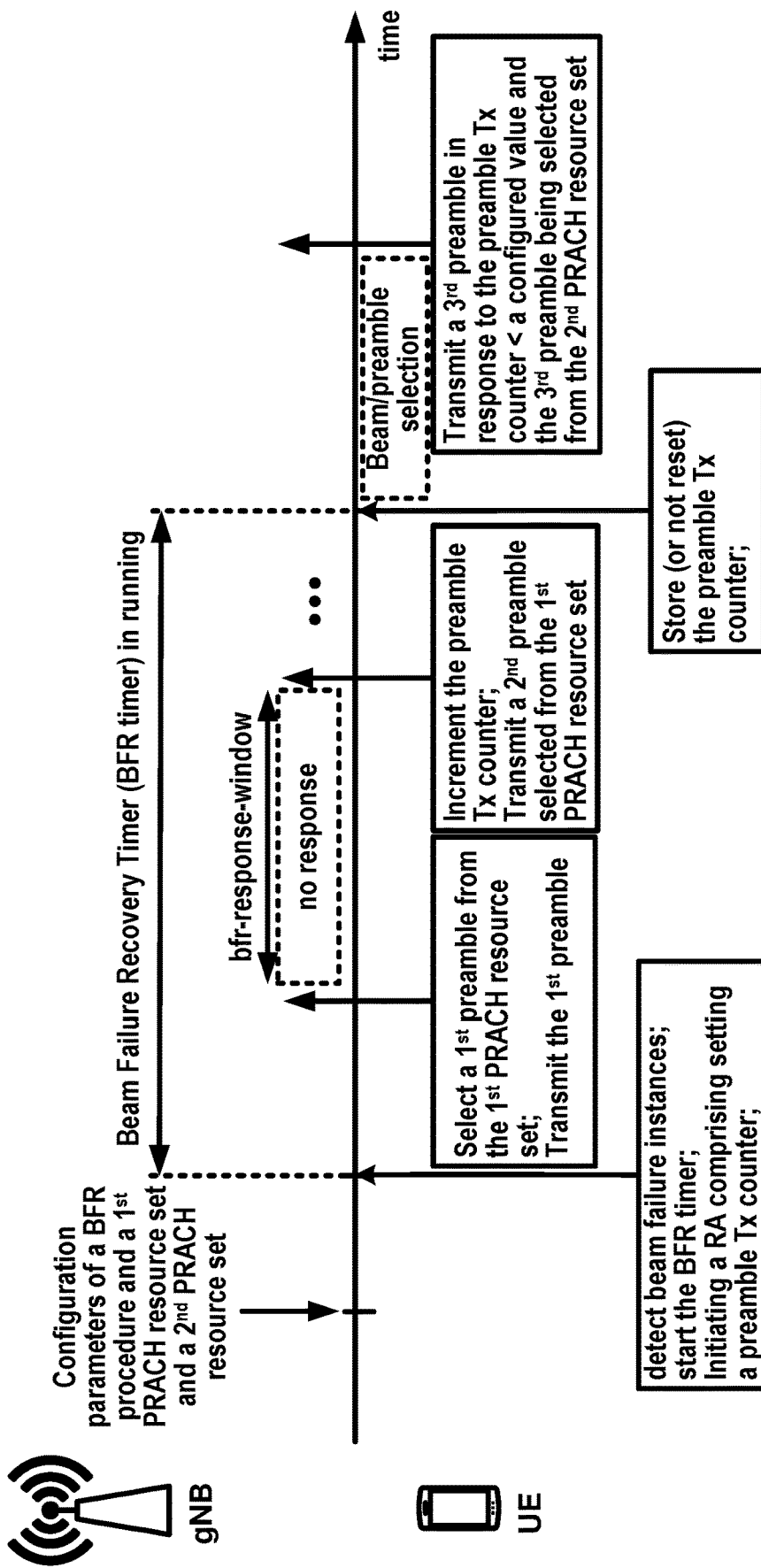
FIG. 38 is an example diagram of beam failure recovery procedure as per an aspect of an embodiment of the present disclosure.

FIG. 38 shows an example embodiment of an enhanced beam failure recovery (BFR) procedure. In an example, a base station (e.g., gNB in FIG. 38) may transmit to a wireless device (e.g., UE in FIG. 38), one or more RRC messages comprising one or more configuration parameters of a BFR procedure. The one or more RRC messages may further comprise a first PRACH resource set (e.g., $1^{st}$ PRACH resource set in FIG. 38) and a second PRACH resource set (e.g., $2^{nd}$ PRACH resource set in FIG. 38). The one or more configuration parameters of the BFR procedure may comprise a first threshold; a second threshold; and/or a first control resource set (e.g., coreset) associated with the BFR procedure. In an example, the first coreset may comprise multiple RBs in the frequency domain, at least a symbol in the time domain.

In an example, the one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, the one or more PRACH resources may be the first PRACH resource set. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources. The one or more contention-based PRACH resources may be the second PRACH resource set.

In an example, a BFR signal may be a PRACH preamble transmitted via a time/frequency resource of a PRACH resource. The PRACH resource may be selected from the one or more PRACH resources associated with the second set of RSs (beams) for candidate beam selection, or from the one or more contention-based PRACH resources. The preamble may be selected from the first PRACH resource set or the second PRACH resource set.

In an example, the one or more configuration parameters of the BFR procedure may further comprise a first timer value of beam failure recovery timer (e.g., beamFailureRecoveryTimer), a preamble transmission number (e.g., preambleTransMax), a second timer value of a beam failure recovery response window (e.g, bfr-reponse-window), and/or a beam failure instance number (e.g., beamFailureInstanceMaxCount).

In an example, the UE may detect one or more beam failure instances when a quality (e.g., RSRP or SINR) of at least one of the first set of RSs is lower than the first threshold. when the one or more beam failure instances reach the beam failure instance number (e.g., beamFailureInstanceMaxCount), the UE may start the beam failure recovery timer (e.g., BFR timer as shown in FIG. 38) with the first timer value and initiate a random access procedure (e.g., RA as shown in FIG. 38) for the beam failure recovery. The random access procedure may start from a contention-free random access procedure. Initiating the random access procedure may comprise setting a preamble transmission counter (e.g., preamble Tx counter as shown in FIG. 38) to an initial value (e.g., 1).

In an example, the UE may select at least one beam associated with at least one of the second set of RSs based on the second threshold. In an example, the UE may select the at least one beam when the measured quality (e.g., RSRP or SINR) of a RS associated the at least one beam is greater than the second threshold. The UE may select a first preamble (e.g., a 1$^{st}$ preamble as shown in FIG. 38) from the first PRACH resource set, based on the at least one beam. The UE may transmit the first preamble to a gNB (e.g, at slot/subframe $n_1$). In an example, the first preamble may be a PRACH preamble associated with the at least one beam. the association between the first preamble and the PRACH preamble may be indicated in the one or more configuration parameters of the BFR procedure.

In an example, in response to transmitting the first preamble, the UE may start monitoring a first PDCCH for receiving a DCI, in the first coreset, after a time period since transmitting the first preamble (e.g., in slot/subframe $n_1+k$ as shown in FIG. 38). The DCI may comprise a response to the first preamble. The time period may be a fixed period (e.g., 4 slots), or a configured value by an RRC message. The UE may start the beam failure recovery response window with the second timer value after the time period since transmitting the first preamble. The wireless device may monitor the first PDCCH in the first coreset during the beam failure recovery response window.

In an example, the UE may receive the DCI via the first PDCCH in the first coreset during the beam failure recovery response window. The wireless device may consider the BFR procedure successfully completed in response to receiving the DCI via the first PDCCH in the first coreset.

In an example, the UE may not receive the DCI via the first PDCCH in the first coreset during the beam failure recovery response window. In response to an expiry of the beam failure recovery window (e.g., at slot/subframe $n_1+k+1$), the UE may increment the preamble transmission counter (e.g., by one). The UE may select a second preamble (e.g., 2$^{nd}$ preamble in FIG. 38) from the first PRACH resource set. The UE may transmit the second preamble in response to selecting the second preamble. The selecting the second preamble is based on the first threshold, same as selecting the first preamble. In response to not receiving the DCI during the beam failure recovery response window, the UE may repeat one or more actions comprising at least one of: transmitting a preamble; starting the beam failure recovery response window; monitoring the first PDCCH; and/or incrementing the preamble transmission counter.

In an example, the beam failure recovery timer may expire during the beam failure recovery procedure. In response to an expiry of the beam failure recovery timer, the UE may store (keep or not reset) the preamble transmission counter. By storing (or keeping or not resetting) the preamble transmission counter, the UE may continue the random access procedure for the beam failure recovery. The UE may continue the random access procedure by using the second PRACH resource set. The second PRACH resource set may be a contention-based preamble and RACH resource set.

In an example, in response to the expiry of the beam failure recovery timer, the UE may store the preamble transmission counter. The UE may select a third preamble (e.g, 3rd preamble as shown in FIG. 38) from the second PRACH resource set. In response to the preamble transmission counter being less than the preamble transmission number (e.g., preambleTransMax), and selecting the third preamble, the UE may transmit the third preamble. Example embodiments improve existing BFR procedures by continuing a BFR procedure after a contention-free random access procedure fails, specially not resetting the preamble transmission counter. By the example embodiments, the random access procedure, before and after a contention-free random access procedure fails (e.g., due to an expiry of the beam failure recovery timer), may become a single procedure, resulting in improved efficiency and batter power reduction for the UE when performing the beam failure recovery. Example embodiments may enhance efficiency of beam failure recovery procedure when the wireless device does not receive a response from a gNB after a beam failure recovery timer expires. Example embodiments may reduce a duration of beam failure recovery procedure and may reduce battery power consumption.

In an example, the wireless device may trigger a BFR procedure when a number of beam failure instances (e.g. contiguous) are detected. A beam failure instance may occur when quality of a beam pair link is lower than a configured threshold. For example, a beam failure instance may occur when the RSRP value or SINR value of a beam pair link is lower than a first threshold, or the BLER (block error rate) of the beam pair link is higher than a second threshold. Triggering a BFR procedure by sporadic beam failure instances may increase power consumption of the wireless device. Example embodiment provides methods and systems for triggering a BFR procedure.

Figure 39:
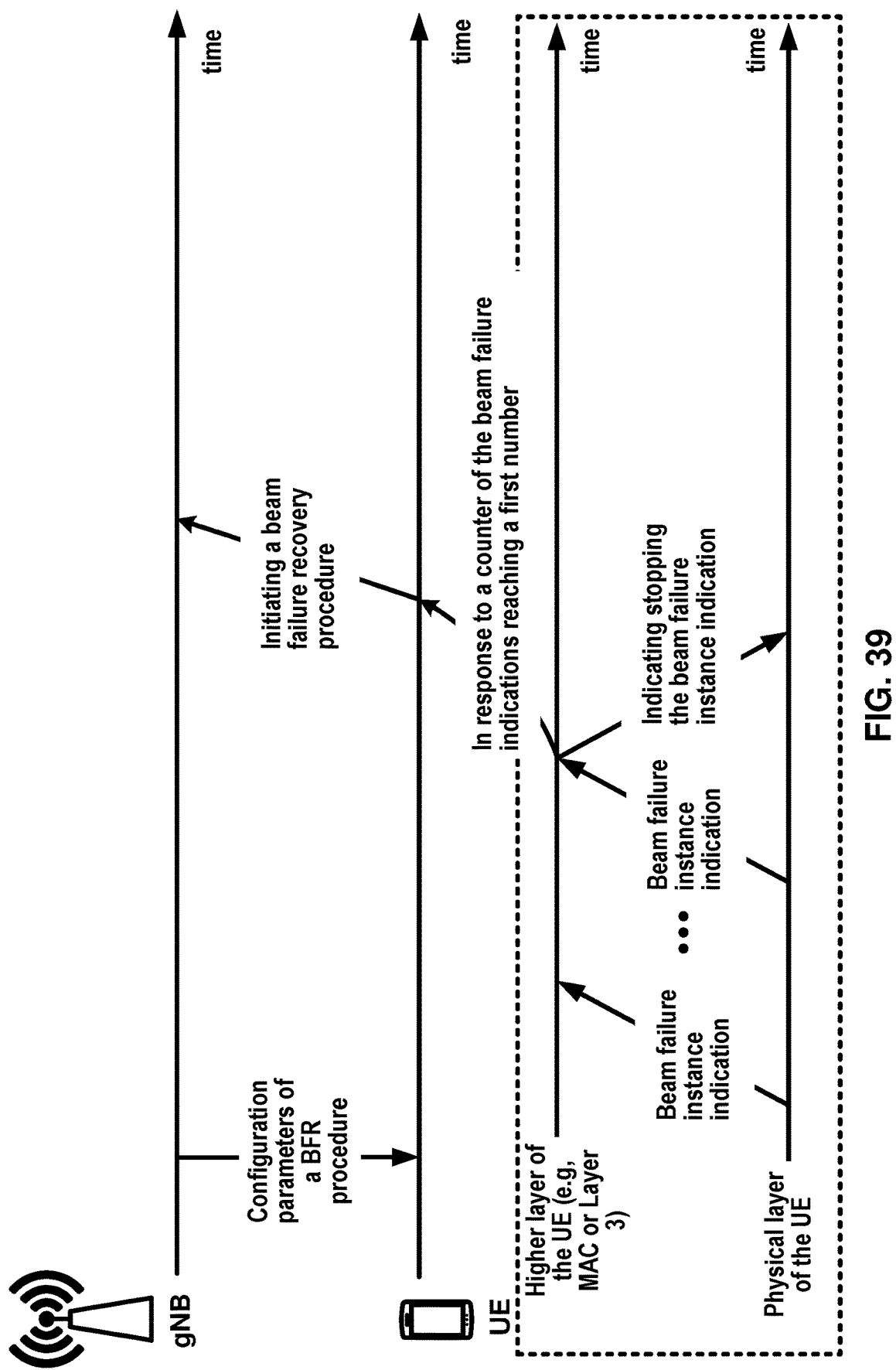
FIG. 39 is an example diagram of beam failure recovery procedure as per an aspect of an embodiment of the present disclosure.

FIG. 39 shows an example embodiment of an enhanced beam failure recovery procedure. In an example, a base station (e.g., gNB in FIG. 39) may transmit to a wireless device (e.g., UE in FIG. 39), one or more RRC messages comprising one or more configuration parameters of a BFR procedure. The one or more configuration parameters of the BFR procedure may comprise a first threshold; a second threshold; and/or a first control resource set (e.g., coreset) associated with the BFR procedure. The one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources.

In an example, the one or more configuration parameters of the BFR procedure may further comprise a first timer value of beam failure recovery timer (e.g., beamFailureRecoveryTimer), a preamble transmission number (e.g., preambleTransMax), a second timer value of a beam failure recovery response window (e.g, bfr-reponse-window), a beam failure instance number (e.g., beamFailureinstance-MaxCount), a third timer value of a beam failure detection timer (e.g., beamFailureDetectionTimer); and/or a periodicity of beam failure instance indication.

In an example, a physical layer of the wireless device (e.g., Physical layer of the UE in FIG. 39) may measure the first set of RSs. The physical layer may indicate one or more beam failure instance (e.g., beam failure instance indication as shown in FIG. 39) or one or more beam non-failure instance periodically to a higher layer (e.g., MAC layer or layer 3, as shown in FIG. 39) of the wireless device, based on the first threshold. In an example, the physical layer may indicate a beam failure instance when the measured quality (e.g., RSRP or SINR) of at least one of the first set of RSs is lower than the first threshold. In an example, the physical layer may indicate a beam failure instance when the measured quality (e.g., a hypothetic BLER) of at least one of the first set of RSs is higher than the first threshold. In an example, the physical layer may indicate a beam non-failure instance when the measured quality (e.g., RSRP or SINR) of at least one of the first set of RSs is equal to or higher than the first threshold. In an example, the physical layer may indicate a beam non-failure instance when the measured quality (e.g., a hypothetic BLER) of at least one of the first set of RSs is lower than the first threshold. In an example, the periodicity of the indication may be a value configured by the gNB or be same as the periodicity of transmission of the first set of RSs.

In an example, a MAC entity of the wireless device may set a beam failure instance counter to a value (e.g., one) in response to receiving a first beam failure indication from the physical layer. In an example, when receiving a contiguous second beam failure indication, the MAC entity may increment the beam failure instance counter (e.g., by one). In an example, when receiving a third beam non-failure indication, the MAC entity may reset the beam failure instance counter (e.g., to zero).

In an example, when receiving a first beam failure indication from the physical layer, the MAC entity may start the beam failure detection timer (e.g., beamFailureDetection-Timer) with the third timer value. When receiving a second beam non-failure indication from the physical layer, the MAC entity may restart the beam failure detection timer. When the beam failure detection timer expires, and the beam failure instance counter indicates a value smaller than the beam failure instance number, the MAC entity may not trigger the BFR procedure. In an example, the MAC entity may reset the beam failure instance counter (e.g., 0), when the beam failure detection timer expires, and/or the beam failure instance counter indicates a value smaller than the beam failure instance number. In an example, the MAC entity may reset the beam failure detection timer to the third timer value, when the beam failure detection timer expires, and/or the beam failure instance counter indicates a value smaller than the beam failure instance number.

In an example, as shown in FIG. 39, when the beam failure instance counter indicates a value equal to or greater than the beam failure instance number, or beam failure indications (e.g., contiguous) received by the MAC entity reaches the beam failure instance number, the MAC entity of the wireless device may trigger a BFR procedure. The wireless device may initiate the BFR procedure (as shown in FIG. 39).

In an example, in response to the beam failure instance counter indicates a value equal to or greater than the beam failure instance number, the MAC entity of the wireless device may indicate to the physical layer to stop beam failure instance indication, when triggering the BFR procedure. Indicating to the physical layer of the UE to stop beam failure instance indication may save batter power of the UE when the BFR procedure is ongoing.

Figure 40:
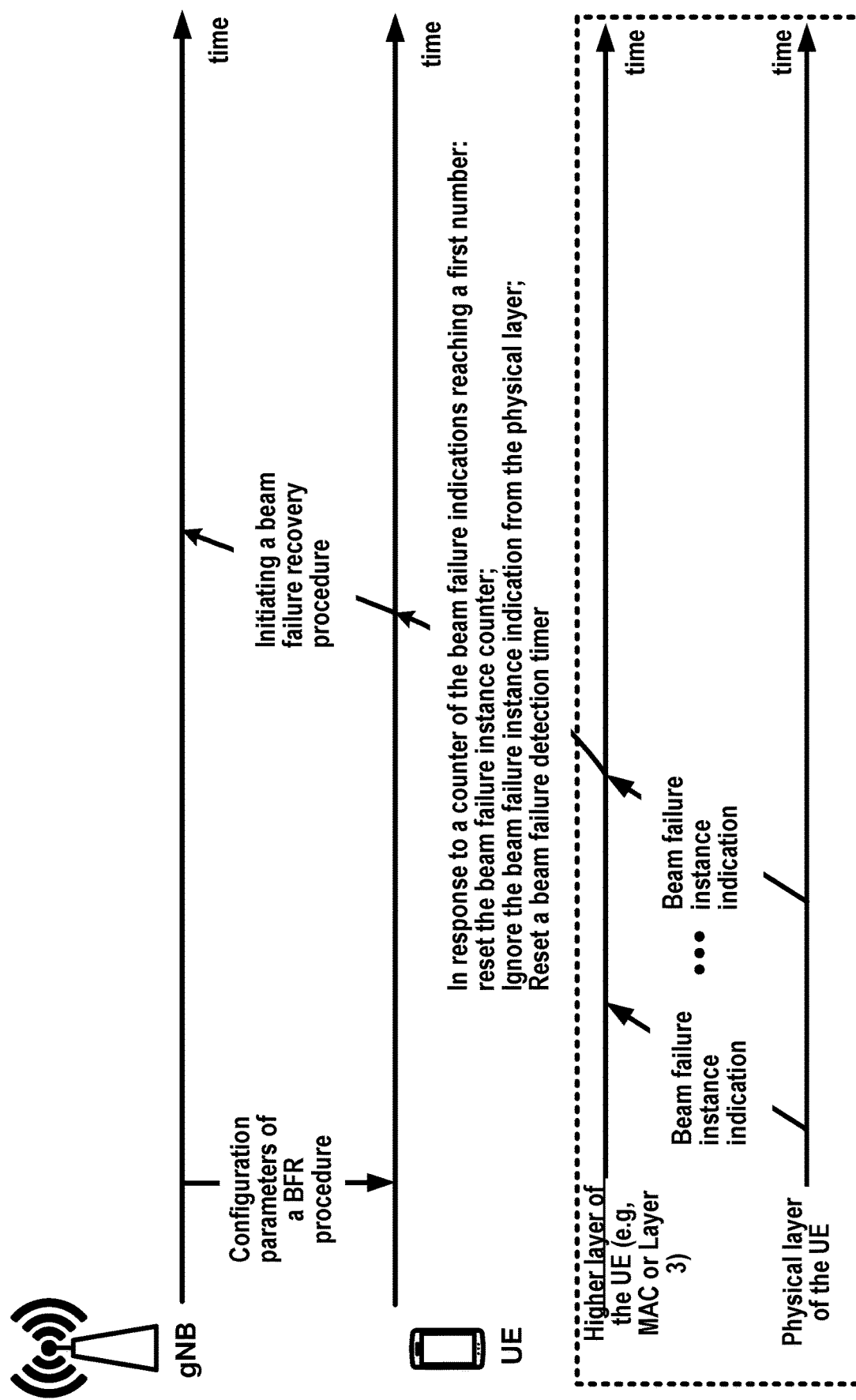
FIG. 40 is an example diagram of beam failure recovery procedure as per an aspect of an embodiment of the present disclosure.

FIG. 40 shows an example embodiment of an enhanced beam failure recovery procedure. In an example, a base station (e.g., gNB in FIG. 40) may transmit to a wireless device (e.g., UE in FIG. 40), one or more RRC messages comprising one or more configuration parameters of a BFR procedure. The one or more configuration parameters of the BFR procedure may comprise a first threshold; a second threshold; and/or a first control resource set (e.g., coreset) associated with the BFR procedure. The one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources.

In an example, the one or more configuration parameters of the BFR procedure may further comprise a first timer value of beam failure recovery timer (e.g., beamFailureRecoveryTimer), a preamble transmission number (e.g., preambleTransMax), a second timer value of a beam failure recovery response window (e.g, bfr-reponse-window), a beam failure instance number (e.g., beamFailureinstance-MaxCount), a third timer value of a beam failure detection timer (e.g., beamFailureDetectionTimer); and/or a periodicity of beam failure instance indication.

In an example, a physical layer of the wireless device (e.g., Physical layer of the UE in FIG. 40) may measure the first set of RSs. The physical layer may indicate one or more beam failure instance (e.g., beam failure instance indication as shown in FIG. 40) or one or more beam non-failure instance periodically to a higher layer (e.g., MAC layer or layer 3, as shown in FIG. 40) of the wireless device, based on the first threshold. In an example, the physical layer may indicate a beam failure instance when the measured quality (e.g., RSRP or SINR) of at least one of the first set of RSs is lower than the first threshold. In an example, the physical layer may indicate a beam failure instance when the measured quality (e.g., a hypothetic BLER) of at least one of the first set of RSs is higher than the first threshold. In an example, the physical layer may indicate a beam non-failure instance when the measured quality (e.g., RSRP or SINR) of at least one of the first set of RSs is equal to or higher than the first threshold. In an example, the physical layer may indicate a beam non-failure instance when the measured quality (e.g., a hypothetic BLER) of at least one of the first set of RSs is lower than the first threshold. In an example, the periodicity of the indication may be a value configured by the gNB or be same as the periodicity of transmission of the first set of RSs.

In an example, a MAC entity of the wireless device may set a beam failure instance counter to a value (e.g., one) in response to receiving a first beam failure indication from the physical layer. In an example, when receiving a contiguous second beam failure indication, the MAC entity may increment the beam failure instance counter (e.g., by one). In an example, when receiving a third beam non-failure indication, the MAC entity may reset the beam failure instance counter (e.g., to zero).

In an example, when receiving a first beam failure indication from the physical layer, the MAC entity may start the beam failure detection timer (e.g., beamFailureDetection-Timer) with the third timer value. When receiving a second beam non-failure indication from the physical layer, the MAC entity may restart the beam failure detection timer. When the beam failure detection timer expires, and the beam failure instance counter indicates a value smaller than the beam failure instance number, the MAC entity may not trigger the BFR procedure. In an example, the MAC entity may reset the beam failure instance counter (e.g., 0), when the beam failure detection timer expires, and/or the beam failure instance counter indicates a value smaller than the beam failure instance number. In an example, the MAC entity may reset the beam failure detection timer, when the beam failure detection timer expires, and/or the beam failure instance counter indicates a value smaller than the beam failure instance number.

In an example, as shown in FIG. 40, when the beam failure instance counter indicates a value equal to or greater than the beam failure instance number, or beam failure indications (e.g., contiguous) received by the MAC entity reaches the beam failure instance number, the MAC entity of the wireless device may trigger a BFR procedure. The wireless device may initiate the BFR procedure (as shown in FIG. 40).

In an example, in response to the beam failure instance counter indicating a value equal to or greater than the beam failure instance number, when the triggered BFR procedure is ongoing, the MAC entity of the wireless device may reset the beam failure instance counter (e.g., to zero), reset the beam failure detection timer, and/or ignore the periodic beam failure instance indication. Example embodiments may improve power consumption, time delay, or uplink interference when performing a beam failure recovery procedure.

Figure 41:
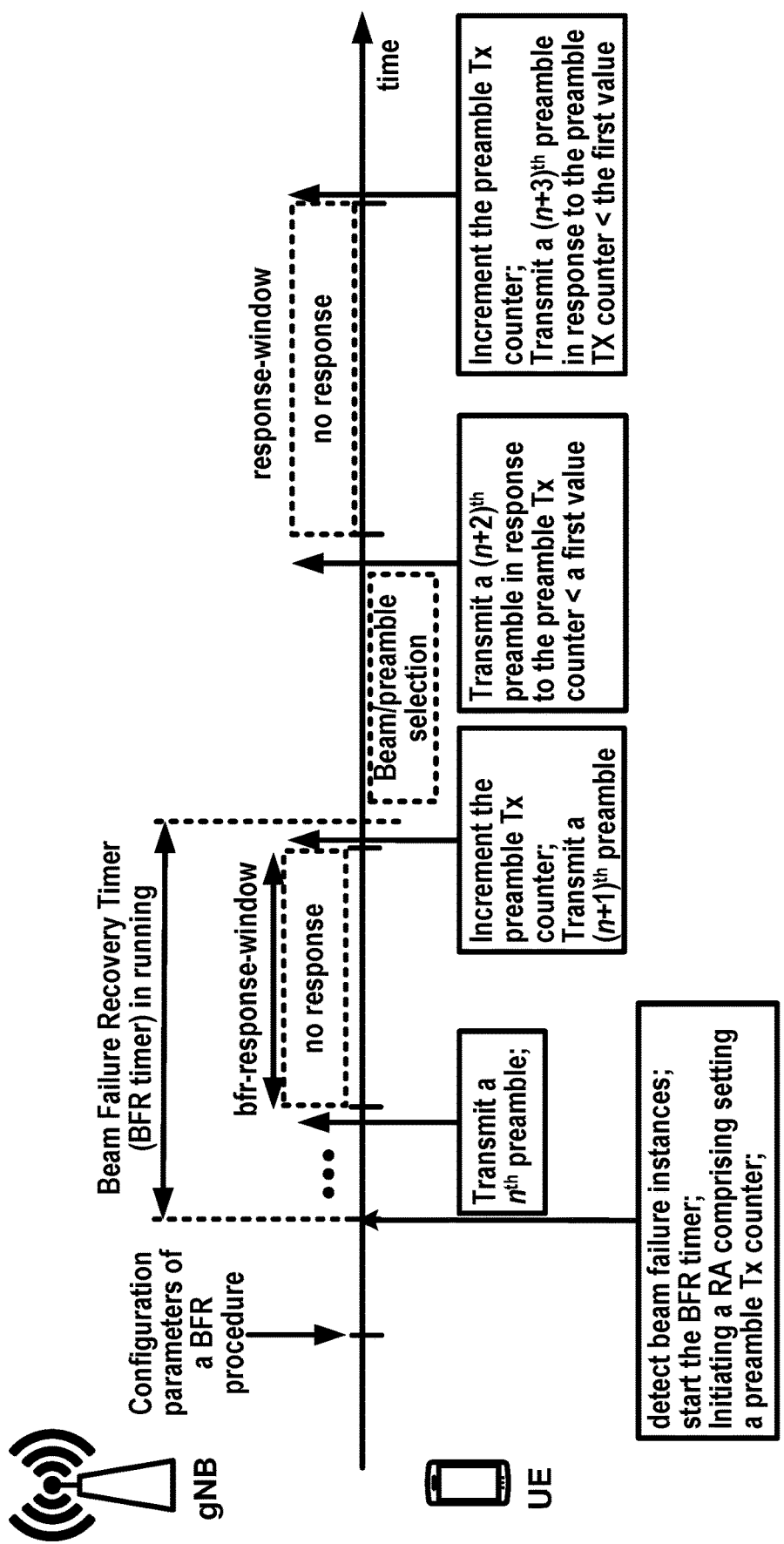
FIG. 41 is an example diagram of beam failure recovery procedure as per an aspect of an embodiment of the present disclosure.

FIG. 41 shows an example embodiment of an enhanced beam failure recovery procedure. In an example, a base station (e.g., gNB in FIG. 41) may transmit to a wireless device (e.g., UE in FIG. 41), one or more RRC messages comprising one or more configuration parameters of a BFR procedure. The one or more configuration parameters of the BFR procedure may comprise a first threshold; a second threshold; and/or a first control resource set (e.g., coreset) associated with the BFR procedure. In an example, the first coreset may comprise multiple RBs in the frequency domain, at least a symbol in the time domain.

In an example, the one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources.

In an example, the one or more configuration parameters of the BFR procedure may indicate one or more PUCCH or scheduling request (SR) resources associated with a third set of RSs (beams). In an example, the one or more PUCCH or SR resource may comprise at least one of: time allocation; frequency allocation; cyclic shift; orthogonal cover code; and/or a spatial setting. In an example, each RS of the third set of RSs may be associated with each of the one or more PUCCH/SR resources.

In an example, the first set of RSs may be one or more first CSI-RSs or one or more first SSBs. In an example, the second set of RSs may be one or more second CSI-RSs or one or more second SSBs. In an example, the third set of RSs may be one or more third CSI-RSs or one or more third SSBs. In an example, a BFR signal may be a PRACH preamble transmitted via a time/frequency resource of a PRACH resource. The PRACH resource may be selected from the one or more PRACH resources associated with the second set of RSs (beams) for candidate beam selection, or from the one or more contention-based PRACH resources. In an example, a BFR signal may be a PUCCH/SR transmitted on a PUCCH/SR resource.

In an example, the one or more configuration parameters of the BFR procedure may further comprise a first timer value of beam failure recovery timer (e.g., beamFailureRecoveryTimer), a preamble transmission number (e.g., preambleTransMax), a second timer value of a beam failure recovery response window (e.g, bfr-reponse-window), and/or a beam failure instance number (e.g., beamFailureInstanceMaxCount).

In an example, the UE may detect one or more beam failure instances when a quality (e.g., RSRP or SINR) of at least one of the first set of RSs is lower than the first threshold. when the one or more beam failure instances reach the beam failure instance number (e.g., beamFailureInstanceMaxCount), the UE may start the beam failure recovery timer (e.g., BFR timer as shown in FIG. 41) with the first timer value and initiate a random access procedure (e.g., RA as shown in FIG. 41) for the beam failure recovery. The random access procedure may start from a contention-free random access procedure. Initiating the random access procedure may comprise setting a preamble transmission counter (e.g., preamble Tx counter as shown in FIG. 41) to an initial value (e.g., 1).

In an example, the UE may perform a contention-free random access procedure for the BFR, when the beam failure recovery timer is running. In an example, the UE may select at least one beam associated with at least one of the second set of RSs based on the second threshold. In an example, the UE may select the at least one beam when the measured quality (e.g., RSRP or SINR) of a RS associated the at least one beam is greater than the second threshold. The UE may select a BFR signal (e.g., a $n^{th}$ preamble as shown in FIG. 41) based on the at least one beam. The UE may transmit the BFR signal to a gNB.

In an example, in response to transmitting the BFR signal, the UE may start monitoring a first PDCCH for receiving a DCI, in the first coreset. The UE may start the beam failure recovery response window with the second timer value after the time period since transmitting the BFR signal. The wireless device may monitor the first PDCCH in the first coreset during the beam failure recovery response window.

In an example, the UE may not receive the DCI via the first PDCCH in the first coreset during the beam failure recovery response window. In response to an expiry of the beam failure recovery window, the UE may increment the preamble transmission counter (e.g., by one) and transmit a second BFR signal (e.g., (n+1)$^{th}$ preamble as shown in FIG. 41). In response to not receiving the DCI during the beam failure recovery response window, the UE may repeat one or more actions comprising at least one of: transmitting a preamble; starting the beam failure recovery response window; monitoring the first PDCCH; and/or incrementing the preamble transmission counter.

In an example, the beam failure recovery timer may expire during the beam failure recovery procedure. In response to an expiry of the beam failure recovery timer, the UE may store (keep or not reset) the preamble transmission counter. By storing (or keeping or not resetting) the preamble transmission counter, the UE may continue the random access procedure for the beam failure recovery. The UE may continue the random access procedure by using the one or more contention-based PRACH resources.

In an example, in response to the expiry of the beam failure recovery timer, the UE may store the preamble transmission counter. The UE may select a new beam and/or a third preamble (e.g., (n+2)$^{th}$ preamble as shown in FIG. 41). In response to the preamble transmission counter being less than the preamble transmission number (e.g., preambleTransMax), the UE may transmit the third preamble. In response to transmitting the third preamble, the UE may monitor a second PDCCH for a response to the third preamble during a response window. The UE may not receive the response to the third preamble during the response window. In response to not receiving the response, the UE may increment the preamble transmission counter and/or select a fourth preamble (e.g., $(n+3)^{th}$ preamble as shown in FIG. 41). The UE may transmit the fourth preamble in response to the preamble transmission counter being less than the preamble transmission number (e.g., preambleTransMax). Example embodiments improve existing BFR procedures by continuing a BFR procedure after a contention-free random access procedure fails, specially not resetting the preamble transmission counter, e.g., until initiating a new random access procedure. By the example embodiments, the random access procedure, before and after a contention-free random access procedure fails (e.g., due to an expiry of the beam failure recovery timer), may become a single procedure, resulting in improved efficiency and batter power reduction for the UE when performing the beam failure recovery. Example embodiments may enhance efficiency of beam failure recovery procedure when the wireless device does not receive a response from a gNB after a beam failure recovery timer expires. Example embodiments may reduce a duration of beam failure recovery procedure and may reduce battery power consumption.

Figure 42:
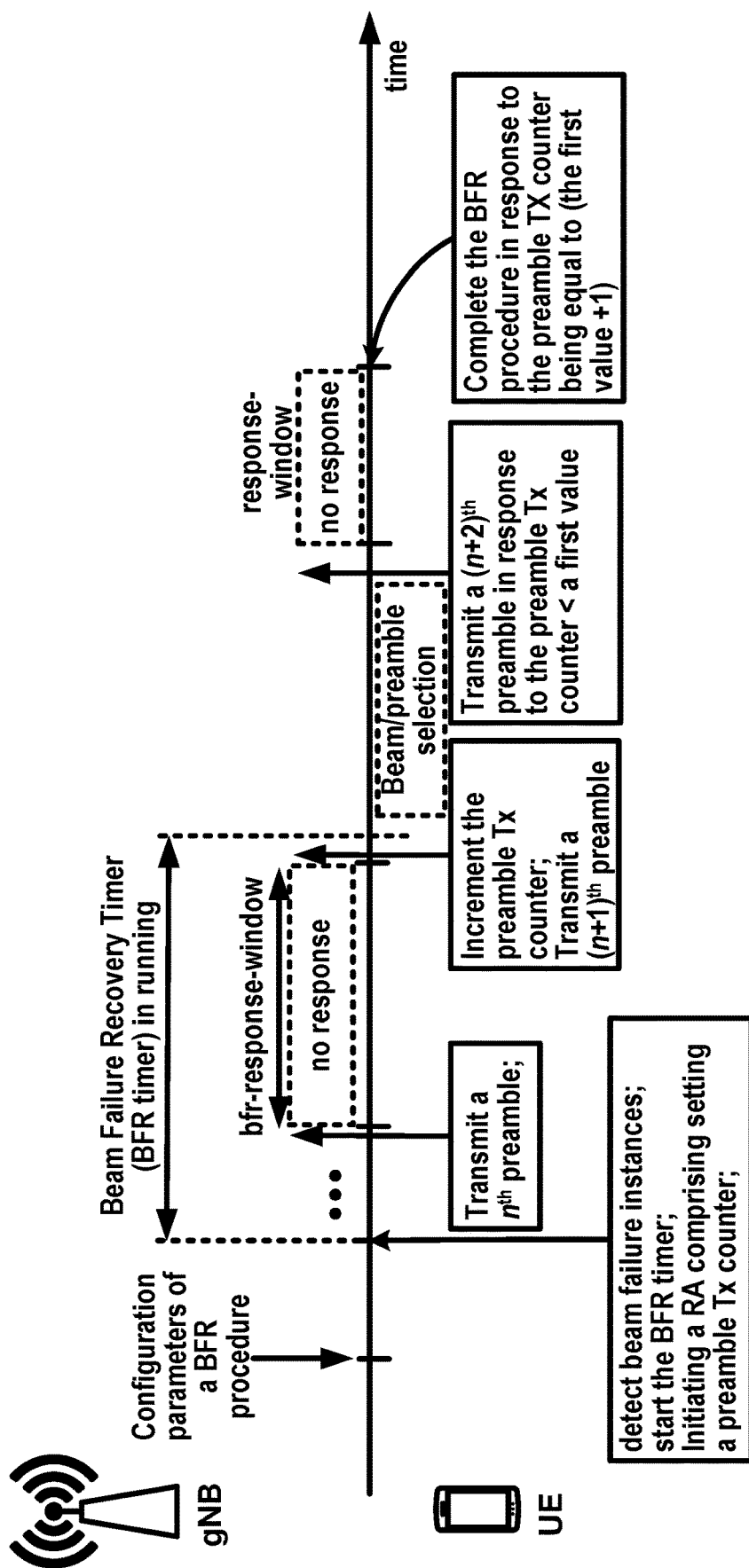
FIG. 42 is an example diagram of beam failure recovery procedure as per an aspect of an embodiment of the present disclosure.

FIG. 42 shows an example embodiment of an enhanced beam failure recovery procedure. In an example, a base station (e.g., gNB in FIG. 42) may transmit to a wireless device (e.g., UE in FIG. 42), one or more RRC messages comprising one or more configuration parameters of a BFR procedure. The one or more configuration parameters of the BFR procedure may comprise a first threshold; a second threshold; and/or a first control resource set (e.g., coreset) associated with the BFR procedure. In an example, the first coreset may comprise multiple RBs in the frequency domain, at least a symbol in the time domain.

In an example, the one or more configuration parameters of the BFR procedure may indicate a first set of RSs for beam failure detection; and/or one or more PRACH resources associated with a second set of RSs (beams) for candidate beam selection. In an example, the one or more PRACH resources may comprise at least one of: one or more preambles; and/or one or more time/frequency resources. In an example, each RS of the second set of RSs may be associated with a preamble, a timer resource and/or a frequency resource of one of the one or more PRACH resources. In an example, the one or more RRC messages may further comprise configuration parameters of one or more contention-based PRACH resources.

In an example, the one or more configuration parameters of the BFR procedure may indicate one or more PUCCH or scheduling request (SR) resources associated with a third set of RSs (beams). In an example, the one or more PUCCH or SR resource may comprise at least one of: time allocation; frequency allocation; cyclic shift; orthogonal cover code; and/or a spatial setting. In an example, each RS of the third set of RSs may be associated with each of the one or more PUCCH/SR resources.

In an example, the first set of RSs may be one or more first CSI-RSs or one or more first SSBs. In an example, the second set of RSs may be one or more second CSI-RSs or one or more second SSBs. In an example, the third set of RSs may be one or more third CSI-RSs or one or more third SSBs. In an example, a BFR signal may be a PRACH preamble transmitted via a time/frequency resource of a PRACH resource. The PRACH resource may be selected from the one or more PRACH resources associated with the second set of RSs (beams) for candidate beam selection, or from the one or more contention-based PRACH resources. In an example, a BFR signal may be a PUCCH/SR transmitted on a PUCCH/SR resource.

In an example, the one or more configuration parameters of the BFR procedure may further comprise a first timer value of beam failure recovery timer (e.g., beamFailureRecoveryTimer), a preamble transmission number (e.g., preambleTransMax), a second timer value of a beam failure recovery response window (e.g, bfr-reponse-window), and/or a beam failure instance number (e.g., beamFailureInstanceMaxCount).

In an example, the UE may detect one or more beam failure instances when a quality (e.g., RSRP or SINR) of at least one of the first set of RSs is lower than the first threshold. when the one or more beam failure instances reach the beam failure instance number (e.g., beamFailureInstanceMaxCount), the UE may start the beam failure recovery timer (e.g., BFR timer as shown in FIG. 42) with the first timer value and initiate a random access procedure (e.g., RA as shown in FIG. 42) for the beam failure recovery. The random access procedure may start from a contention-free random access procedure. Initiating the random access procedure may comprise setting a preamble transmission counter (e.g., preamble Tx counter as shown in FIG. 42) to an initial value (e.g., 1).

In an example, the UE may perform a contention-free random access procedure for the BFR, when the beam failure recovery timer is running. In an example, the UE may select at least one beam associated with at least one of the second set of RSs based on the second threshold. In an example, the UE may select the at least one beam when the measured quality (e.g., RSRP or SINR) of a RS associated the at least one beam is greater than the second threshold. The UE may select a BFR signal (e.g., a $n^{th}$ preamble as shown in FIG. 42) based on the at least one beam. The UE may transmit the BFR signal to a gNB.

In an example, in response to transmitting the BFR signal, the UE may start monitoring a first PDCCH for receiving a DCI, in the first coreset. The UE may start the beam failure recovery response window with the second timer value after the time period since transmitting the BFR signal. The wireless device may monitor the first PDCCH in the first coreset during the beam failure recovery response window.

In an example, the UE may not receive the DCI via the first PDCCH in the first coreset during the beam failure recovery response window. In response to an expiry of the beam failure recovery window, the UE may increment the preamble transmission counter (e.g., by one) and transmit a second BFR signal (e.g., $(n+1)^{th}$ preamble as shown in FIG. 42). In response to not receiving the DCI during the beam failure recovery response window, the UE may repeat one or more actions comprising at least one of: transmitting a preamble; starting the beam failure recovery response window; monitoring the first PDCCH; and/or incrementing the preamble transmission counter.

In an example, the beam failure recovery timer may expire during the beam failure recovery procedure. In response to an expiry of the beam failure recovery timer, the UE may store (keep or not reset) the preamble transmission counter. By storing (or keeping or not resetting) the preamble transmission counter, the UE may continue the random access procedure for the beam failure recovery. The UE may continue the random access procedure by using the one or more contention-based PRACH resources.

In an example, in response to the expiry of the beam failure recovery timer, the UE may store the preamble transmission counter. The UE may select a new beam and/or a third preamble (e.g., $(n+2)^{th}$ preamble as shown in FIG. 42). In response to the preamble transmission counter being less than the preamble transmission number (e.g., preambleTransMax), the UE may transmit the third preamble. In response to transmitting the third preamble, the UE may monitor a second PDCCH for a response to the third preamble during a response window. The UE may not receive the response to the third preamble during the response window.

In an example, in response to not receiving the response during the response window, the UE may increment the preamble transmission counter. The preamble transmission counter may indicate a value equal to the preamble transmission number (e.g., preambleTransMax) plus 1. In response to the preamble transmission counter indicating the value equal to the preamble transmission number (e.g., preambleTransMax) plus 1, the UE may complete the BFR procedure. The example embodiments improve existing BFR procedures by continuing a BFR procedure after a contention-free random access procedure fails, specially not resetting the preamble transmission counter, e.g., until initiating a new random access procedure. By the example embodiments, the random access procedure, before and after a contention-free random access procedure fails (e.g., due to an expiry of the beam failure recovery timer), may become a single procedure, resulting in improved efficiency and batter power reduction for the UE when performing the beam failure recovery. Example embodiments may enhance efficiency of beam failure recovery procedure when the wireless device does not receive a response from a gNB after a beam failure recovery timer expires. Example embodiments may reduce a duration of beam failure recovery procedure and may reduce battery power consumption.

In an example, a first control resource (e.g., coreset) is associated with a BFR procedure. a wireless device may monitor a first PDCCH in the first coreset in response to transmitting a BFR signal for the BFR procedure. The wireless device may not monitor the first PDCCH in the first coreset in response to not transmitting the BFR signal. In an example, the gNB may not transmit a PDCCH in the first coreset if the gNB does not receive the BFR signal. The gNB may transmit a PDCCH in a second coreset if the gNB does not receive the BFR signal. The second coreset, in which the wireless monitor a PDCCH before the BFR procedure is triggered, is different from the first coreset.

In existing technologies of beam failure recovery procedures, after a wireless device declares (or indicates) a failure of a beam failure recovery procedure, a wireless device may keep monitoring a first PDCCH, for a response to preamble transmission in a first control resource set (e.g., a coreset) and may miss detect a second PDCCH in a second control resource set (e.g., on which the base station and the wireless device maintain a communication link). In an example, miss-detecting the second PDCCH may result in the connection link lost, or result in transmission latency. Example embodiments may improve connection continuity when performing beam failure recovery procedure.

Figure 43:
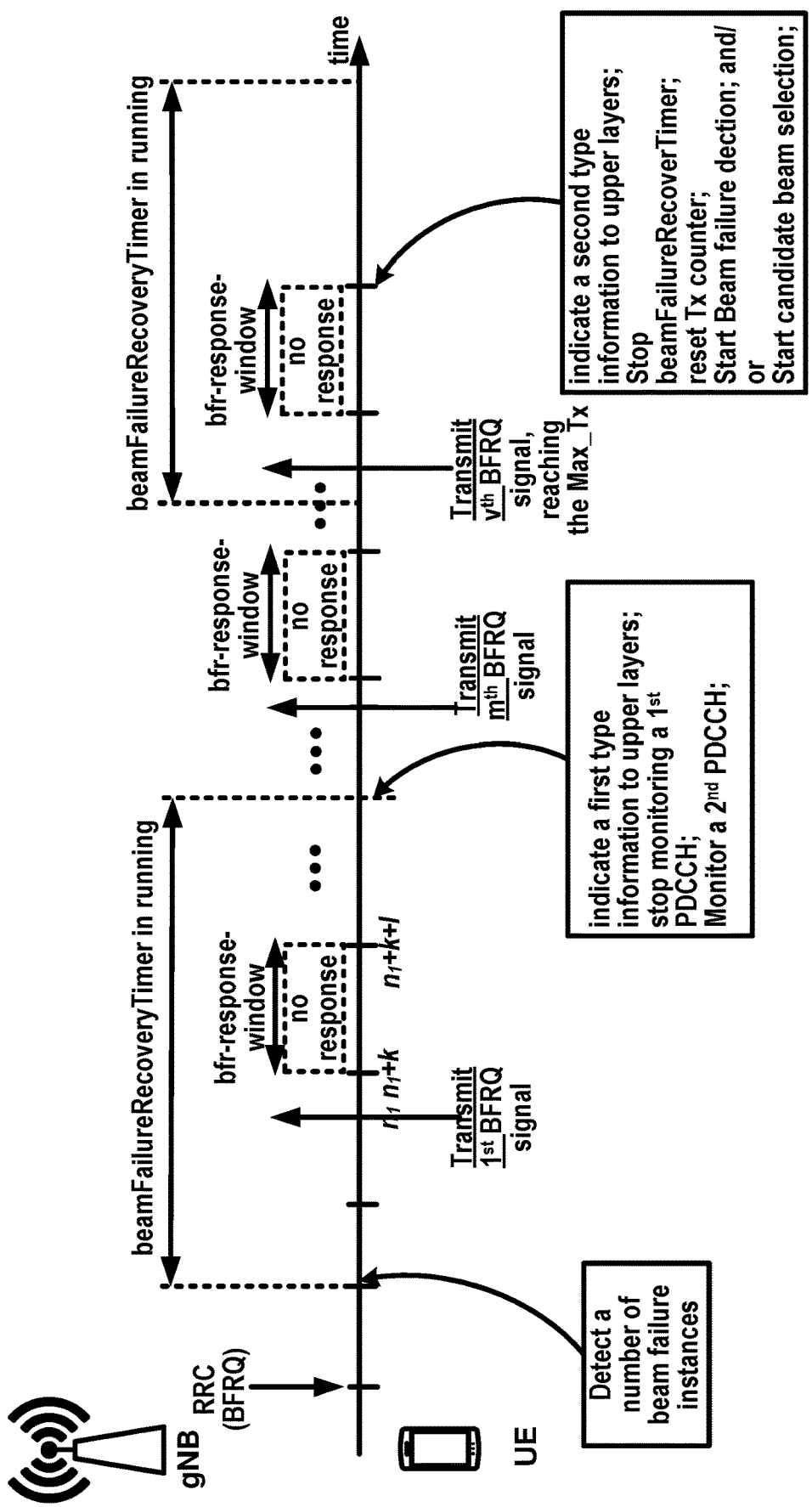
FIG. 43 is an example diagram of beam failure recovery procedure as per an aspect of an embodiment of the present disclosure.

FIG. 43 shows an example embodiment of an enhanced beam failure recovery procedure. The wireless device may start a beam failure recovery timer (e.g., beamFailureRecoveryTimer) when detecting a number of beam failures (e.g., contiguous). The wireless device may transmit a first BFR signal at $n_1^{th}$ slot, after selecting at least one beam. The wireless device may start monitoring a first PDCCH in a first coreset at $(n_1+k)^{th}$ slot. k may be a predefined value (e.g., 4). The wireless device may start a beam failure recovery response window (e.g., bfr-response-window) at $(n_1+k)^{th}$ slot in response to transmitting the first BFR signal. In an example, when the wireless device receives a DCI on the first PDCCH at least in the first coreset before the bfr-response-window expires, the wireless device may consider the BFR procedure successfully completed. In an example, in response to the BFR procedure being successfully completed, the wireless device may stop the beamFailureRecoveryTimer and/or the bfr-response-window.

In an example, when the bfr-response-window expires at $(n_1+k+1)^{th}$ slot, the wireless device may set the BFR transmission counter to a value (e.g., one), transmit a second BFR signal, and monitor the first PDCCH during the bfr-response-window is running. In an example, the wireless device may repeat at least one of: transmitting the BFR signal; starting the bfr-response-window; monitoring the first PDCCH; incrementing the BFR transmission counter (e.g., by one) in response to the bfr-response-window expiring, until the beamFailureRecoveryTimer expires, or the BFR transmission counter indicates a value equal to or greater than a configured preamble transmission number.

As shown in FIG. 43, when the beamFailureRecoveryTimer expires, and the BFR transmission counter indicates a value smaller than configured preamble transmission number, the wireless device may perform at least one of: indicating a first type of information to higher layers (e.g., MAC or RRC layer); cancelling the transmission of BFR signal; stopping monitoring the first PDCCH in the first coreset; monitoring the second PDCCH on the second coreset; starting detecting one or more beam failure instance; and starting selecting one new beam. In an example, the wireless device may not reset the BFR transmission counter. In an example, the wireless device may reset the BFR transmission counter (e.g., zero). In an example, the first type of information may comprise at least one of: the BFR timer being expiring; beam failure recovery procedure failure; and/or out of synchronization.

In an example, the wireless device may retransmit the BFR signals, if the BFR transmission counter indicate a first value smaller than the configured preamble transmission number, until the BFR transmission counter indicates a second value equal to or great than the configured number.

In an example, in response to the BFR transmission counter indicating a value equal to or greater than the configured preamble transmission number, the wireless device may perform at least one of: indicating a second type of information to higher layers of the wireless device; stopping the beamFailureRecoveryTimer; stopping the BFR signal transmission; resetting the BFR transmission counter (e.g., zero); stopping monitoring the first PDCCH in the first coreset; starting monitoring a second PDCCH in a second coreset; starting detecting one or more beam failure instance; and starting selecting one new beam. In an example, the second type of information may comprise at least one of: a BFR transmission number being equal to greater than the configured preamble transmission number; beam failure recovery procedure failure; and/or out of synchronization.

Figure 44:
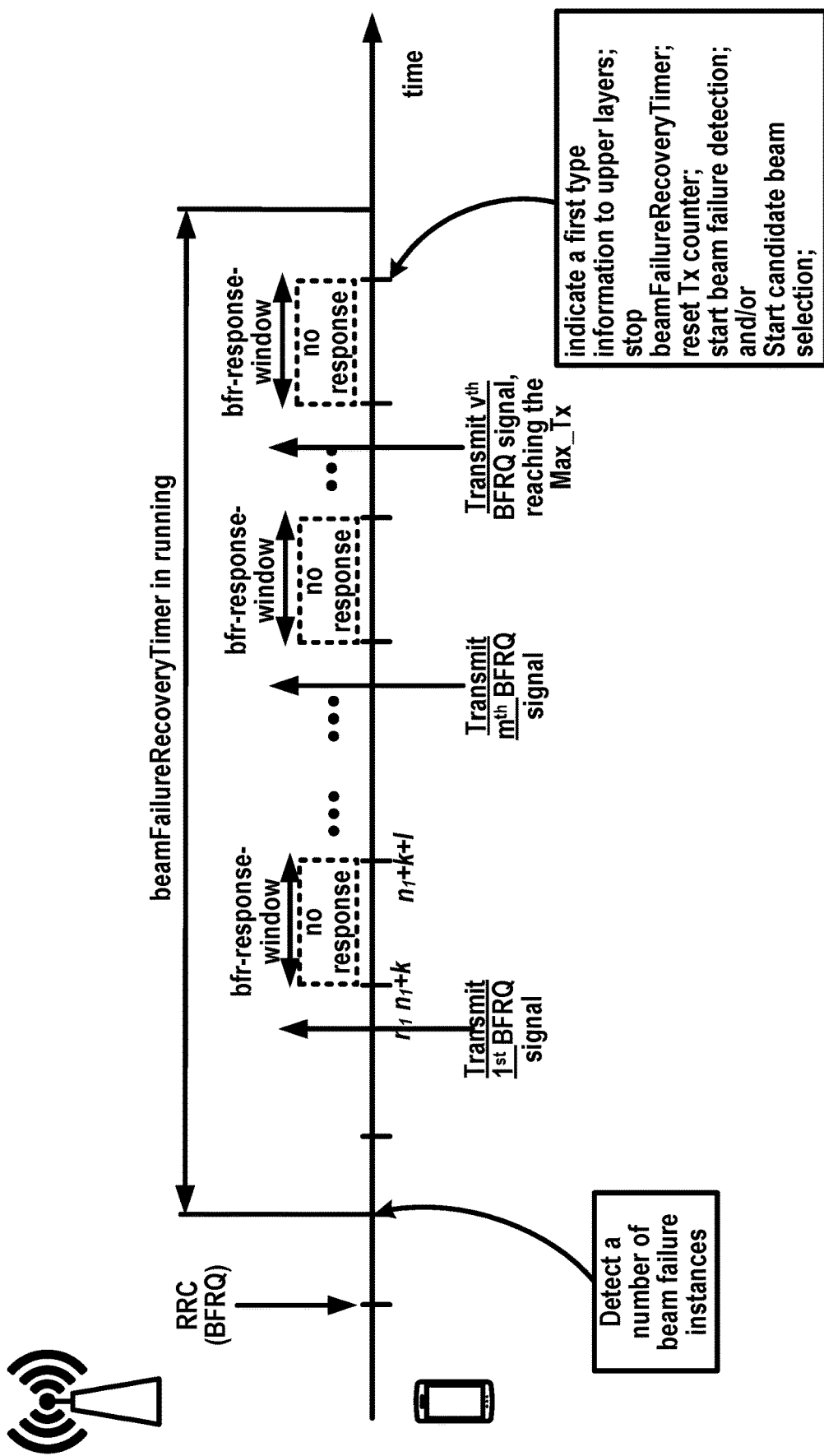
FIG. 44 is an example diagram of beam failure recovery procedure as per an aspect of an embodiment of the present disclosure.

FIG. 44 shows an example embodiment of an enhanced beam failure recovery procedure. In the example, the beamFailureRecoveryTimer may be configured with a first timer value (e.g., an infinity value), which may be running even when the BFR transmission counter indicates a value equal to or greater than the configured number of BFR transmission. In the example, the wireless device may, in response to the BFR transmission counter indicating a value equal to or greater than the configured number of BFR transmission, perform at least one of: indicating a second type of information to higher layers of the wireless device; stopping the beamFailureRecoveryTimer; stopping the BFR signal transmission; resetting the BFR transmission counter (e.g., to zero); stopping monitoring the first PDCCH in the first coreset; starting monitoring the second PDCCH in the second coreset; starting detecting one or more beam failure instance; and/or starting selecting one new beam. Stopping the beamFailureRecoveryTimer, when the BFR transmission counter indicates a value equal to or greater than the configured number of BFR transmission, may avoid starting from a contention-based random access procedure for a next beam failure recovery procedure.

By the embodiments, a wireless device may perform one or more actions when the BFR transmission number reaches the configured number of transmissions of BFR signals and the wireless device does not receive a response from a gNB. The one or more actions may lead to reducing the power consumption of PDCCH monitoring, for example, by stopping monitor the coreset dedicated for the BFR procedure and/or switching to monitor a coreset on which the wireless device monitors before the BFR procedure starts. The one or more actions may lead to reducing the power consumption of transmitting the BFR signal, for example, by stopping transmitting the BFR signal. The one or more actions may lead to improve success rate of the BFR procedure, for example, by starting beam failure detection and/or new beam selection.

In an example, the wireless device may start a beam failure recovery timer (e.g., beamFailureRecoveryTimer) when detecting a number of beam failures (e.g., contiguous). When the beamFailureRecoveryTimer is running, the wireless device may not select a candidate beam satisfying the selection requirement, for example, due to no RS from the second set of RSs having a receiving quality (e.g., RSRP or SINR) than a configured threshold.

In an example, when no candidate beam indication received from the physical layer during the beamFailureRecoveryTimer is running, the MAC entity may indicate a third type of information to higher layers upon an expiry of the beamFailureRecoveryTimer. In an example, the third type of information may comprise at least one of: no candidate beam being selected; beam failure recovery procedure failure; and/or out of synchronization.

In an example, higher layers (e.g., RRC) of a wireless device may instruct the MAC entity or the physical layer of the wireless device to perform one or more actions based on received the one or more information. In an example, the one or more information may comprise at least one of: a first information indicating an expiry of beamFailureRecoveryTimer with no response received on a PDCCH; a second information indicating a configured transmission number of BFR signal reached; a third information indicating an expiry of beamFailureRecoveryTimer with no new beam identified by the physical layer. In an example, different information may indicate different causes of beam failure recovery procedure failure. In an example, the higher layers may indicate (or declare) a radio link failure with the one or more information. In an example, the wireless device may store the one or more information in one or more radio link failure report. In an example, the wireless device may start an RRC connection re-establishment procedure with one or more RRC messages comprising the one or more radio link failure reports. In an example, the wireless device and/or the gNB may take different actions according to the different information comprised in the one or more radio link failure reports. For example, when the one or more information received at the gNB in a radio link failure report is an expiry of the beamfailureRecoveryTimer with no new beam identified by the wireless device, the gNB may transmit one or more RRC message comprising parameters indicating one or more RSs configuration based on the one or more information in the radio link failure report, after the RRC connection re-establishment procedure successfully finished. In an example, the one or more RSs may be used for new candidate beam selection.

In an example, a wireless device may receive from a base station, at least one message comprising configuration parameters indicating at least one of: one or more preambles; a first value of a first timer indicating a response window; a second value of a BFR timer; a first number of transmissions of one of the one or more preambles; a first coreset; and/or a second coreset. In an example, the wireless device may start the BFR timer associated with the second value, in response to detecting at least a first beam failure. In an example, the wireless device may reset a transmission counter to a value (e.g., zero). In an example, the wireless device may transmit at least a preamble in a first slot. In an example, the wireless device may start the first timer associated with the first value after the first slot, in response to transmitting the at least preamble. The wireless device may monitor a first PDCCH in the first coreset at least during a portion of a timer period when the first timer is running. In an example, the wireless device may increment the transmission counter (e.g., by one), in response to the first timer expiring. In an example, when the transmission counter indicates a value equal to or greater than the first number, the wireless device may perform at least one of: resetting the transmission counter (e.g., to zero); starting to monitor a second PDCCH in the second coreset; stopping the BFR timer.

In an example, the first coreset may comprise a first control resource set comprising a first number of OFDM symbols and a first set of resource blocks. In an example, the second coreset may comprise a second number of OFDM symbols and a second set of resource blocks.

In an example, the at least first beam failure occurs when the quality of the beam is lower than a configured threshold.

In an example, the wireless device may consider the BFR procedure successfully completed when receiving a DCI via the first PDCCH when the first timer is running. In an example, the wireless device may stop the BFR timer and/or the first timer, in response to the BFR procedure being successfully completed.

In an example, the wireless may repeat at least one of: transmitting the preamble; starting the first timer; monitoring the first PDCCH; incrementing the transmission counter (e.g., by one) in response to the first timer expiring, until the BFR timer expires, or the transmission counter indicates a value equal to or great than the first number, or the BFR procedure is successfully completed.

In an example, when the transmission counter indicates a value equal to or greater than the first number, the wireless device may perform at least one of: cancelling the preamble transmission; stopping monitoring the first PDCCH on the first coreset; indicating a first type of information to at least a higher layer (e.g., MAC or RRC); starting to detect one or more beam failure instance; starting to select at least one reference signal; initiating a random access procedure. In an example, the first type of information may comprise at least one of: random access problem; beam failure recovery timer expiring; reaching the configured transmission number; beam failure recovery procedure failure; no beam being selected; out of synchronization.

In an example, when there is a big amount of transmission blocks (TBs) to be transmitted to a UE and/or the UE is in a changing channel condition, a UE may transmit frequent CSI reports to a base station for facilitating downlink channel scheduling. In an example, aperiodic CSI report may not be efficient in this case, where the UE may transmit the aperiodic CSI report in one shot. The aperiodic CSI report may be triggered by a DCI. Request for multiple and/or frequent CSI reports may be achieved by transmitting multiple DCIs, which may increase DCI transmission and reduce the capacity of PDCCH. In an example, periodic CSI report may not work efficient or convenient in this case. The periodic CSI report may be configured or reconfigured in an RRC message. An RRC message for the periodic CSI report may not be efficient to enable or disable the frequent CSI reports. In an example, a base station may transmit a DCI via downlink control channel, indicating SP CSI activation/deactivation. The DCI transmission may not be efficient, or cause extra power consumption for a wireless device to detect the DCI. A MAC CE based SP CSI activation/deactivation mechanism may be efficient and/or improve power consumption of the wireless device. Example embodiments of MAC CE based SP CSI activation/deactivation may improve efficiency of downlink transmission, batter power consumption for SP CSI report.

In an example, a wireless device may receive from a base station, at least an RRC message comprising configuration parameters of one or more SP CSI report on PUCCH, wherein, the configuration parameters comprise at least one of: one reference signal (RS) resource setting; and/or one or more SP CSI reporting settings. The RS resource setting may comprise a set of RS resources, each RS resource associated with a RS resource configuration identifier and radio resource configuration (e.g., number of ports; time and frequency resource allocation; frequency density; etc.). In an example, the RS may be a CSI-RS, and/or a SS block. In an example, a SP CSI report setting may comprise a set of SP CSI report parameters comprising at least one of: a SP CSI report identifier; and/or one or more parameters for SP CSI reporting, wherein, the one or more parameters may comprise at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity; slot offset of CSI report; and/or a PUCCH resource. A UE may transmit a SP CSI report on the PUCCH resource, associated with the SP CSI report identifier.

In an example, the at least RRC message may further comprise link parameters of one or more SP CSI reports on PUCCH. In an example, link parameters of a SP CSI report may comprise at least one of: a SP CSI report trigger index; one RS resource configuration identifier; and/or one SP CSI report identifier. The RS resource configuration identifier may indicate one RS resource associated with the SP CSI report. The SP CSI report identifier may indicate SP CSI report parameters associated with the SP CSI report.

In an example, a wireless device may receive a MAC message comprising at least one of: a MAC subheader; and/or a MAC CE. The MAC CE may comprise at least one of: at least a SP CSI report trigger index; at least an activation/deactivation field; and/or reserve bits. The at least SP CSI report trigger index may indicate triggering one of the one or more SP CSI reports. The at least activation/deactivation field may indicate activation or deactivation of the triggered SP CSI report associated with the at least SP CSI report trigger index.

Figure 45A:
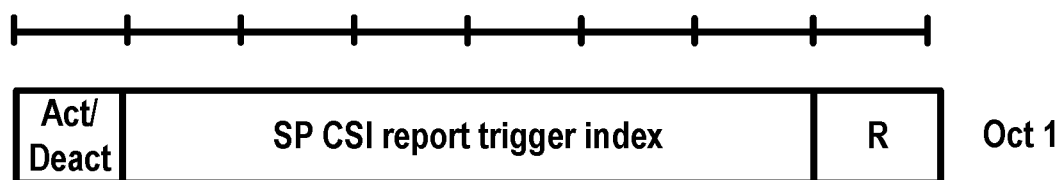
FIG. 45A and FIG. 45B are example diagrams of a MAC CE and a MAC subheader of activation/deactivation of SP CSI report as per an aspect of an embodiment of the present disclosure.

FIG. 45A shows an example embodiment of a MAC CE of activation/deactivation of SP CSI report. In an example, as shown in FIG. 45A, the MAC CE of activation/deactivation of SP CSI report may comprise: at least an activation/deactivation field (e.g., Act/Deact as shown in FIG. 45A); and at least a SP CSI report trigger index (e.g., SP CSI report trigger index as shown in FIG. 45A); and/or a R bit. The at least activation/deactivation field may be 1 bit. The at least SP CSI report trigger index may be a value of 6 bits. In an example, the at least activation/deactivation field may have 2 bits (e.g., where, "00" may indicate activation, "11" may indicate deactivation, or vice versa), and the at least SP CSI report trigger index may have 6 bits. In an example, the at least activation/deactivation field may indicate activation of a SP CSI report on PUCCH if the bit is "0", or deactivation of a SP CSI report if the bit is "1". In an example, the at least activation/deactivation field may indicate deactivation of a SP CSI report on PUCCH if the bit is "0", or activation of a SP CSI report if the bit is "1". In an example, the at least SP report trigger index may have one or more bits (e.g., 2; 3; 4; or 5), based on the configuration.

Figure 45B:
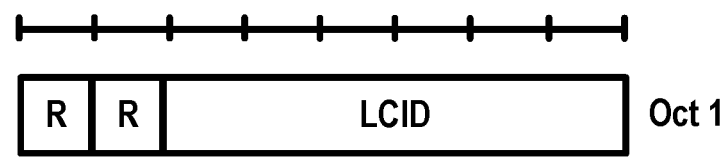

FIG. 45B shows an example embodiment of a MAC subheader identifying the MAC CE of activation/deactivation of SP CSI report. In an example, the MAC subheader may comprise a 6-bit LCID field and a 2-bit R field. A value of the LCID field for SP CSI report activation/deactivation MAC CE may be different from other LCIDs for other MAC CE or logical channels. For example, the LCID with a value of "110111" may indicate SP CSI report activation/deactivation MAC CE. In an example, the MAC subheader may not have a length field, since the MAC CE for SP CSI report activation/deactivation may have a fixed length (e.g., 8 bits as shown in FIG. 45A).

In an example, in response to receiving the MAC CE, a wireless device may determine whether the MAC CE indicate activation or deactivation of a SP CSI report. If the at least activation/deactivation field in the MAC CE indicates activation of a SP CSI report, the wireless device may determine the RS resource indicated by the RS resource configuration identifier associated with the SP CSI report trigger index. The wireless device may measure CSI parameters (e.g., CQI; PMI; RI; CRI; and/or L1-RSRP) indicated by the SP CSI report identifier associated with the SP CSI report trigger index. The wireless device may transmit on a PUCCH, SP CSI reports based on the measured CSI parameters, wherein, the PUCCH is associated with the SP CSI report identifier.

In an example, if the at least activation/deactivation field in the MAC CE indicates deactivation of a SP CSI report on PUCCH, the wireless device may stop transmission of the SP CSI report associated with the SP CSI report trigger index indicated in the MAC CE.

By the method of the embodiment, a gNB may transmit a MAC message to a UE indicating activation or deactivation of a SP CSI report on PUCCH. With the example embodiment of MAC CE and MAC subheader, a gNB may efficiently activate or deactivate a SP CSI report on PUCCH for a wireless device. With the example embodiment of MAC CE and MAC subheader, a wireless device may reduce power consumption for SP CSI report on PUCCH.

In an example, a gNB may transmit one or more RRC message comprising parameters of a plurality of cells comprising a primary cell and at least one secondary cell, wherein, the parameters of a secondary cell may comprise at least one of: a SCell index; and/or radio resource configuration of the secondary cell. In an example, the SCell index may be an integer greater than 0 and less than 8, if carrier aggregation operation with at most 7 SCells is supported. In an example, the SCell index may be an integer greater than 0 and less than 32, if carrier aggregation operation with at most 31 SCells is supported.

Figure 46A:
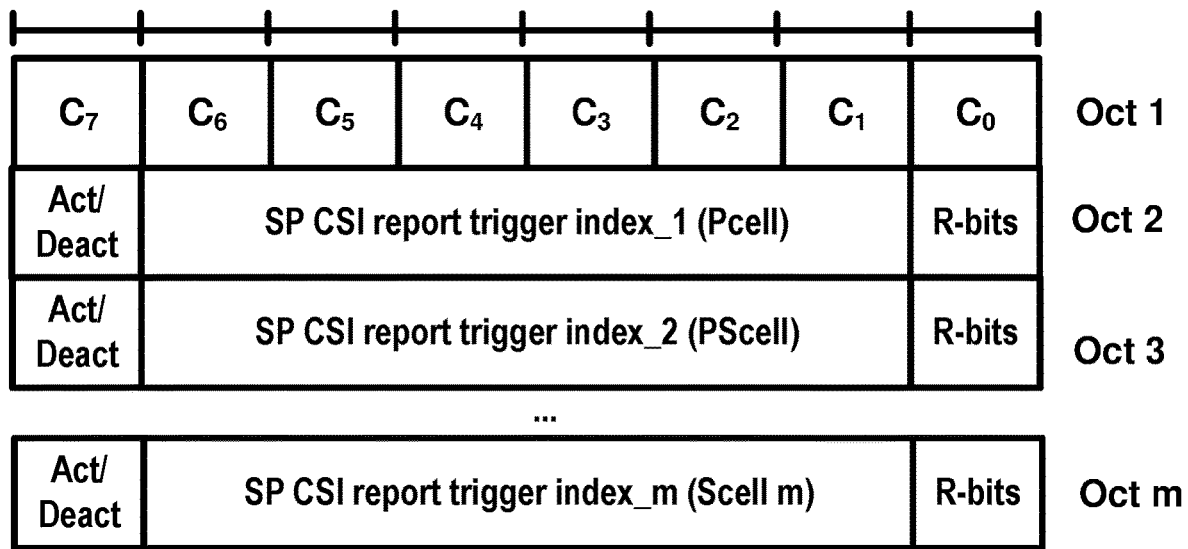
FIG. 46A and FIG. 46B are example diagrams of a MAC CE and a MAC subheader of activation/deactivation of SP CSI report for multiple SCells as per an aspect of an embodiment of the present disclosure.

FIG. 46A shows an example embodiment of MAC CE of activation/deactivation of SP CSI report of multiple cells. In an example, with at most 7 SCells configured, a UE may receive a MAC message comprising at least one of: a MAC CE; and/or a MAC subheader, wherein, the MAC CE may have variable size, comprising at least: a first octet; and one or more second octet. In an example, $C_i$ in the first octet (e.g., Oct 1 in FIG. 46A) may indicate the presence of an activation/deactivation field of a SP CSI report for a secondary cell with a SCell index i (0<i<8). A $C_i$ field set to "0" may indicate that activation/deactivation of a SP CSI report for a secondary cell with a SCell index i (0<i<8) is not present. A $C_i$ field set to "1" may indicate that activation/deactivation of a SP CSI report for a secondary cell with a SCell index i (0<i<8) is present. $C_0$ may be a reserved bit. A second octet (e.g., Oct 2 in FIG. 46A) may indicate activation/deactivation of a SP CSI report for a PCell. The second octet may comprise at least one of: a first bit indicating activation/deactivation of a SP CSI report; a second field indicating a SP CSI report trigger index; and/or one or more reserve bits. The first bit set to "1" may activate a SP CSI report associated with the SP CSI report trigger index. The first bit set to "0" may deactivate a SP CSI report associated with the SP CSI report trigger index. In an example, there may be a third octet (e.g., Oct 3 in FIG. 46A) corresponding to a PSCell, if the PSCell is configured, wherein, the third octet may comprise at least one of: a first bit indicating activation/deactivation of a SP CSI report; a second field indicating a SP CSI report trigger index; and/or one or more reserve bits.

In an example, if $C_1$ is set to "1", a fourth octet may indicate activation/deactivation of a SP CSI report for the SCell with a SCell index 1. In an example, if $C_1$ is set to "0", the activation/deactivation of SP CSI report for the SCell with a SCell index 1 may be not present. If $C_2$ is set to "1", a fifth octet (if $C_1$ is set to "1", otherwise the fourth octet) may indicate activation/deactivation of a SP CSI report for the SCell with a SCell index 2, etc.

In an example, the MAC CE may indicate activation/deactivation of SP CSI reports for multiple SCells. The length of the MAC CE may be variable depending on the number of SCells triggered with SP CSI reports. In an example, a MAC subheader may indicate SP CSI activation/deactivation MAC CE for multiple SCells, wherein the MAC subheader may comprise at least one of: a LCID field; a length field; a format field indicating the size of the length field; and/or one or more reserved bits.

Figure 46B:
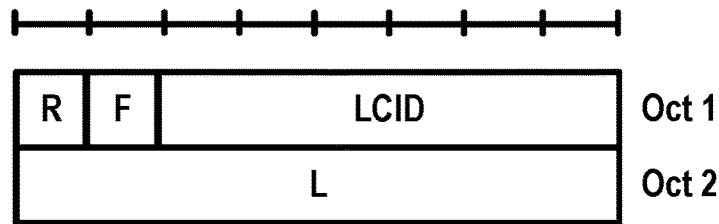

FIG. 46B shows an example embodiment of a MAC subheader identifying the SP CSI activation/deactivation MAC CE. A LCID field in the MAC subheader, for a MAC CE of activation/deactivation of SP CSI reports for multiple SCells, may be different from other LCIDs of other MAC CE and/or logic channels. The length field in the MAC subheader may indicate the length of the MAC CE of activation/deactivation of SP CSI reports for multiple SCells.

FIG. 47 shows an example embodiment of a MAC CE of activation/deactivation of SP CSI report of multiple cells. In an example, with at most 31 SCells configured, a UE may receive a MAC message comprising at least one of: a MAC CE; and/or a MAC subheader. The MAC CE may have variable size. The MAC CE may comprise at least: a first four octets (e.g., Oct 1, Oct 2, Oct 3 and Oct 4 in FIG. 47); and one or more fifth octet (e.g., Oct 5 in FIG. 47). The first four octets may indicate a presence/absence of an activation/deactivation field of a SP CSI report for a secondary cell with a SCell index i (0<i<32). A $C_i$ field set to "0" may indicate that activation/deactivation of a SP CSI report for a secondary cell with a SCell index i (0<i<32) is not present. A $C_i$ field set to "1" may indicate that activation/deactivation of a SP CSI report for a secondary cell with a SCell index i (0<i<32) is present. $C_0$ may be a reserved bit. The fifth octet (e.g., Oct 5 in FIG. 47) may indicate activation/deactivation of a SP CSI report for a PCell. The fifth octet may comprise at least one of: a first bit indicating activation/deactivation of a SP CSI report; a second field indicating a SP CSI report trigger index; and/or one or more reserve bits. The first bit set to "1" may activate a SP CSI report associated with the SP CSI report trigger index. The first bit set to "0" may deactivate a SP CSI report associated with the SP CSI report trigger index. In an example, there may be a sixth octet corresponding to a PSCell, if the PSCell is configured.

In an example, if $C_1$ is set to "1", a seventh octet may indicate activation/deactivation of a SP CSI report for the SCell with a SCell index 1. In an example, if $C_1$ is set to "0", the activation/deactivation of SP CSI report for the SCell with a SCell index 1 may be not present. In an example, if $C_2$ is set to "1", an eighth octet (if $C_1$ is set to "1", otherwise the seventh octet) may indicate activation/deactivation of a SP CSI report for the SCell with a SCell index 2, etc.

In an example, a gNB may decouple the link between a SP CSI report and a CSI-RS (or SS blocks) configuration, to make it flexible of activating a SP CSI report. For example, a gNB may transmit a MAC message comprising parameters indicating activation/deactivation of a SP CSI report and a RS resource configuration.

In an example, a wireless device may receive from a base station, at least an RRC message comprising configuration parameters of one or more SP CSI report on PUCCH, wherein, the configuration parameters comprise at least one of: one reference signal (RS) resource setting; and/or one or more SP CSI reporting settings. The RS resource setting may comprise a set of RS resources, each RS resource associated with radio resource configuration (e.g., number of ports; time and frequency resource allocation; frequency density; etc.) of a RS, each RS associated with a RS resource configuration identifier. In an example, the RS may be a CSI-RS, and/or a SS block. In an example, one SP CSI report setting may comprise a set of SP CSI report parameters comprising at least one of: a SP CSI report identifier; and/or one or more parameters for SP CSI reporting, wherein the one or more parameters may comprise at least one of: a CSI type (e.g., Type I or Type II); a report quantity indicator (e.g., indicating a CSI-related quantity to report, or a L1-RSRP related quantity to report, etc.); a report configuration type (e.g., indicating the time domain behavior of the report—either aperiodic, semi-persistent, or periodic); a value indicating frequency granularity for CSI report; parameters indicating periodicity; slot offset of CSI report; and/or a PUCCH resource.

Figure 48A:
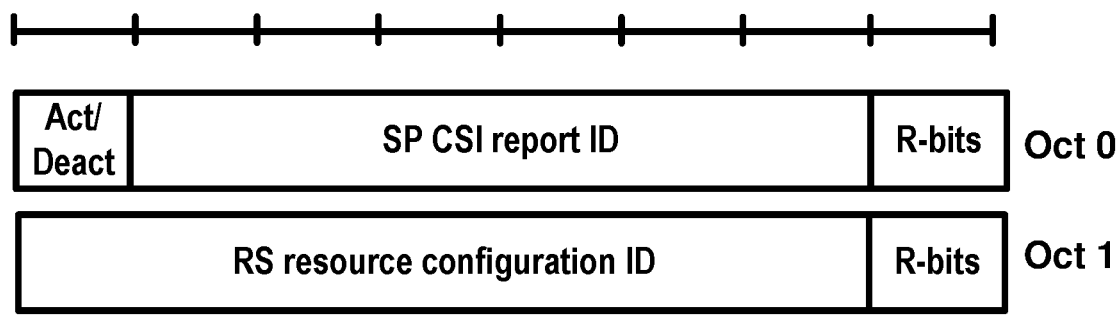
FIG. 48A and FIG. 48B are example diagrams of a MAC CE and a MAC subheader of activation/deactivation and RS resource configuration of SP CSI report as per an aspect of an embodiment of the present disclosure.

FIG. 48A shows an example embodiment of MAC CE of activation/deactivation of SP CSI report and RS resource configuration. In an example, a gNB may transmit a MAC message comprising at least one of: a MAC CE; and/or a MAC subheader, wherein the MAC CE may comprise parameters indicating at least one of: activation/deactivation of a SP CSI report on PUCCH; a RS resource configuration. In an example, a first octet (e.g., Oct 0 as shown in FIG. 48A) in the MAC CE may indicate activation or deactivation of a SP CSI report associated with the SP CSI report ID. The first octet may comprise at least one of: a first activation/deactivation field indicating activation or deactivation of a SP CSI report; a SP CSI report ID indicate one of the one or more SP CSI reports to be triggered; and/or one or more reserved bits. A second octet (e.g., Oct 1 in FIG. 48A) in the MAC CE may indicate a RS resource configuration associated with the RS resource configuration ID. The second octet may comprise at least: a RS resource configuration ID indicating one of the one or more RS resources for the SP CSI report.

In an example, a second octet in the MAC CE may indicate activation or deactivation of a RS resource associated with the RS resource configuration ID (e.g., if the RS resource is a SP RS). The second octet may comprise at least one of: a first activation/deactivation field indicating activation or deactivation of a RS resource; a RS resource configuration ID indicating one of the one or more RS resources.

In response to receiving the MAC CE, a wireless device may determine one or more RS for a SP CSI report based on the second octet in the MAC CE. The wireless device may determine activation or deactivation of a SP CSI report based on the first octet in the MAC CE. If the activation/deactivation field in the first octet indicates activation of a SP CSI report, the wireless device may measure CSI parameters associated with the SP CSI report ID, on the one or more RS. The wireless device may transmit one or more SP CSI repots based on the measurement, on a PUCCH associated with the SP CSI report ID. If the activation/deactivation field in the first octet of the MAC CE indicates deactivation of a SP CSI report, the wireless device may stop transmission of the SP CSI report associated with the SP CSI report ID.

Figure 48B:
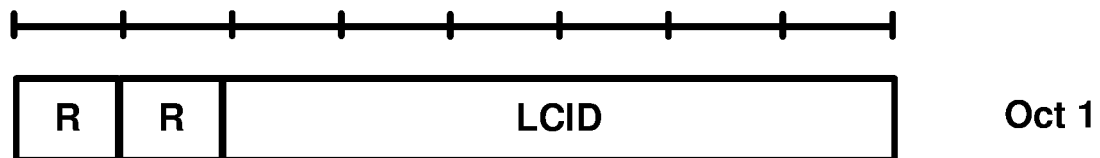

FIG. 48B shows an example embodiment of the MAC subheader identifying the MAC CE. In an example, a MAC subheader may comprise at least one of: a LCID field; a R field, wherein, the LCID field may be a 6-bit value dedicated to indicating activation/deactivation of a SP CSI report and RS resource configuration. The R field may be two reserved bits. The MAC subheader may not have a length field, since the MAC CE for SP CSI report activation/deactivation and RS resource configuration may have a fixed length (e.g., 16 bits as shown in FIG. 48A). The LCID for the MAC CE of SP CSI report activation/deactivation and RS resource configuration may have a value different to other LCIDs for other MAC CE or logical channels.

In an example, a gNB may transmit one or more RRC message comprising parameters of a plurality of cells comprising a primary cell and at least one secondary cell, wherein, the parameters of a secondary cell may comprise at least one of: a SCell index; and/or radio resource configuration of the secondary cell. In an example, the SCell index may be an integer greater than 0 and less than 8, if carrier aggregation operation with at most 7 SCells is supported. In an example, the SCell index may be an integer greater than 0 and less than 32, if carrier aggregation operation with at most 31 SCells is supported.

FIG. 49A shows an example embodiment of MAC CE of activation/deactivation of SP CSI report and RS resource configuration on multiple cells. In an example, with at most 7 SCells configured, a UE may receive a MAC message comprising at least one of: a MAC CE; and/or a MAC subheader, wherein, the MAC CE may have variable size, comprising at least: a first octet (e.g., Oct 1 in FIG. 49A); a second octet (e.g., Oct 2 in FIG. 49A); a third octet (e.g., Oct 3 in FIG. 49A); and/or one or more fourth octet (e.g., Oct 4/5/m/m+1 in FIG. 49A). In an example, $C_i$ in the first octet may indicate the presence of an activation/deactivation field and a RS resource configuration field of a SP CSI report for a secondary cell with a SCell index i ($0<i<8$). A $C_i$ field set to "0" may indicate that activation/deactivation and a RS resource configuration of a SP CSI report for a secondary cell with a SCell index i ($0<i<8$) is not present. A $C_i$ field set to "1" may indicate that activation/deactivation and a RS resource configuration of a SP CSI report for a secondary cell with a SCell index i ($0<i<8$) is present. $C_0$ may be a reserved bit. The second octet (Oct 2) may indicate activation/deactivation of a SP CSI report for a PCell. The second octet may comprise at least one of: a first bit indicating activation/deactivation of a SP CSI report; a second field indicating a SP CSI report trigger index; and/or one or more reserve bits. The first bit set to "1" may activate a SP CSI report associated with the SP CSI report trigger index. The first bit set to "0" may deactivate a SP CSI report associated with the SP CSI report trigger index. The third octet may comprise parameters indicating at least a RS configuration ID, which may be used for measurement for the SP CSI report. In an example, there may be a fourth and a fifth octets corresponding to a PSCell, if the PSCell is configured.

In an example, if $C_1$ is set to "1", a sixth octet and a seventh octet may indicate activation/deactivation of a SP CSI report, and a RS resource configuration associated with the SP CSI report for the SCell with a SCell index 1. In an example, if $C_1$ is set to "0", the activation/deactivation of SP CSI report and the RS resource configuration for the SCell with a SCell index 1 may be not present. If $C_2$ is set to "1", an eighth and ninth octets (if $C_1$ is set to "1", otherwise the sixth and seventh octets) may indicate activation/deactivation of a SP CSI report and a RS resource configuration associated with the SP CSI report for the SCell with a SCell index 2, etc.

FIG. 49B shows an example embodiment of the MAC subheader identifying the MAC CE. In an example, the MAC CE may indicate activation/deactivation of SP CSI reports and RS resource configuration for multiple SCells. The length of the MAC CE may be variable depending on the number of SCells triggered with SP CSI reports. In an example, the MAC subheader may indicate MAC CE of SP CSI activation/deactivation and RS resource configuration for multiple SCells, wherein the MAC subheader may comprise at least one of: a LCID field; a length field; a format field indicating the size of the length field; and/or one or more reserved bits. The LCID field in the MAC subheader, for a MAC CE of activation/deactivation and RS resource configuration of SP CSI reports and RS resource configuration for multiple SCells, may be different from other LCIDs of other MAC CE and/or logic channels. The length field in the MAC subheader may indicate the length of the MAC CE of activation/deactivation and RS resource configuration of SP CSI reports for multiple SCells.

FIG. 50 shows an example embodiment of a MAC CE of activation/deactivation of SP CSI report and RS resource configuration on multiple cells. In an example, when more than 8 SCells are configured, first 4 octets of the MAC CE (e.g., Oct 1, Oct 2, Oct 3 and Oct 4 in FIG. 50) indicate presence/absence of an activation/deactivation fields of a SP CSI report and CSI-RS configuration for a secondary cell with a SCell index i ($0<i<32$). An octet pair may indicate activation or deactivation of a SP CSI report (by a first octet) and a RS configuration associated with the SP CSI report (by a second octet), for a SCell.

In an example, a wireless device may receive from a base station, at least one message comprising configuration parameters of one or more semi-persistent CSI (SP CSI) report, wherein, the configuration parameters indicate at least: one or more CSI trigger index, each associated with at least one of: one or more CSI RSs associated with radio resource configuration; one SP CSI reporting setting associated with a SP CSI report identifier; and one or more parameters for SP CSI reporting. The wireless device may receive a Media Access Control (MAC) commend comprising at least one of: a SP CSI report trigger field indicating one of the one or more SP CSI report; and/or an indicator field indicating activation or deactivation of the one of the one or more SP CSI report. The wireless device may transmit the SP CSI report, if the indicator field associated with the SP CSI report indicating activation of the SP CSI report, in response to receiving the MAC command. In an example, the wireless device may stop transmission of the SP CSI report, if the indicator field associated with the SP CSI report indicating deactivation of the SP CSI report, in response to receiving the MAC command.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 51 is a flow diagram of an aspect of an embodiment of the present disclosure. At 5110, a wireless device may receive a downlink control information from a base station. The downlink control information may comprise a power control command of an uplink shared channel. The downlink control information may comprise a channel state information (CSI) request field. The downlink control information may comprise a hybrid automatic repeat request process number. The downlink control information may comprise a redundancy version. At 5120, a validation of the downlink control information for an activation of a semi-persistent CSI reporting may be performed based on a radio network temporary identifier of the semi-persistent CSI reporting. A validation of the downlink control information for an activation of a semi-persistent CSI reporting may be performed based on the hybrid automatic repeat request process number being set to a first value. A validation of the downlink control information for an activation of a semi-persistent CSI reporting may be performed based on the redundancy version being set to a second value. At 5130, the semi-persistent CSI reporting indicated by the CSI request field may be activated in response to the validation being achieved. At 5140, a semi-persistent CSI report may be transmitted, based on the activated semi-persistent CSI reporting, via the uplink shared channel with a transmission power determined based on the power control command.

According to an example embodiment, the wireless device may determine the validation is achieved in response to cyclic redundancy check parity bits of the downlink control information being scrambled with the radio network temporary identifier of the semi-persistent CSI reporting. The wireless device may determine the validation is achieved in response to the hybrid automatic repeat request process number being set to the first value. The wireless device may determine the validation is achieved in response to the redundancy version being set to the second value. According to an example embodiment, the semi-persistent CSI report may comprise a channel quality indicator (CQI). The semi-persistent CSI report may comprise a precoding matrix indicator (PMI). The semi-persistent CSI report may comprise a channel state information reference signal resource indicator (CRI). The semi-persistent CSI report may comprise a layer indicator (LI). The semi-persistent CSI report may comprise a rank indicator (RI). The semi-persistent CSI report may comprise a layer 1 reference signal received power (L1-RSRP). According to an example embodiment, the wireless device may transmit the semi-persistent CSI report with a report periodicity of the activated semi-persistent CSI reporting. According to an example embodiment, the first value may be a predefined value comprising a bit string with bits set to "0". According to an example embodiment, the second value may be a predefined value comprising a bit string with bits set to "0".

According to an example embodiment, the downlink control information may comprise a new data indicator field. According to an example embodiment, the wireless device may validate the downlink control information regardless of a value of the new data indicator field and a value of the power control command. According to an example embodiment, the downlink control information may be skipped by not applying the downlink control information in response to the validation not being achieved. According to an example embodiment, the validation may not be achieved in response to cyclic redundancy check parity bits of the downlink control information not being scrambled with the radio network temporary identifier of the semi-persistent CSI reporting. The semi-persistent CSI report may comprise the hybrid automatic repeat request process number not being set to the first value. The semi-persistent CSI report may comprise the redundancy version not being set to the second value.

According to an example embodiment, the downlink control information may comprise a value indicating a modulation and coding scheme. The downlink control information may comprise a parameter of resource block assignment on the uplink shared channel. According to an example embodiment, the wireless device may determine the validation is achieved in response to the value indicating the modulation and coding scheme not being set to a third value. The wireless device may determine the validation is achieved in response to the parameter of the resource block assignment not being set to a fourth value. According to an example embodiment, the wireless device may transmit the semi-persistent CSI report via one or more resource blocks of the uplink shared channel. The one or more resource blocks may be indicated by the parameter of the resource block assignment.

According to an example embodiment, the wireless device may determine the validation is achieved in response to cyclic redundancy check parity bits of the downlink control information being scrambled with the radio network temporary identifier of the semi-persistent CSI reporting. The wireless device may determine the validation is achieved in response to the hybrid automatic repeat request process number being set to the first value. The wireless device may determine the validation is achieved in response to the redundancy version being set to the second value. The wireless device may determine the validation is achieved in response to a value of modulation and coding scheme, of the downlink control information, not being set to a third value.

The wireless device may determine the validation is achieved in response to a parameter of a resource block assignment, of the downlink control information, not being set to a fourth value. According to an example embodiment, the third value may be a predefined value comprising a bit string with bits set to "1". According to an example embodiment, the fourth value may be a predefined value comprising a bit string with bits set to "1". According to an example embodiment, the fourth value may be a predefined value comprising a bit string with bits set to "0".

According to an example embodiment, the base station may receive one or more radio resource control messages. The one or more radio resource control messages may comprise the radio network temporary identifier of the semi-persistent CSI reporting. The one or more radio resource control messages may comprise configuration parameters of a plurality of semi-persistent CSI reporting comprising the semi-persistent CSI reporting. According to an example embodiment, the one or more radio resource control messages may comprise a second radio network temporary identifier of a semi-persistent downlink scheduling or a configured uplink grant. The second radio network temporary identifier may be different from the radio network temporary identifier of the semi-persistent CSI reporting. According to an example embodiment, the one or more radio resource control messages may comprise a third radio network temporary identifier of a dynamic downlink assignment or a dynamic uplink grant. The third radio network temporary identifier may be different from the radio network temporary identifier of the semi-persistent CSI reporting. According to an example embodiment, the configuration parameters of the semi-persistent CSI reporting of the plurality of semi-persistent CSI reporting may comprise radio resources of one or more reference signals. The configuration parameters of the semi-persistent CSI reporting of the plurality of semi-persistent CSI reporting may comprise report quantity indication. The configuration parameters of the semi-persistent CSI reporting of the plurality of semi-persistent CSI reporting may comprise a report periodicity. The configuration parameters of the semi-persistent CSI reporting of the plurality of semi-persistent CSI reporting may comprise frequency granularity for CQI and PMI. The configuration parameters of the semi-persistent CSI reporting of the plurality of semi-persistent CSI reporting may comprise measurement restriction configurations. According to an example embodiment, the report quantity indication may indicate which one or more of CQI/PMI/CRI/RI/L1-RSRP values are transmitted in the semi-persistent CSI report. According to an example embodiment, the wireless device may transmit the semi-persistent CSI report with the report periodicity. The semi-persistent CSI report may comprise one or more CQI/PMI/CRI/RI/L1-RSRP values according to the report quantity indication.

FIG. 52 is a flow diagram of an aspect of an embodiment of the present disclosure. At 5210, a downlink control information may be received. The downlink control information may comprise a power control command of an uplink shared channel. The downlink control information may comprise a channel state information (CSI) request field. The downlink control information may comprise a hybrid automatic repeat request process number. The downlink control information may comprise a redundancy version. At 5220, the downlink control information for an activation of a semi-persistent CSI reporting may be validated based on a radio network temporary identifier of the semi-persistent CSI reporting. The downlink control information for an activation of a semi-persistent CSI reporting may be validated based on the hybrid automatic repeat request process number being set to a first value. The downlink control information for an activation of a semi-persistent CSI reporting may be validated based on the redundancy version being set to a second value. At 5230, the semi-persistent CSI reporting indicated by the CSI request field may be activated in response to the validation of the downlink control information being achieved. At 5240, in response to activating semi-persistent CSI reporting, a semi-persistent CSI report may be transmitted via the uplink shared channel with a transmission power determined based on the power control command.

FIG. 53 is a flow diagram of an aspect of an embodiment of the present disclosure. At 5310, a base station may transmit a downlink control information to a wireless device. The downlink control information may comprise a power control command of an uplink shared channel. The downlink control information may comprise a channel state information (CSI) request field. The downlink control information may comprise a hybrid automatic repeat request process number. The downlink control information may comprise a redundancy version. At 5320, in response to the transmitting, a semi-persistent CSI reporting may be activated for the wireless device. The activation may be based on a radio network temporary identifier of the semi-persistent CSI reporting. The activation may be based on the hybrid automatic repeat request process number being set to a first value. The activation may be based on the redundancy version being set to a second value. At 5330, the wireless device may receive, for the activated semi-persistent CSI reporting, a semi-persistent CSI report via the uplink shared channel.

According to an example embodiment, the base station may activate the semi-persistent CSI reporting in response to cyclic redundancy check parity bits of the downlink control information being scrambled with the radio network temporary identifier of the semi-persistent CSI reporting. The base station may activate the semi-persistent CSI reporting in response to the hybrid automatic repeat request process number being set to the first value. The base station may activate the semi-persistent CSI reporting in response to the redundancy version being set to the second value. According to an example embodiment, the semi-persistent CSI report may comprise a channel quality indicator (CQI). The semi-persistent CSI report may comprise a precoding matrix indicator (PMI). The semi-persistent CSI report may comprise a channel state information reference signal resource indicator (CRI). The semi-persistent CSI report may comprise a layer indicator (LI). The semi-persistent CSI report may comprise a rank indicator (RI). The semi-persistent CSI report may comprise a layer 1 reference signal received power (L1-RSRP). According to an example embodiment, the base station may receive the semi-persistent CSI report with a report periodicity of the activated semi-persistent CSI reporting. According to an example embodiment, the first value may be a predefined value, comprising a bit string with bits set to "0". According to an example embodiment, the second value may be a predefined value, comprising a bit string with bits set to "0". According to an example embodiment, the downlink control information may comprise a new data indicator field.

According to an example embodiment, the downlink control information may comprise a value indicating a modulation and coding scheme. The downlink control information may comprise a parameter of resource block assignment on the uplink shared channel. According to an example embodiment, the base station may activate the semi-persistent CSI reporting further in response to the value indicating the modulation and coding scheme not being set to a third value. The base station may activate the semi-persistent CSI reporting further in response to the parameter of the resource block assignment not being set to a fourth value. According to an example embodiment, the base station may receive the semi-persistent CSI report via one or more resource blocks of the uplink shared channel. The one or more resource blocks may be indicated by the parameter of the resource block assignment.

According to an example embodiment, the base station may activate the semi-persistent CSI reporting in response to cyclic redundancy check parity bits of the downlink control information being scrambled with the radio network temporary identifier of the semi-persistent CSI reporting. The base station may activate the semi-persistent CSI reporting in response to the hybrid automatic repeat request process number being set to the first value. The base station may activate the semi-persistent CSI reporting in response to the redundancy version being set to the second value. The base station may activate the semi-persistent CSI reporting in response to a value of modulation and coding scheme, of the downlink control information, not being set to a third value. The base station may activate the semi-persistent CSI reporting in response to a parameter of a resource block assignment, of the downlink control information, not being set to a fourth value. According to an example embodiment, the third value may be a predefined value comprising a bit string with bits set to "1". According to an example embodiment, the fourth value may be a predefined value, comprising a bit string with bits set to "1". According to an example embodiment, the fourth value may be a predefined value, comprising a bit string with bits set to "0".

According to an example embodiment, the wireless device may transmit one or more radio resource control messages. The one or more radio resource control messages may comprise the radio network temporary identifier of the semi-persistent CSI reporting. The one or more radio resource control messages may comprise configuration parameters of a plurality of semi-persistent CSI reporting comprising the semi-persistent CSI reporting. According to an example embodiment, the one or more radio resource control messages may comprise a second radio network temporary identifier of a semi-persistent downlink scheduling or a configured uplink grant. The second radio network temporary identifier may be different from the radio network temporary identifier of the semi-persistent CSI reporting. According to an example embodiment, the one or more radio resource control messages may comprise a third radio network temporary identifier of a dynamic downlink assignment or a dynamic uplink grant. The third radio network temporary identifier may be different from the radio network temporary identifier of the semi-persistent CSI reporting. According to an example embodiment, the configuration parameters of the semi-persistent CSI reporting of the plurality of semi-persistent CSI reporting may comprise radio resources of one or more reference signals. The configuration parameters of the semi-persistent CSI reporting of the plurality of semi-persistent CSI reporting may comprise report quantity indication. The configuration parameters of the semi-persistent CSI reporting of the plurality of semi-persistent CSI reporting may comprise a report periodicity. The configuration parameters of the semi-persistent CSI reporting of the plurality of semi-persistent CSI reporting may comprise frequency granularity for CQI and PMI. The configuration parameters of the semi-persistent CSI reporting of the plurality of semi-persistent CSI reporting may comprise measurement restriction configurations. According to an example embodiment, the report quantity indication may indicate which one or more of CQI/PMI/CRI/RI/L1-RSRP values are transmitted in the semi-persistent CSI report. According to an example embodiment, the base station may receive the semi-persistent CSI report with the report periodicity. The semi-persistent CSI report may comprise one or more CQI/PMI/CRI/RI/L1-RSRP values according to the report quantity indication.

FIG. 54 is a flow diagram of an aspect of an embodiment of the present disclosure. At 5410, a wireless device may receive a downlink control information from a base station. The downlink control information may comprise a power control command of an uplink shared channel. The downlink control information may comprise a channel state information (CSI) request field. The downlink control information may comprise a hybrid automatic repeat request process number. The downlink control information may comprise a redundancy version. At 5420, the downlink control information for an activation of a semi-persistent CSI reporting may be validated. The validation may be based on a radio network temporary identifier of the semi-persistent CSI reporting. The validation may be based on the hybrid automatic repeat request process number. The validation may be based on the redundancy version. At 5430, the semi-persistent CSI reporting indicated by the CSI request field may be activated in response to the validation being achieved. At 5440, based on the activated semi-persistent CSI reporting, a semi-persistent CSI report may be transmitted via the uplink shared channel with a transmission power determined based on the power control command.

According to an example embodiment, the wireless device may determine the validation is achieved in response to cyclic redundancy check parity bits of the downlink control information being scrambled with the radio network temporary identifier of the semi-persistent CSI reporting. The wireless device may determine the validation is achieved in response to the hybrid automatic repeat request process number being set to a first value. The wireless device may determine the validation is achieved in response to the redundancy version being set to a second value. According to an example embodiment, the first value may be a predefined value, comprising a bit string with bits set to "0". According to an example embodiment, the second value may be a predefined value, comprising a bit string with bits set to "0".

FIG. 55 is a flow diagram of an aspect of an embodiment of the present disclosure. At 5510, a wireless device may transmit a semi-persistent CSI report for a semi-persistent CSI reporting. At 5520, a downlink control information may be received. The downlink control information may comprise a channel state information (CSI) request field. The downlink control information may comprise a hybrid automatic repeat request process number. The downlink control information may comprise a value of modulation and coding scheme. The downlink control information may comprise a parameter of resource block assignment. The downlink control information may comprise a redundancy version. At 5530, the downlink control information for a deactivation of the semi-persistent CSI reporting may be validated. The validation may be based on a radio network temporary identifier of the semi-persistent CSI reporting. The validation may be based on the hybrid automatic repeat request process number. The validation may be based on the redundancy version. The validation may be based on the parameter of resource block assignment. The validation may be based on the value of modulation and coding scheme. At

5540, the semi-persistent CSI reporting indicated by the CSI request field may be deactivated in response to the validation being achieved. At 5550, the transmitting of the semi-persistent CSI report via an uplink shared channel may be stopped.

According to an example embodiment, the wireless device may determine the validation is achieved in response to cyclic redundancy check parity bits of the downlink control information being scrambled with the radio network temporary identifier. The wireless device may determine the validation is achieved in response to the hybrid automatic repeat request process number being set to a first value. The wireless device may determine the validation is achieved in response to the redundancy version being set to a second value. The wireless device may determine the validation is achieved in response to the value of modulation and coding scheme being set to a third value. The wireless device may determine the validation is achieved in response to the parameter of the resource block assignment being set to a fourth value. According to an example embodiment, the first value may be a predefined value comprising a bit string with bits set to "0". According to an example embodiment, the second value may be a predefined value, comprising a bit string with bits set to "0". According to an example embodiment, the third value may be a predefined value, comprising a bit string with bits set to "1". According to an example embodiment, the fourth value may be a predefined value, comprising a bit string with bits set to "1". According to an example embodiment, the fourth value may be a predefined value, comprising a bit string with bits set to "0".

FIG. 56 is a flow diagram of an aspect of an embodiment of the present disclosure. At 5610, a wireless device may receive one or more messages from a base station. The one or more messages may comprise parameters of a plurality of semi-persistent channel state information (SP CSI) reporting. The one or more messages may comprise a SP CSI radio network temporary identifier. At 5620, a downlink control information may be received. The downlink control information may comprise a power control command of an uplink shared channel. The downlink control information may comprise a channel state information request filed indicating a SP CSI reporting of the plurality of SP CSI reporting. The downlink control information may comprise a hybrid automatic repeat request process number. The downlink control information may comprise a redundancy version. At 5630, a validation of the downlink control information for an activation of the SP CSI reporting may be performed based on the SP CSI radio network temporary identifier. The validation of the downlink control information for an activation of the SP CSI reporting may be performed based on the hybrid automatic repeat request process number. The validation of the downlink control information for an activation of the SP CSI reporting may be performed based on the redundancy version. At 5640, in response to the validation being achieved and based on the SP CSI reporting, a SP CSI report may be transmitted via the uplink shared channel with a transmission power determined based on the power control command.

According to an example embodiment, the wireless device may determine the validation is achieved in response to cyclic redundancy check parity bits of the downlink control information being scrambled with the SP CSI radio network temporary identifier. The wireless device may determine the validation is achieved in response to the hybrid automatic repeat request process number being set to a first value. The wireless device may determine the validation is achieved in response to the redundancy version being set to a second value. According to an example embodiment, the first value may be a predefined value, comprising a bit string with bits set to "0". According to an example embodiment, the second value may be a predefined value, comprising a bit string with bits set to "0".

Figure 57:
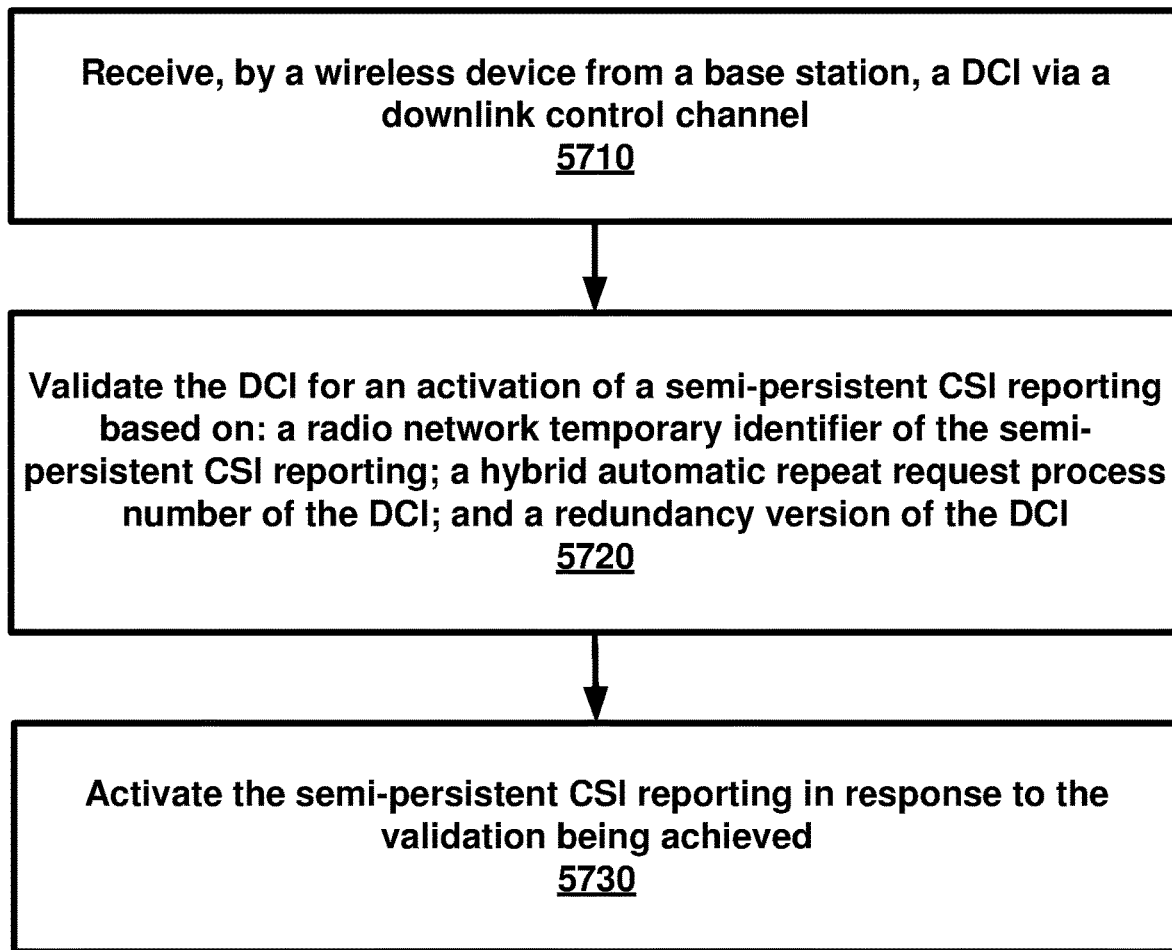
FIG. 57 is a flow diagram of an aspect of an embodiment of the present disclosure.

FIG. 57 is a flow diagram of an aspect of an embodiment of the present disclosure. At 5710, a wireless device may receive a downlink control information from a base station via a downlink control channel. At 5720, the downlink control information for an activation of a semi-persistent CSI reporting may be validated. The validation may be based on a radio network temporary identifier of the semi-persistent CSI reporting. The validation may be based on a hybrid automatic repeat request process number of the downlink control information. The validation may be based on a redundancy version of the downlink control information. At 5730, the semi-persistent CSI reporting may be activated in response to the validation being achieved.

According to an example embodiment, for the activated semi-persistent CSI reporting, a semi-persistent CSI report may be transmitted with a transmission power determined based on a power control command of the downlink control information. According to an example embodiment, for the activated semi-persistent CSI reporting, a semi-persistent CSI report may be transmitted via an uplink shared channel. According to an example embodiment, the semi-persistent CSI report may be transmitted with a transmission power determined based on a power control command of the downlink control information. According to an example embodiment, the wireless device may determine the validation is achieved in response to cyclic redundancy check parity bits of the downlink control information being scrambled with the radio network temporary identifier of the semi-persistent CSI reporting. The wireless device may determine the validation is achieved in response to the hybrid automatic repeat request process number being set to a first value. The wireless device may determine the validation is achieved in response to the redundancy version being set to a second value. According to an example embodiment, the first value may be a predefined value, comprising a bit string with bits set to "0". According to an example embodiment, the second value may be a predefined value, comprising a bit string with bits set to "0".

FIG. 58 is a flow diagram of an aspect of an embodiment of the present disclosure. At 5810, a wireless device may initiate a beam failure recovery procedure in response to detecting a first number of beam failure instances. At 5820, a beam failure recovery timer may be started with a first timer value. At 5830, a first reference signal may be selected in response to an expiry of the beam failure recovery timer. At 5840, a first preamble associated with the first reference signal may be transmitted. At 5850, during a response window and in response to transmitting the first preamble, a downlink control channel for a downlink control information may be monitored. At 5860, a preamble transmission counter may be incremented, from a value of the preamble transmission counter before the expiry of the beam failure recovery timer. The preamble transmission counter incrementing may be in response to not receiving the downlink control information during the response window. At 5870, in response to the preamble transmission counter indicating a second number equal to or less than a third number for preamble transmissions, a second preamble for the beam failure recovery procedure may be transmitted.

According to an example embodiment, the beam failure recovery procedure may be unsuccessfully completing in response to the preamble transmission counter indicating the second number greater than the third number for preamble transmissions. According to an example embodiment, the beam failure recovery procedure may be successfully completing in response to receiving the downlink control information during the monitoring. According to an example embodiment, the initiating the beam failure recovery procedure may comprise setting the preamble transmission counter to an initial value. According to an example embodiment, the initial value may be 1. According to an example embodiment, the wireless device may increment the preamble transmission counter in response to the preamble transmission counter indicating the second number equal to or less than the third number for preamble transmissions.

According to an example embodiment, one or more radio resource control messages may be received. The one or more radio resource control messages may comprise configuration parameters of the beam failure recovery procedure. The configuration parameters may comprise a first plurality of reference signals. The configuration parameters may comprise the first timer value. The configuration parameters may comprise the first number. The configuration parameters may comprise the third number. According to an example embodiment, the wireless device may detect the first number of beam failure instances based on the first plurality of reference signals. A beam failure instance of the first number of beam failure instances may occur in response to radio link quality of the first plurality of reference signals being worse than a first threshold. According to an example embodiment, the radio link quality may comprise a value of block error rate (BLER).

According to an example embodiment, first information may be indicated to a radio resource control layer of the wireless device in response to the preamble transmission counter indicating the second number greater than the third number for preamble transmissions. According to an example embodiment, the first information may indicate a random access problem. The first information may indicate the preamble transmission counter indicating the second number greater than the third number for preamble transmissions. The first information may indicate a failure of the beam failure recovery procedure. The first information may indicate out of synchronization. According to an example embodiment, the wireless device may transmit a radio link failure report to the base station. The radio link failure report may comprise the first information.

According to an example embodiment, the wireless device may select a second reference signal during the beam failure recovery timer being running. According to an example embodiment, the wireless device may transmit a third preamble being associated with the second reference signal. According to an example embodiment, the wireless device may monitor, in response to transmitting the third preamble and during a first response window, a first downlink control channel for a first downlink control information. According to an example embodiment, the wireless device may increment the preamble transmission counter in response to not receiving the first downlink control information during the first response window.

According to an example embodiment, the third preamble being associated with the second reference signal may be indicated by one or more beam failure configuration parameters in a radio resource control message. According to an example embodiment, the wireless device may monitor the first downlink control channel in a control resource set for the beam failure recovery procedure. According to an example embodiment, the first downlink control information may be in response to the third preamble for the beam failure recovery procedure.

According to an example embodiment, the wireless device may select the second reference signal with a radio link quality greater than a second threshold, from a plurality of reference signals. According to an example embodiment, the radio link quality may comprise a value of reference signal received power (RSRP). According to an example embodiment, the plurality of reference signals may be configured in a radio resource control message.

FIG. 59 is a flow diagram of an aspect of an embodiment of the present disclosure. At 5910, a beam failure recovery procedure may be initiated in response to detecting a number of beam failure instances. At 5920, a beam failure recovery timer may be started with a timer value. At 5930, a first reference signal may be selected in response to an expiry of the beam failure recovery timer. At 5940, a first preamble associated with the first reference signal may be transmitted. At 5950, a downlink control channel for a downlink control information may be monitored during a response window and in response to transmitting the first preamble. At 5960, a preamble transmission counter may be incremented, from a value of the preamble transmission counter before the expiry of the beam failure recovery timer, in response to not receiving the downlink control information during the response window. At 5970, in response to the preamble transmission counter indicating a first number equal to or less than a second number for preamble transmissions, a second preamble for the beam failure recovery procedure may be transmitted.

Figure 60:
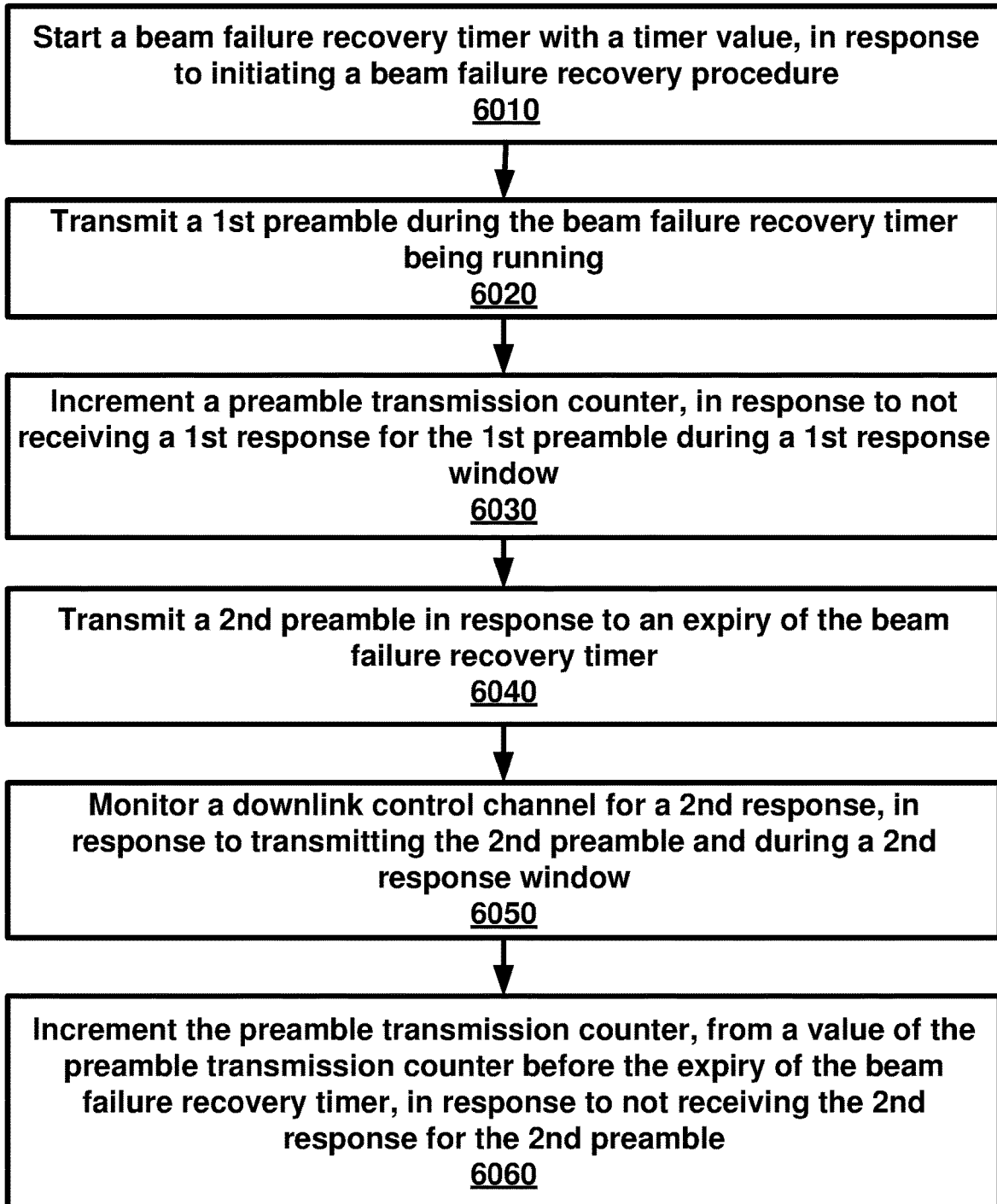
FIG. 60 is a flow diagram of an aspect of an embodiment of the present disclosure.

FIG. 60 is a flow diagram of an aspect of an embodiment of the present disclosure. At 6010, a beam failure recovery timer may be started with a timer value in response to initiating a beam failure recovery procedure. At 6020, a first preamble may be transmitted during the beam failure recovery timer being running. At 6030, a preamble transmission counter may be incremented, in response to not receiving a first response for the first preamble during a first response window. At 6040, a second preamble may be transmitted in response to an expiry of the beam failure recovery timer. At 6050, a downlink control channel may be monitored for a second response, in response to transmitting the second preamble and during a second response window. At 6060, the preamble transmission counter may be incremented, from a value of the preamble transmission counter before the expiry of the beam failure recovery timer, in response to not receiving the second response for the second preamble.

According to an example embodiment, in response to the preamble transmission counter indicating a first number equal to or less than a second number for preamble transmissions, a third preamble for the beam failure recovery procedure may be transmitted. According to an example embodiment, the beam failure recovery procedure may be unsuccessfully completed in response to the preamble transmission counter indicating a first number greater than a second number for preamble transmissions. According to an example embodiment, the beam failure recovery procedure may be completed in response to receiving the first response. According to an example embodiment, the beam failure recovery procedure may be successfully completed in response to receiving the second response.

Figure 61:
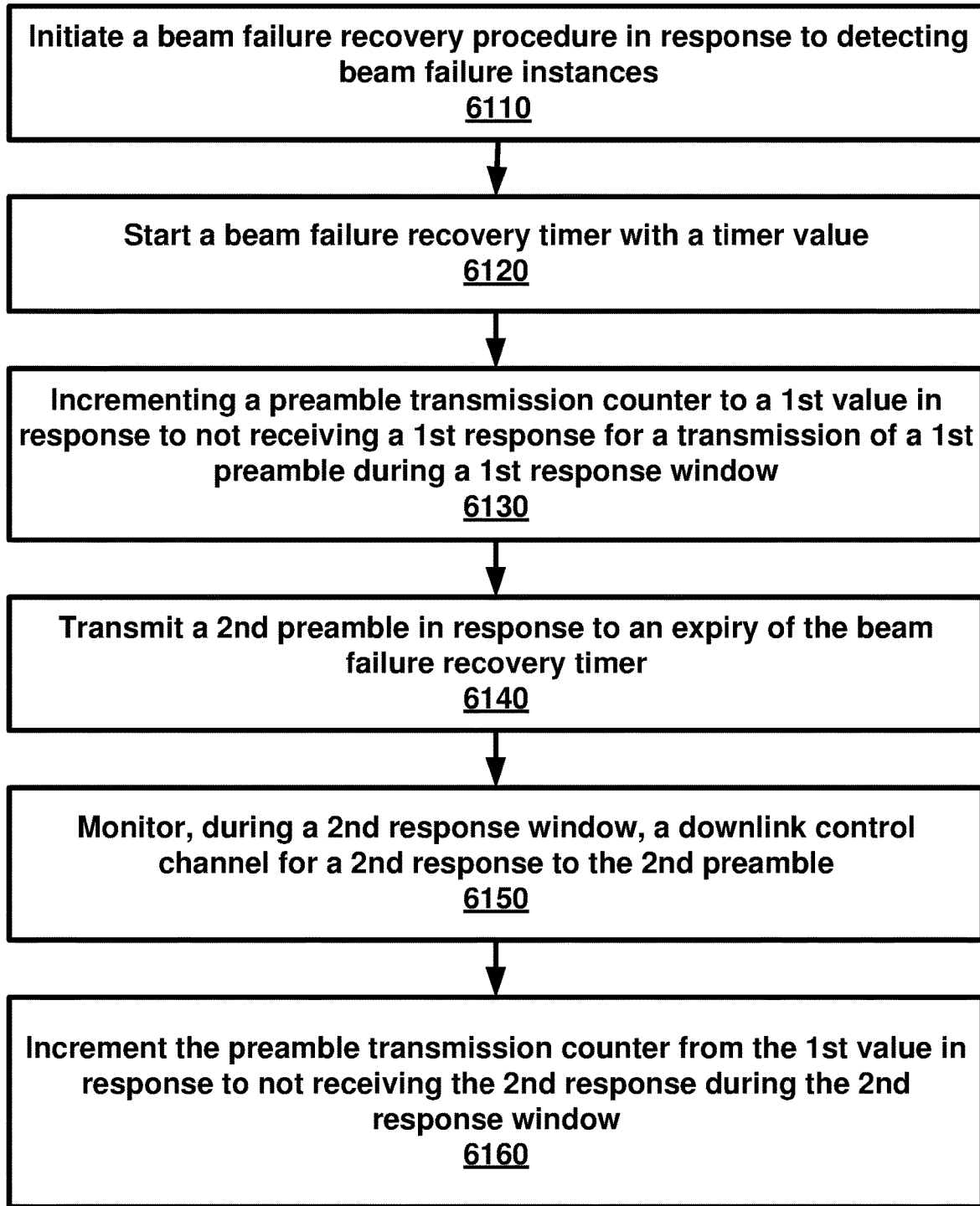
FIG. 61 is a flow diagram of an aspect of an embodiment of the present disclosure.

FIG. 61 is a flow diagram of an aspect of an embodiment of the present disclosure. At 6110, a beam failure recovery procedure may be initiated in response to detecting beam failure instances. At 6120, a beam failure recovery timer may be started with a timer value. At 6130, a preamble transmission counter may be incremented to a first value in response to not receiving a first response for a transmission of a first preamble during a first response window. At 6140, a second preamble may be transmitted in response to an expiry of the beam failure recovery timer. At 6150, during a second response window, a downlink control channel may be monitored for a second response to the second preamble. At 6160, the preamble transmission counter may be incremented from the first value in response to not receiving the second response during the second response window.

Figure 62:
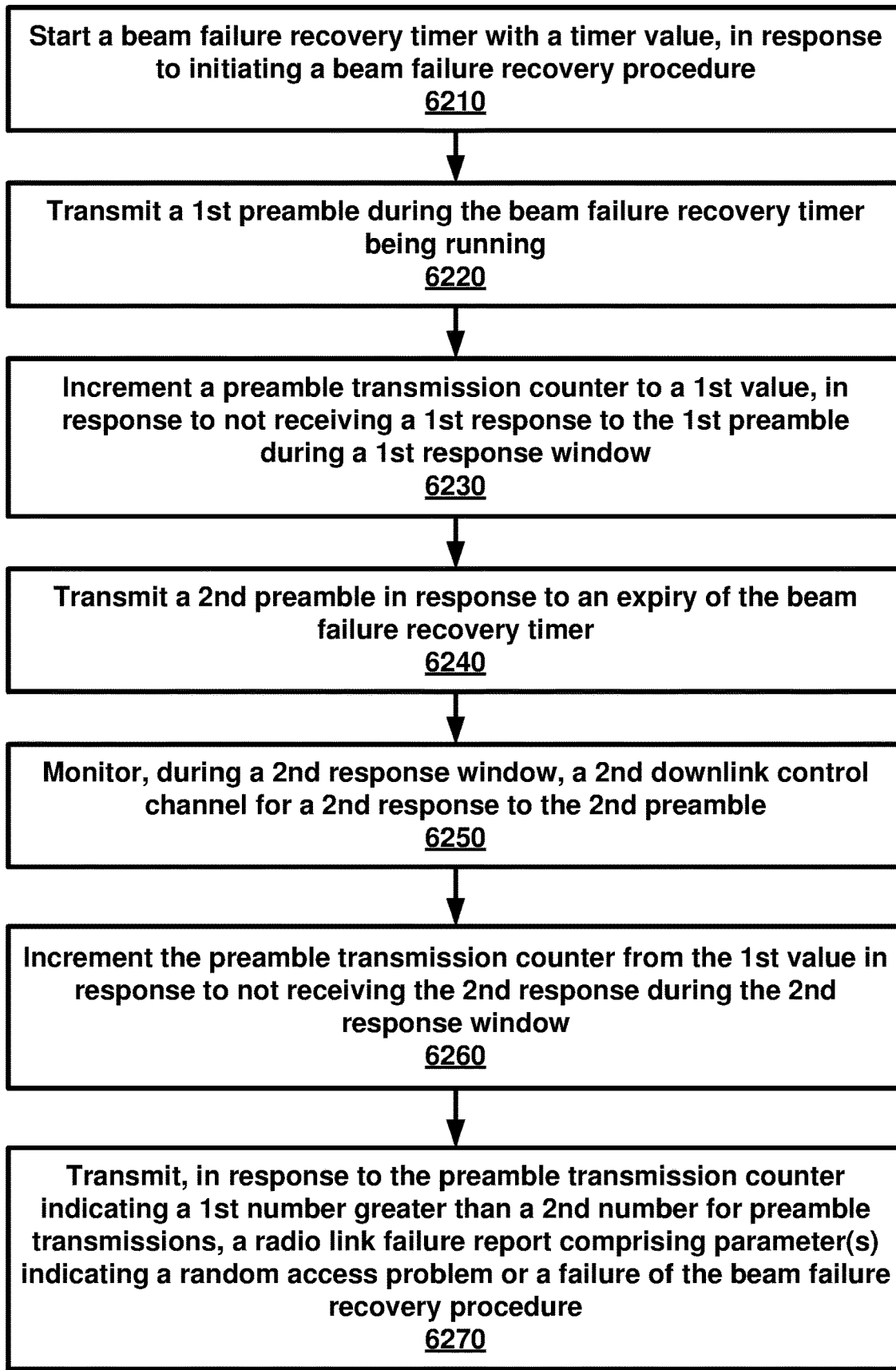
FIG. 62 is a flow diagram of an aspect of an embodiment of the present disclosure.

FIG. 62 is a flow diagram of an aspect of an embodiment of the present disclosure. At 6210, a beam failure recovery timer may be started with a timer value in response to initiating a beam failure recovery procedure. At 6220, a first preamble may be transmitted during the beam failure recovery timer being running. At 6230, a preamble transmission counter may be incremented to a first value in response to not receiving a first response to the first preamble during a first response window. At 6240, a second preamble may be transmitted in response to an expiry of the beam failure recovery timer. At 6250, during a second response window, a second downlink control channel may be monitored for a second response to the second preamble. At 6260, the preamble transmission counter may be incremented from the first value in response to not receiving the second response during the second response window. At 6270, a radio link failure report may be transmitted in response to the preamble transmission counter indicating a first number greater than a second number for preamble transmissions. The radio link failure report may comprise one or more parameters indicating a random access problem or a failure of the beam failure recovery procedure.

FIG. 63 is a flow diagram of an aspect of an embodiment of the present disclosure. At 6310, a wireless device may receive a medium access control (MAC) control element (CE) identified by a MAC subheader. The in the MAC CE may comprise a first field associated with a first cell of a plurality of cells. The first field being set to a first value may indicate a command of activation/deactivation of SP CSI reporting on the first cell is present. The in the MAC CE may comprise a semi-persistent channel state information (SP CSI) reporting activation/deactivation indicator. The MAC CE may comprise a SP CSI report trigger field indicating a SP CSI reporting of a plurality of SP CSI reporting on the first cell. At 6320, in response to the SP CSI reporting activation/deactivation indicator indicating an activation of the SP CSI reporting on the first cell, a SP CSI report for the first cell may be transmitted via an uplink control channel.

According to an example embodiment, the MAC subheader may comprise a length field indicating a size of the MAC CE. The MAC subheader may comprise a logical channel identifier indicating the MAC CE is for activation/deactivation of the SP CSI reporting. According to an example embodiment, the MAC CE may have a fixed size. According to an example embodiment, the first value may be 1. According to an example embodiment, the plurality of cells may comprise a primary cell and one or more secondary cells. According to an example embodiment, the first cell, associated with the first field, may be indicated in a radio resource control message. According to an example embodiment, the first cell, association with the first field, may be identified by a cell index of the first cell, wherein the cell index determines a location of the first field in the MAC CE. According to an example embodiment, the SP CSI reporting activation/deactivation indicator may comprise a bit. According to an example embodiment, the wireless device may transmit the SP CSI report with a report periodicity indicated by one or more parameters of the SP CSI reporting. According to an example embodiment, the wireless device may transmit the SP CSI report via the uplink control channel indicated by one or more parameters of the SP CSI reporting. According to an example embodiment, one or more radio resource control messages may be received. The one or more radio resource control messages may comprise configuration parameters of the plurality of SP CSI reporting on the plurality of cells. The configuration parameters may indicate one or more channel state information reference signal resource configurations. The configuration parameters may indicate one or more channel state information report quantity indicators. The configuration parameters may indicate a report periodicity. The configuration parameters may indicate one or more uplink control channel configuration parameters. According to an example embodiment, in response to the SP CSI reporting activation/deactivation indicator indicating a deactivation of the SP CSI reporting on the first cell, a transmission of the SP CSI report for the first cell via the uplink control channel may be stopped. According to an example embodiment, the SP CSI reporting activation/deactivation indicator may comprise a bit.

According to an example embodiment, the MAC CE may comprise a reference signal resource indicator indicating at least one of a plurality of RSs of the first cell. According to an example embodiment, the wireless device may transmit the SP CSI report measured on the one of the plurality of RSs of the first cell.

According to an example embodiment, the MAC CE may comprise a second field associated with a second cell of the plurality of cells. The second field being set to a second value may indicate a command of activation/deactivation of SP CSI reporting on the second cell is absent. According to an example embodiment, the second value may be 0. According to an example embodiment, the second cell, association with the second field, may be indicated in a radio resource control message. According to an example embodiment, the second cell, association with the second field, may be identified by a cell index of the second cell. The cell index may determine a location of the second field in the MAC CE. According to an example embodiment, a state of SP CSI reporting on the second cell may be maintained in response to the second field associated with the second cell indicating the command of activation/deactivation of SP CSI reporting on the second cell is absent.

FIG. 64 is a flow diagram of an aspect of an embodiment of the present disclosure. At 6410, a wireless device may receive one or more messages from a base station. The one or more messages may comprise one or more first configuration parameters of a plurality of cells. The one or more messages may comprise one or more second configuration parameters of a plurality of SP CSI reporting. At 6420, a medium access control (MAC) control element (CE) identified by a MAC subheader may be received. The MAC CE may comprise a first field associated with a first cell of the plurality of cells. The first field being set to a first value may indicate a command of activation/deactivation of SP CSI reporting on the first cell is present. The MAC CE may comprise a semi-persistent channel state information (SP CSI) reporting activation/deactivation indicator. The MAC CE may comprise a SP CSI report trigger field indicating a SP CSI reporting of a plurality of SP CSI reporting on the first cell. At 6430, in response to the SP CSI reporting activation/deactivation indicator indicating an activation of the SP CSI reporting on the first cell, a SP CSI report for the first cell may be transmitted via an uplink control channel.

According to an example embodiment, the MAC subheader may comprise a length field indicating a size of the MAC CE. The MAC subheader may comprise a logical channel identifier indicating the MAC CE is for activation/deactivation of the SP CSI reporting. According to an example embodiment, the MAC CE may comprise a second field associated with a second cell of the plurality of cells. The second field may be set to a second value indicates a command of activation/deactivation of SP CSI reporting on the second cell is absent. According to an example embodiment, a state of SP CSI reporting on the second cell may be maintained in response to the second field associated with the second cell indicating the command of activation/deactivation of SP CSI reporting on the second cell is absent.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a base station, a downlink control information comprising:
      a power control command of an uplink shared channel;
      a channel state information (CSI) request field;
      a hybrid automatic repeat request process number; and
      a redundancy version;
   performing a validation of the downlink control information for an activation of a semi-persistent CSI reporting based on:
      a radio network temporary identifier of the semi-persistent CSI reporting;
      the hybrid automatic repeat request process number being set to a first value; and
      the redundancy version being set to a second value;
   activating the semi-persistent CSI reporting indicated by the CSI request field in response to the validation being achieved; and
   transmitting, based on the activated semi-persistent CSI reporting, a semi-persistent CSI report via the uplink shared channel with a transmission power determined based on the power control command, wherein the power control command is not used to perform the validation.

2. The method of claim 1, wherein the wireless device determines the validation is achieved in response to:
   cyclic redundancy check parity bits of the downlink control information being scrambled with the radio network temporary identifier of the semi-persistent CSI reporting;
   the hybrid automatic repeat request process number being set to the first value; and
   the redundancy version being set to the second value.

3. The method of claim 1, wherein the semi-persistent CSI report comprises at least one or more values of:
   a channel quality indicator (CQI);
   a precoding matrix indicator (PMI);
   a channel state information reference signal resource indicator (CRI);
   a layer indicator (LI);
   a rank indicator (RI); and
   a layer 1 reference signal received power (L1-RSRP).

4. The method of claim 1, wherein the wireless device transmits the semi-persistent CSI report with a report periodicity of the activated semi-persistent CSI reporting.

5. The method of claim 1, wherein the first value is a predefined value comprising a bit string with bits set to "0".

6. The method of claim 1, wherein the second value is a predefined value comprising a bit string with bits set to "0".

7. The method of claim 1, wherein the downlink control information further comprises a new data indicator field.

8. The method of claim 7, wherein the wireless device validates the downlink control information regardless of a value of the new data indicator field and a value of the power control command.

9. The method of claim 1, further comprising skipping the downlink control information by not applying the downlink control information in response to the validation not being achieved.

10. The method of claim 9, wherein the validation is not achieved in response to at least one of:
    cyclic redundancy check parity bits of the downlink control information not being scrambled with the radio network temporary identifier of the semi-persistent CSI reporting;
    the hybrid automatic repeat request process number not being set to the first value; and
    the redundancy version not being set to the second value.

11. The method of claim 1, wherein the downlink control information further comprises:
    a value indicating a modulation and coding scheme; and
    a parameter of resource block assignment on the uplink shared channel.

12. The method of claim 11, wherein the wireless device determines the validation is achieved further in response to:
    the value indicating the modulation and coding scheme not being set to a third value; and
    the parameter of the resource block assignment not being set to a fourth value.

13. The method of claim 11, wherein the wireless device transmits the semi-persistent CSI report via one or more resource blocks of the uplink shared channel, wherein the one or more resource blocks are indicated by the parameter of the resource block assignment.

14. The method of claim 1, wherein the wireless device determines the validation is achieved in response to:
    cyclic redundancy check parity bits of the downlink control information being scrambled with the radio network temporary identifier of the semi-persistent CSI reporting;
    the hybrid automatic repeat request process number being set to the first value;
    the redundancy version being set to the second value;
    a value of a modulation and coding scheme, of the downlink control information, not being set to a third value; and
    a parameter of a resource block assignment, of the downlink control information, not being set to a fourth value.

15. The method of claim 14, wherein the third value is a predefined value comprising a bit string with bits set to "1".

16. The method of claim 14, wherein the fourth value is a predefined value comprising a bit string with bits set to "1".

17. The method of claim 14, wherein the fourth value is a predefined value comprising a bit string with bits set to "0".

18. The method of claim 1, further comprising receiving, from the base station, one or more radio resource control messages comprising:
    the radio network temporary identifier of the semi-persistent CSI reporting; and
    configuration parameters of a plurality of semi-persistent CSI reporting comprising the semi-persistent CSI reporting.

19. The method of claim 18, wherein the one or more radio resource control messages further comprise a second radio network temporary identifier of a semi-persistent downlink scheduling or a configured uplink grant, wherein the second radio network temporary identifier is different from the radio network temporary identifier of the semi-persistent CSI reporting.

20. The method of claim 18, wherein the one or more radio resource control messages further comprise a third radio network temporary identifier of a dynamic downlink assignment or a dynamic uplink grant, wherein the third radio network temporary identifier is different from the radio network temporary identifier of the semi-persistent CSI reporting.

* * * * *